(12) United States Patent
Neukermans et al.

(10) Patent No.: US 6,795,602 B2
(45) Date of Patent: Sep. 21, 2004

(54) FLEXIBLE, MODULAR, COMPACT FIBER OPTIC SWITCH

(76) Inventors: Armand P. Neukermans, 3510 Arbutus Ave., Palo Alto, CA (US) 94303; Timothy G. Slater, 3715 Folsom St., San Francisco, CA (US) 94110; Tyler L. Baughman, 401 Harrison Ave., Campbell, CA (US) 95088; James P. Downing, 5084 Gypsy Hill Rd., Saratoga, CA (US) 95070; John S. Forker, 356 Kingsley Ave., Palo Alto, CA (US) 94301; Gregory A. Reznick, 1805 Brooktree Way, Pleasanton, CA (US) 94566; Sam Calmes, 2250 Latham St., Apt. 10, Mountain View, CA (US) 95070; Steven M. Clark, 986 Celia Way, Palo Alto, CA (US) 94303; Jack D. Foster, 856 Renetta Ct., Los Altos, CA (US) 94024; Marc R. Schuman, 1550 9th. Ave., No. 2, San Francisco, CA (US) 94122; Rajiv Ramaswami, 2480 Barry Ct., Yorktown Heights, NY (US) 10598

( * ) Notice: Subject to any disclaimer, the term of this patent is extended or adjusted under 35 U.S.C. 154(b) by 0 days.

(21) Appl. No.: 09/729,336

(22) Filed: Dec. 1, 2000

(65) Prior Publication Data

US 2002/0164110 A1 Nov. 7, 2002

Related U.S. Application Data

(63) Continuation of application No. 09/446,540, filed as application No. PCT/US99/21139 on Sep. 15, 1999.

(51) Int. Cl.[7] .................................................. G02B 6/35
(52) U.S. Cl. ........................................................ 385/18
(58) Field of Search ............................. 385/18; 359/223

(56) References Cited

U.S. PATENT DOCUMENTS

| 4,365,863 A | 12/1982 | Broussaud |
| 4,580,873 A | 4/1986 | Levinson |
| 4,856,863 A | 8/1989 | Sampsell et al. |

(List continued on next page.)

FOREIGN PATENT DOCUMENTS

| WO | WO 99/63374 | 12/1999 |
| WO | WO 99/63531 | 12/1999 |
| WO | WO 99/66354 | 12/1999 |

(List continued on next page.)

OTHER PUBLICATIONS

Lin, L. Y., et al., Free–Space Micromachined Optical Cross-connects: Routes to Enhanced Port–Count and Reduced Loss, OFC/IOOC '99, Feb. 21–26, 1999.

(List continued on next page.)

Primary Examiner—John D. Lee
Assistant Examiner—Mike Stahl
(74) Attorney, Agent, or Firm—Fish & Richardson P.C.

(57) ABSTRACT

A fiber optic switch (400) includes a fiber optic switching module (100) that receives and fixes ends (104) of optical fibers (106). The module (100) includes numerous reflective light beam deflectors (172) which may be selected as pairs for coupling a beam of light (108) between a pair of optical fibers (106). The module (100) also produces orientation signals from each deflector (172) which indicate its orientation. A portcard (406) included in the switch (400) supplies drive signals to the module (100) for orienting at least one deflector (172). The portcard (406) also receives the orientation signals produced by that deflector (172) together with coordinates that specify an orientation for the deflector (172). The portcard (406) compares the received coordinates with the orientation signals received from the deflector (172) and adjusts the drive signals supplied to the module (100) to reduce any difference between the received coordinates and the orientation signals. The switch (400) also employs optical alignment to precisely orient pairs deflectors (172) coupling a beam of light (108) between optical fibers (106).

31 Claims, 29 Drawing Sheets

U.S. PATENT DOCUMENTS

| | | | |
|---|---|---|---|
| 4,859,012 | A | 8/1989 | Cohn |
| 4,886,335 | A | 12/1989 | Yanagawa et al. |
| 5,037,173 | A | 8/1991 | Sampsell et al. |
| 5,359,683 | A | 10/1994 | Pan |
| 5,440,654 | A | 8/1995 | Lambert, Jr. |
| 5,488,862 | A | 2/1996 | Neukermans et al. |
| 5,524,153 | A | 6/1996 | Laor |
| 5,629,790 | A | 5/1997 | Neukermans et al. |
| 5,648,618 | A | 7/1997 | Neukermans et al. |
| 5,699,463 | A | 12/1997 | Yang et al. |
| 5,727,098 | A | 3/1998 | Jacobson |
| 5,774,604 | A | 6/1998 | McDonald |
| 5,864,643 | A | 1/1999 | Pan |
| 5,903,687 | A | 5/1999 | Young et al. |
| 5,914,801 | A * | 6/1999 | Dhuler et al. ............... 359/230 |
| 5,960,132 | A | 9/1999 | Lin |
| 6,002,818 | A | 12/1999 | Fatehi et al. |
| 6,005,993 | A | 12/1999 | MacDonald |
| 6,097,858 | A | 8/2000 | Laor |
| 6,097,859 | A | 8/2000 | Solgaard et al. |
| 6,188,814 | B1 | 2/2001 | Bhalla |
| 6,253,001 | B1 | 6/2001 | Hoen |
| 6,295,154 | B1 | 9/2001 | Laor et al. |
| 6,337,760 | B1 * | 1/2002 | Huibers et al. ............. 359/291 |
| 6,347,167 | B1 * | 2/2002 | Hagelin ....................... 385/18 |
| 6,388,789 | B1 * | 5/2002 | Bernstein .................... 359/198 |

FOREIGN PATENT DOCUMENTS

| | | |
|---|---|---|
| WO | WO 99/67666 | 12/1999 |
| WO | WO 00/04671 | 1/2000 |
| WO | WO 01/50176 A1 | 7/2001 |

OTHER PUBLICATIONS

Lin, L. Y., et al., Free–Space Micromachined Optical–Switching Technologies and Architectures, OFC/IOOC '99, Feb. 21–26, 1999.

Laor, H., et al., Performance of a 576 × 576 Optical Cross connect, NFOEC–99. (1999).

Gustafsson, K. & Hok B., A Batch–Processed Optical Scanner Proc. 12th Nordic Semiconductor, Meeting, Jevnaker (Osio: Center for Industrial Research) pp. 282–285 (1986).

Gustaffson, K. & Hok B., Fiberoptic Switching and Multiplexing with a Micromechanical Scanning Mirror, Digest of Technical Papers–4th Int. Conf. on Solid State Sensors and Actuators (Tokyo: Institute of Electrical Engineers of Japan) pp. 212–215 (1987).

Gustaffson, K. & Hok B., a Silicon Light Modulator, Journal of Physics E. Scientific Instruments 21, pp. 680–685 (1988).

* cited by examiner

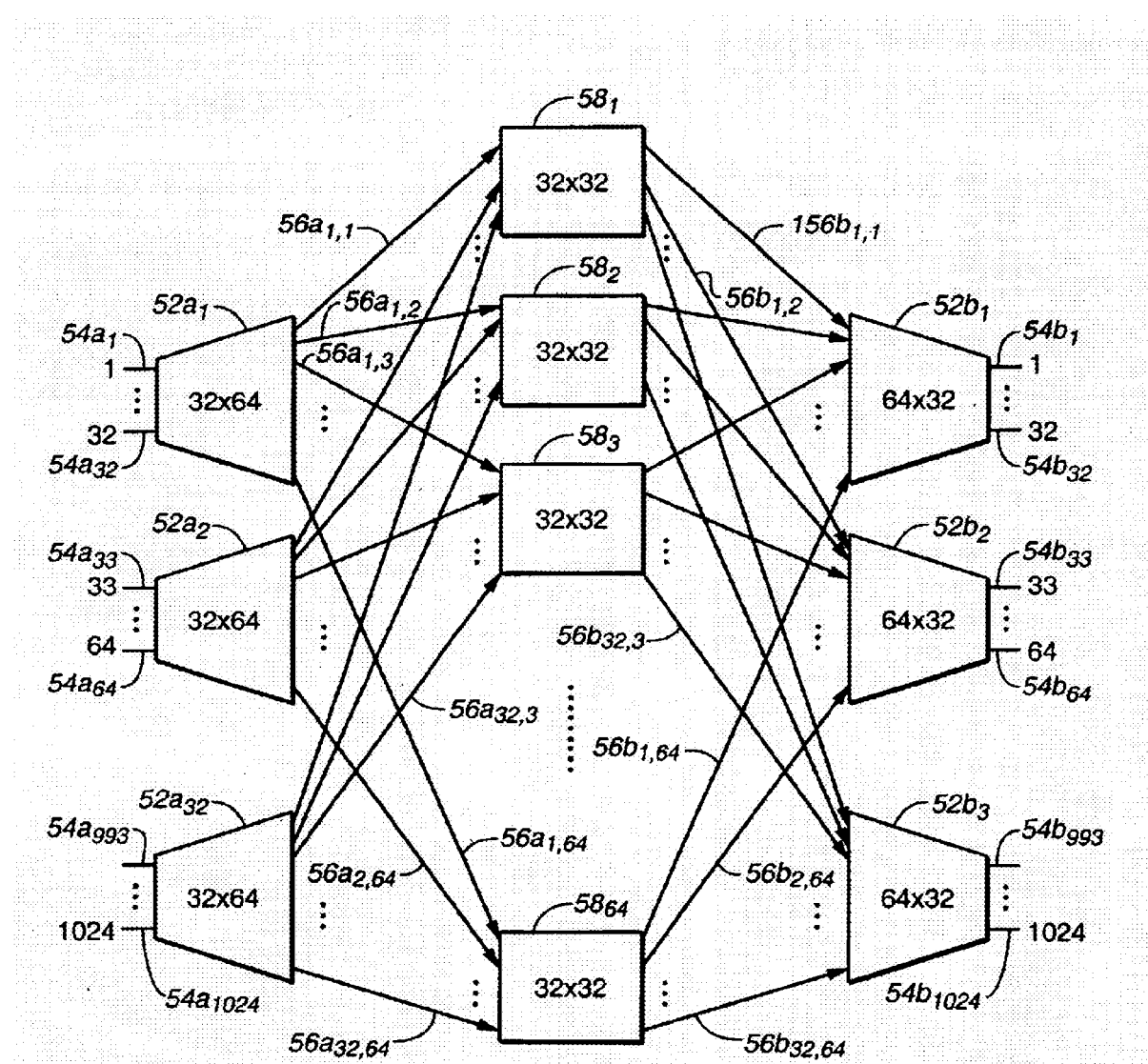
FIG._1
*(PRIOR ART)*

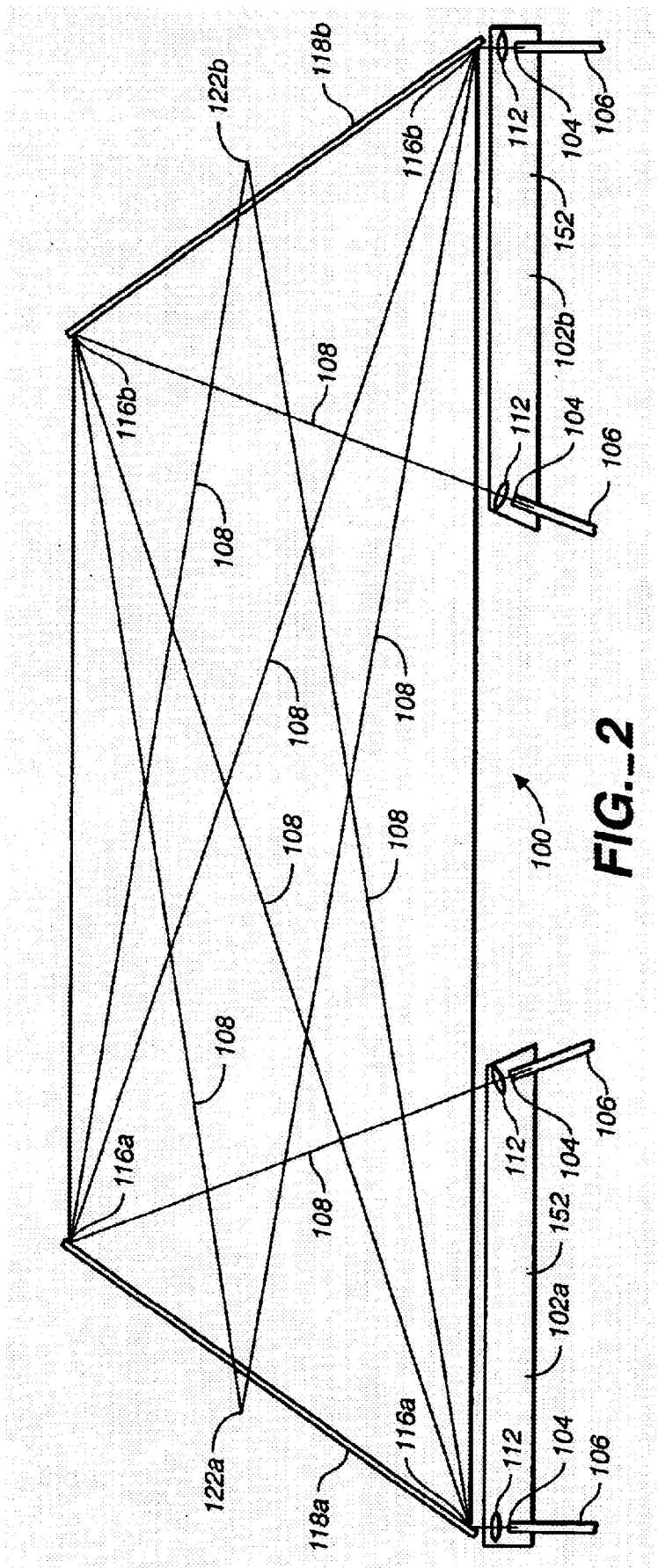
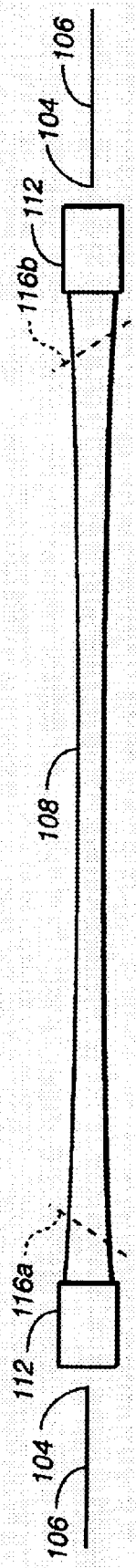
FIG._2
FIG._3

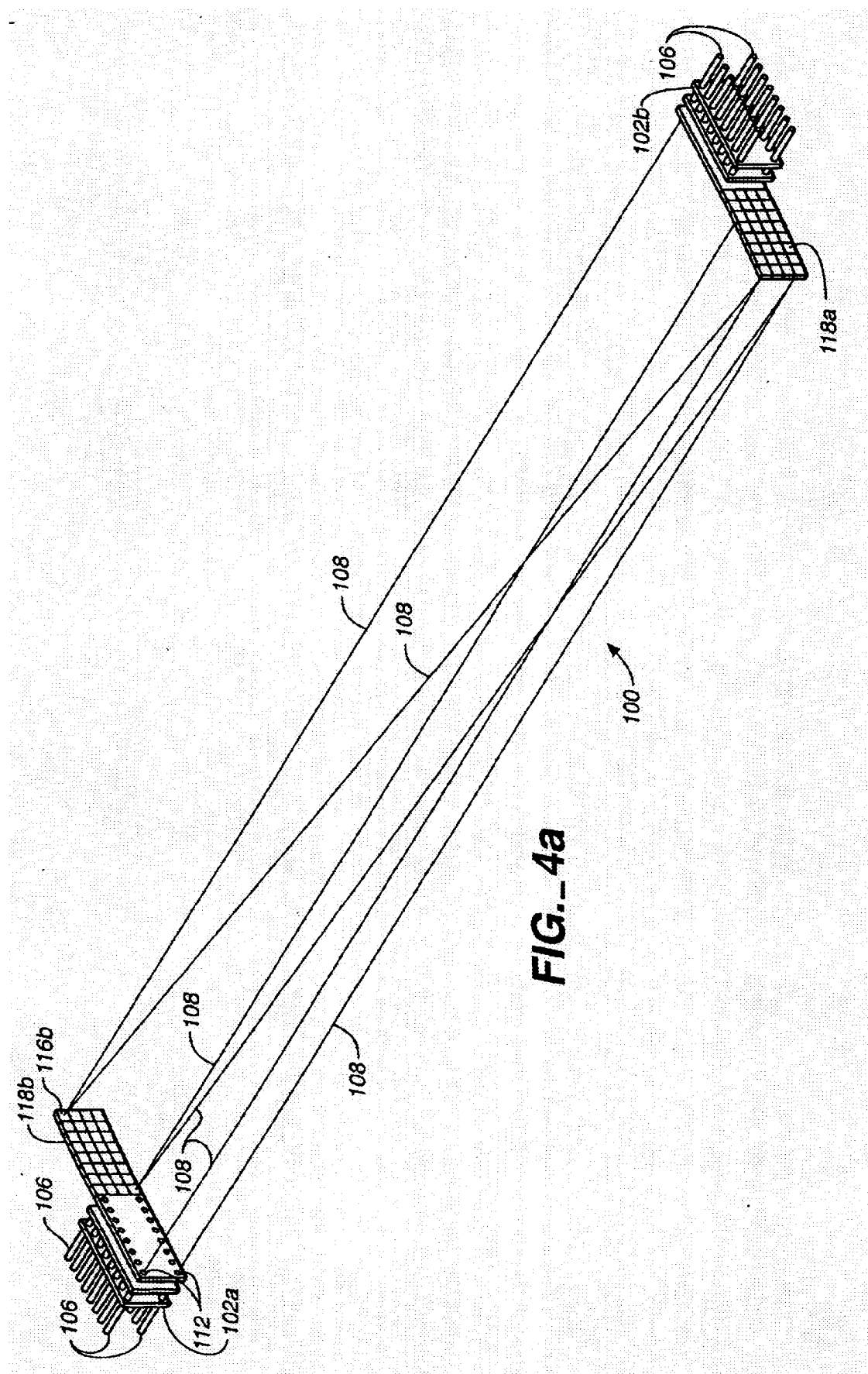

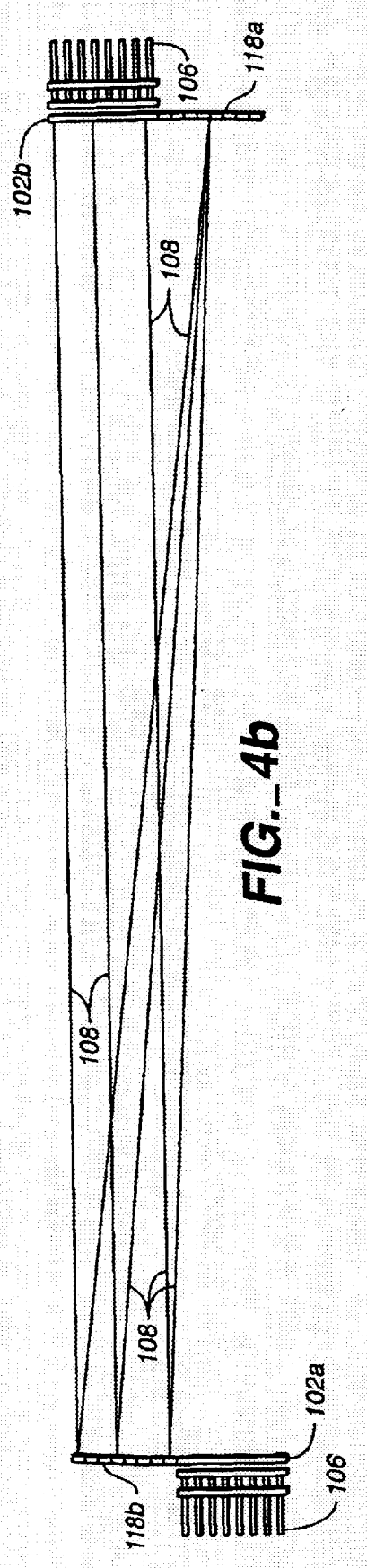

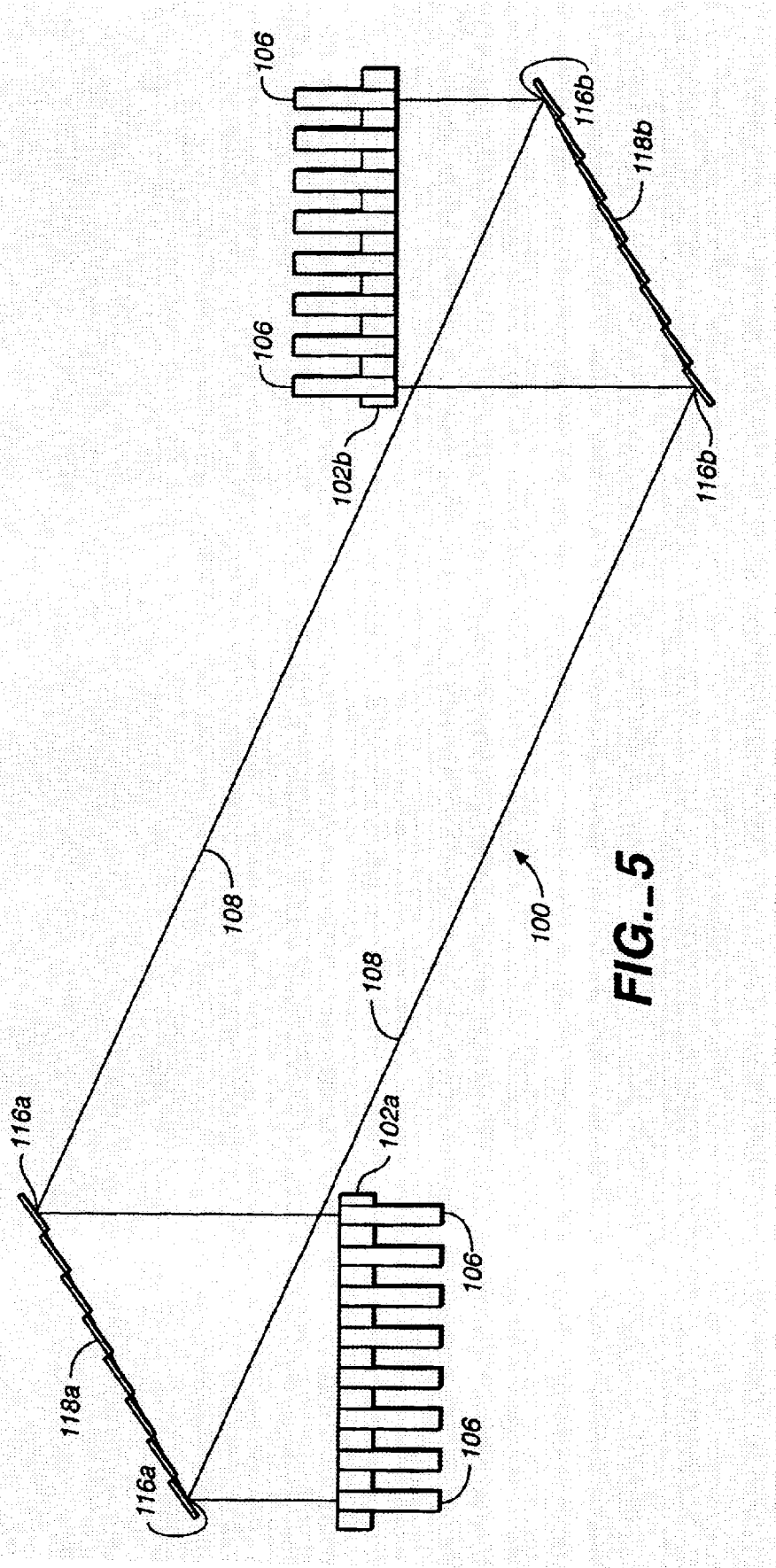

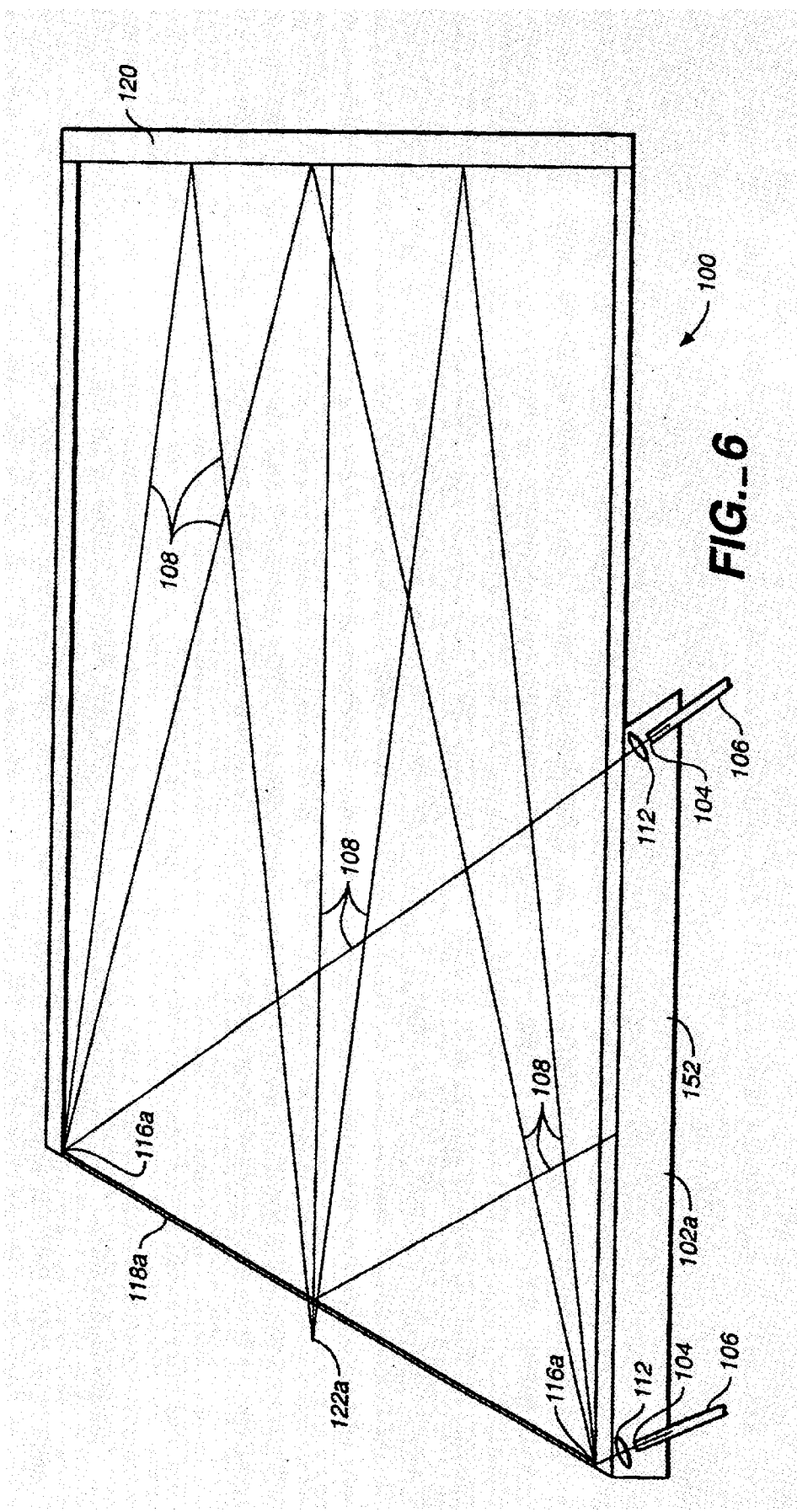
FIG._6

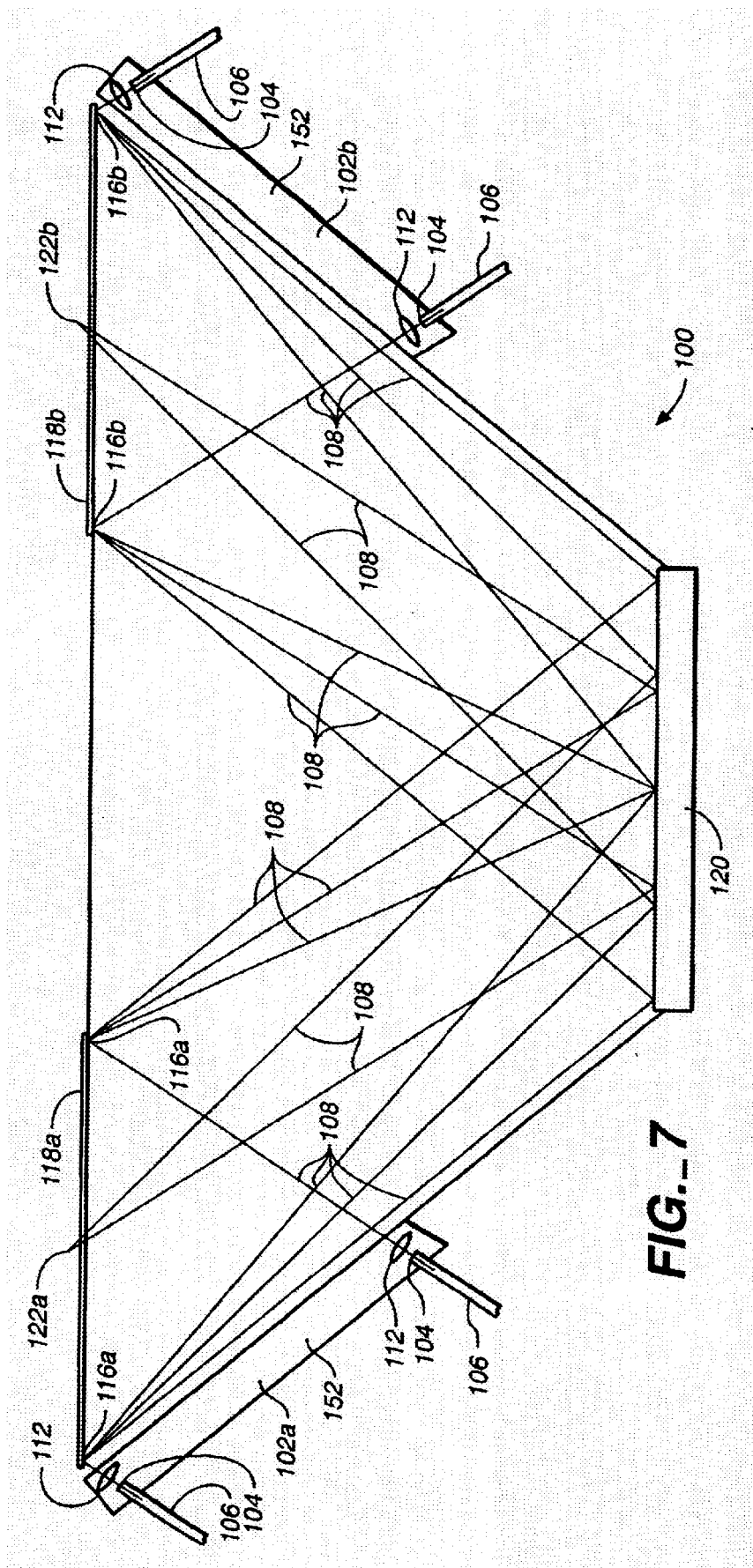
FIG._7

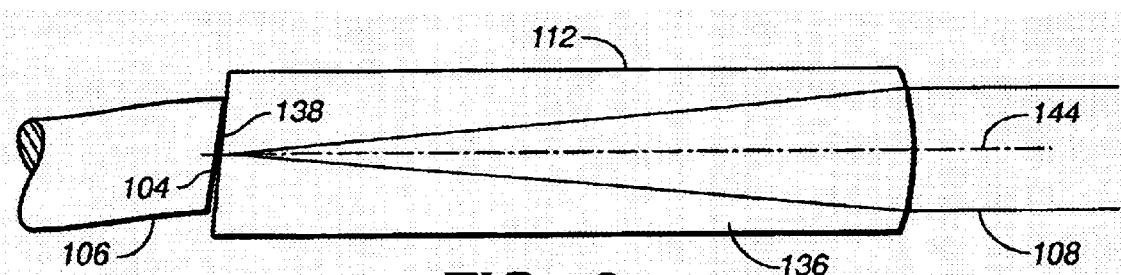
FIG._8a
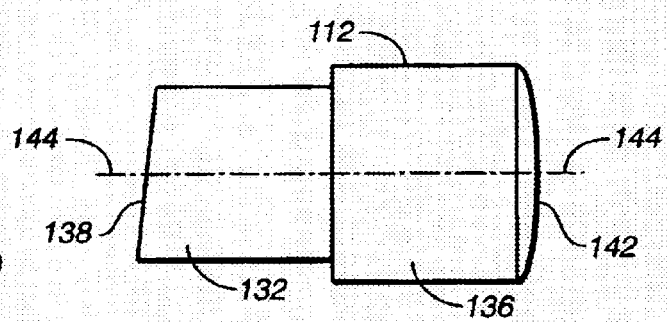
FIG._8b
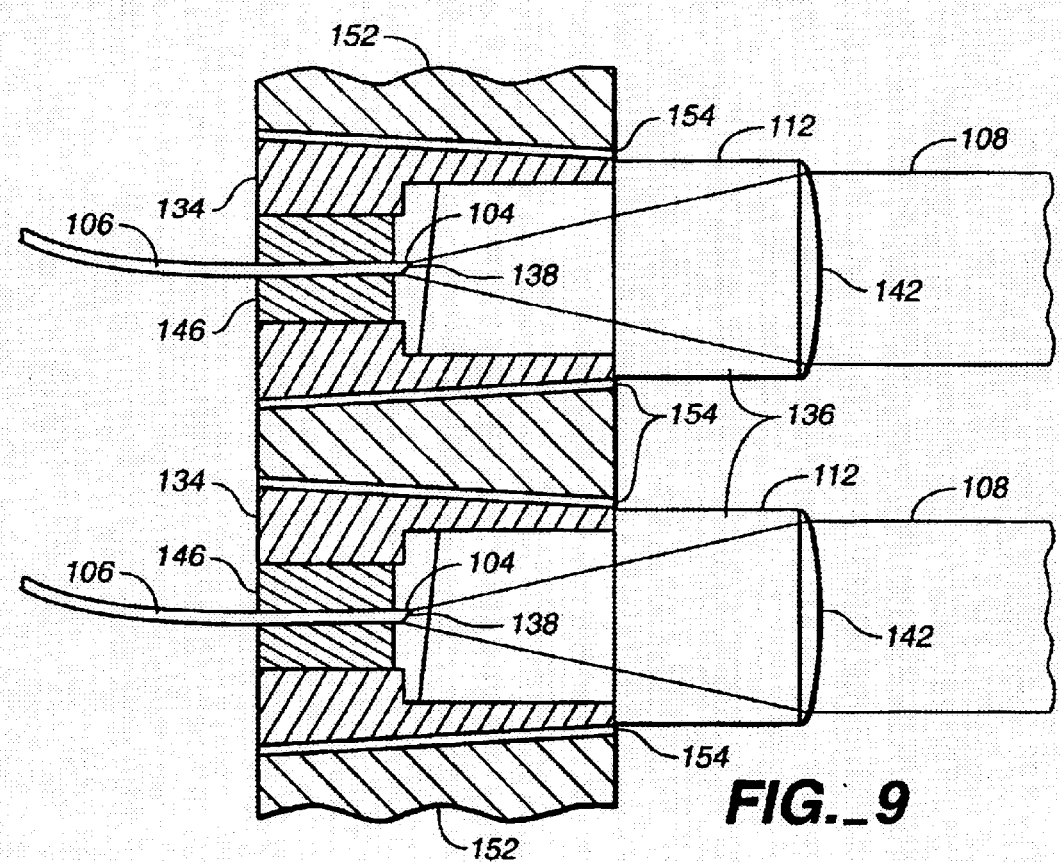
FIG._9

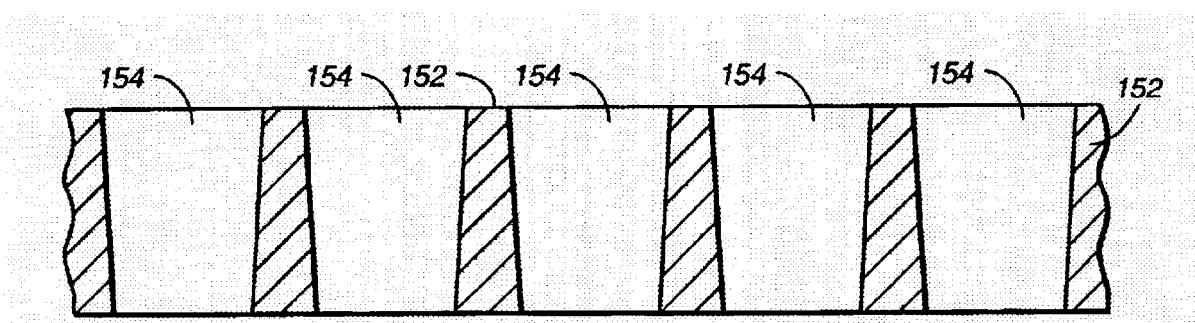
FIG._10
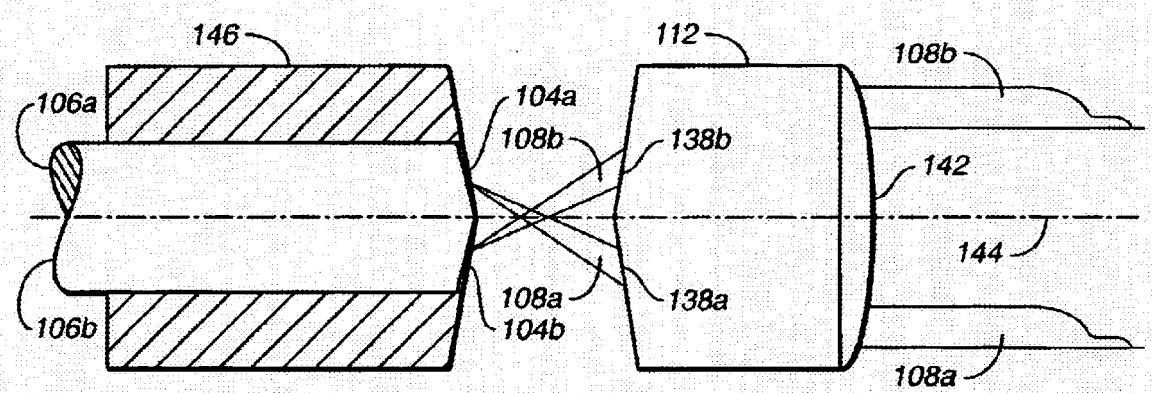
FIG._11
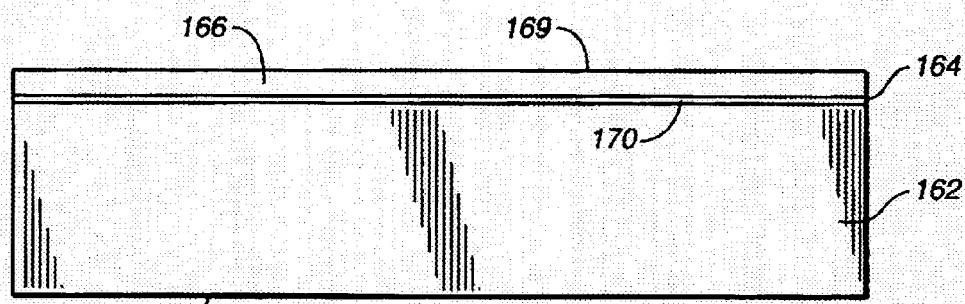
FIG._12

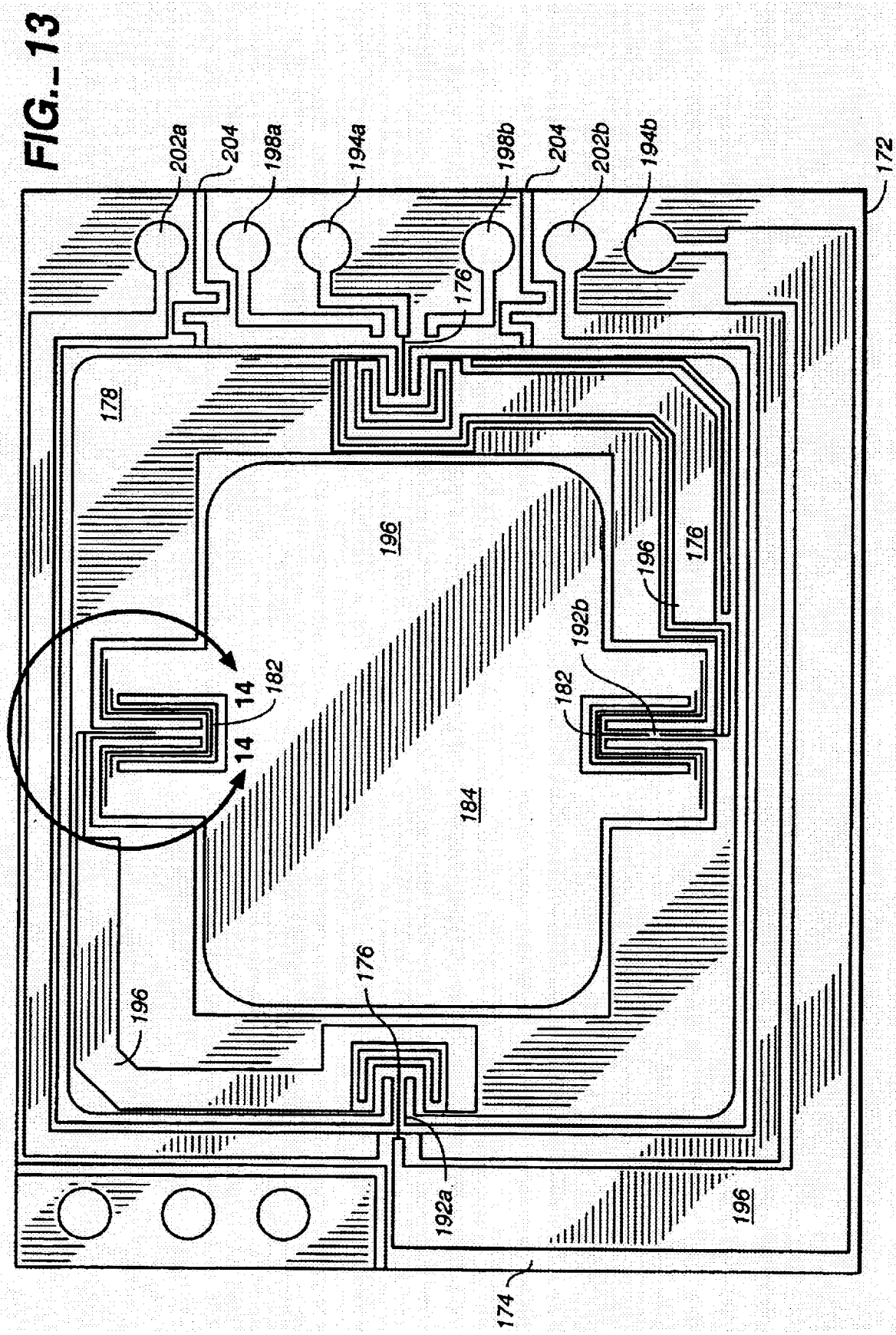

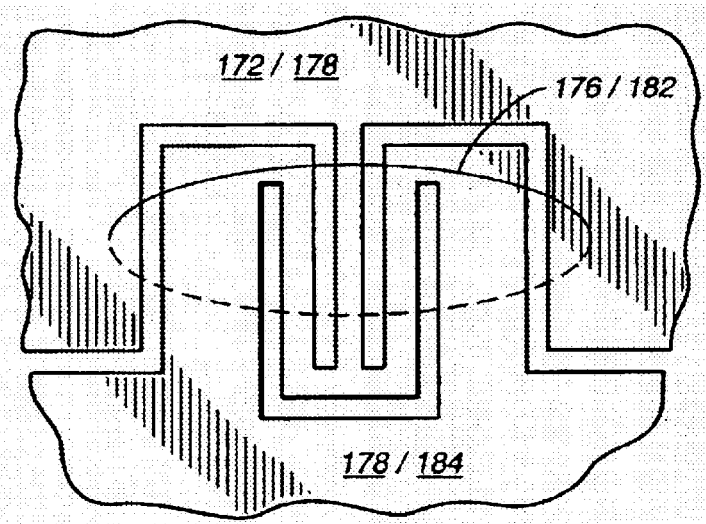
FIG._14
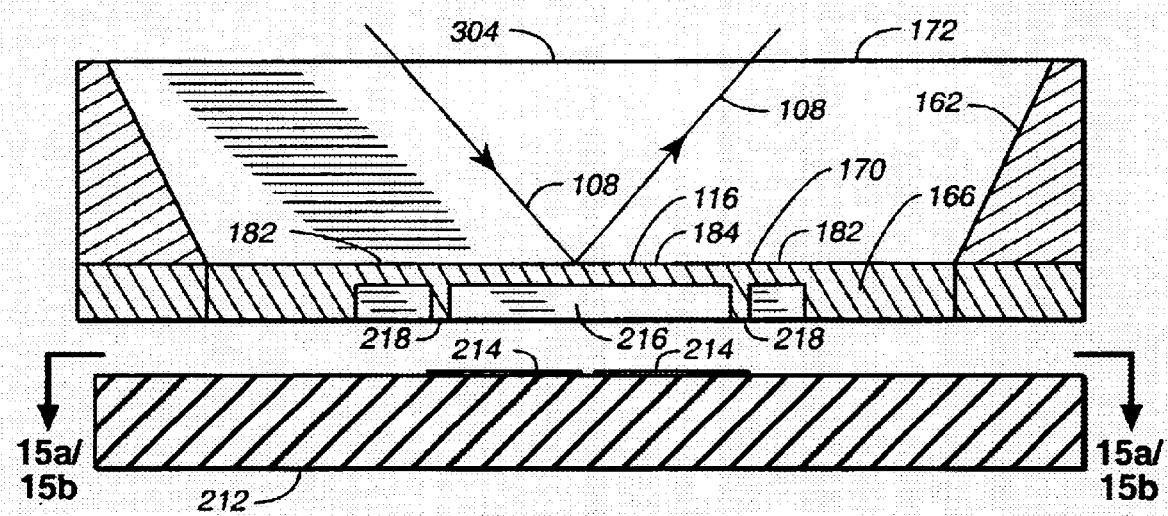
FIG._15
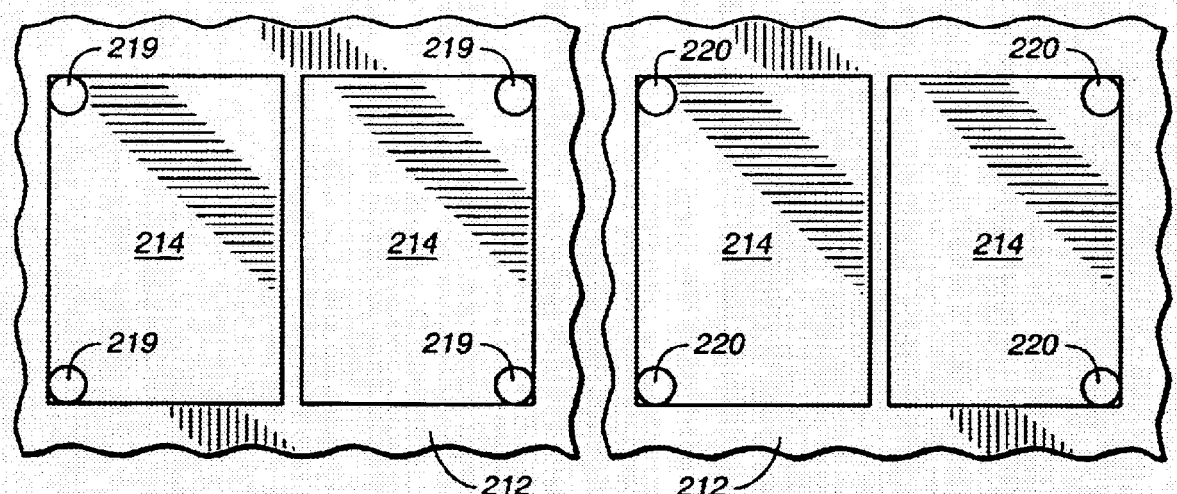
FIG._15a  FIG._15b

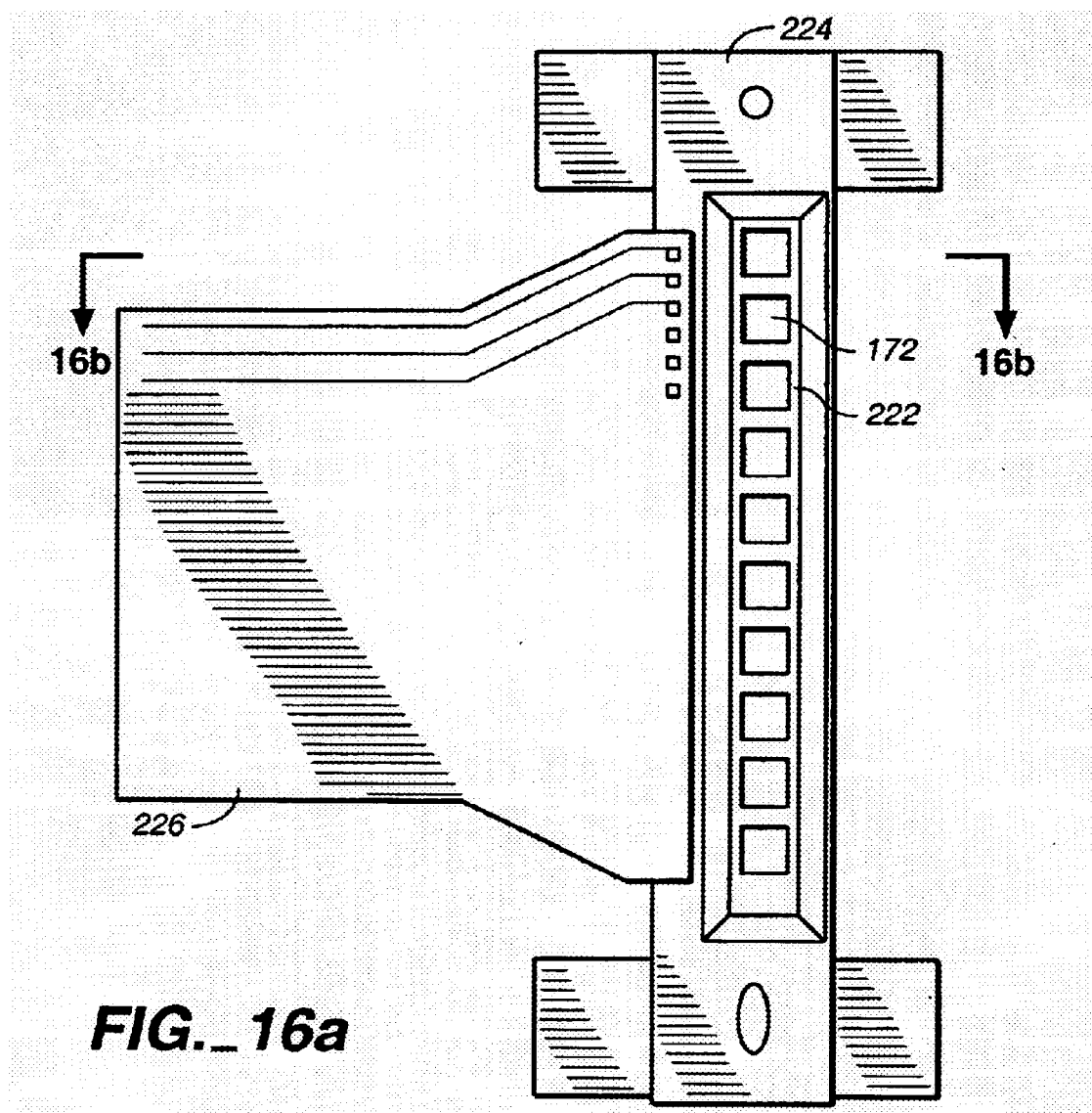
FIG._16a
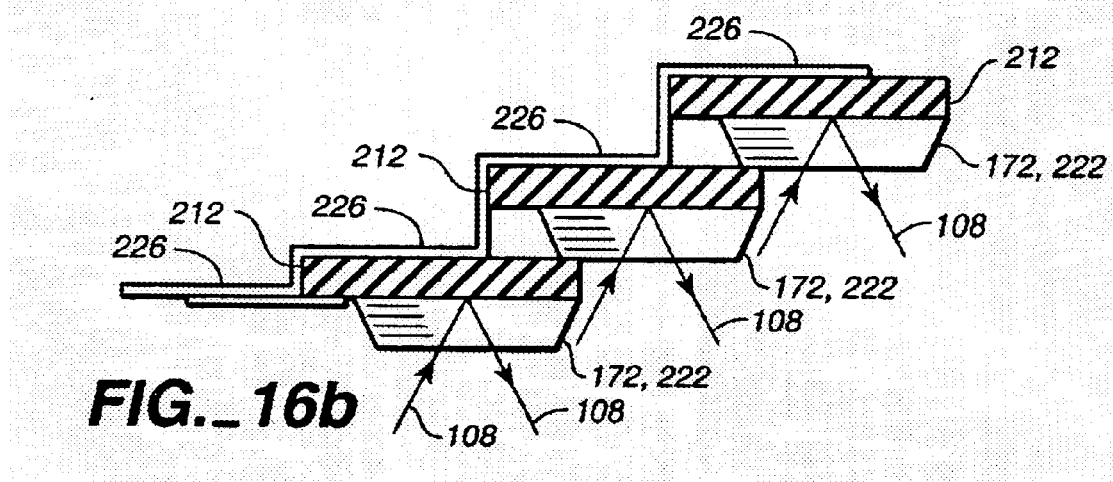
FIG._16b

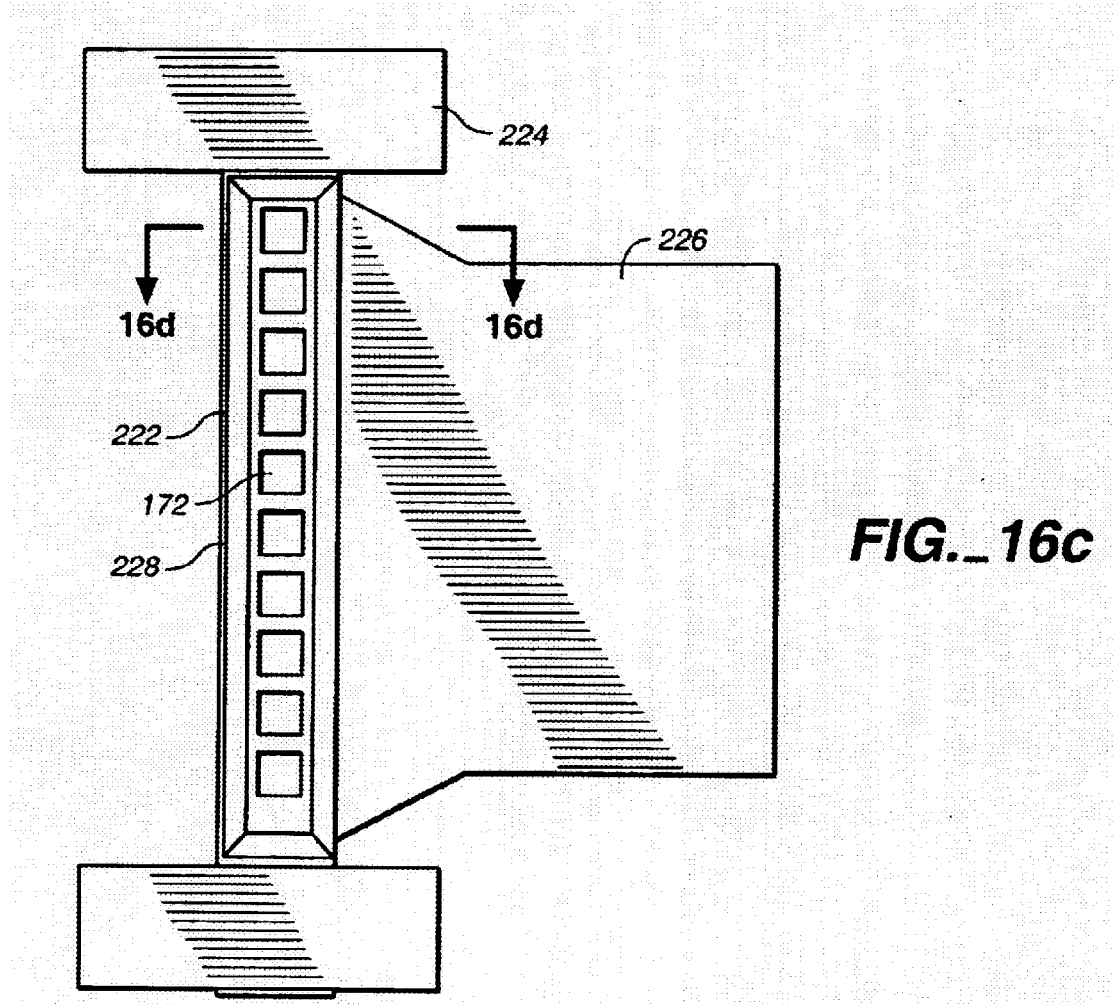
FIG._16c
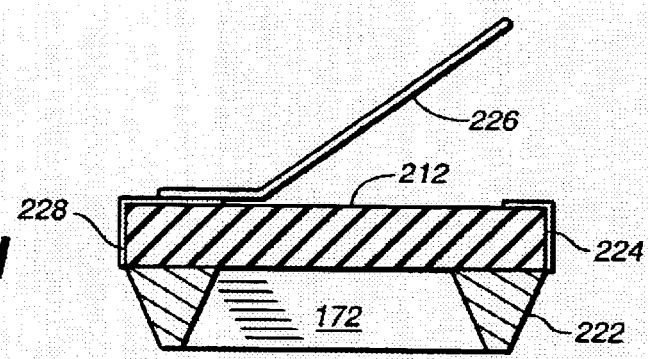
FIG._16d
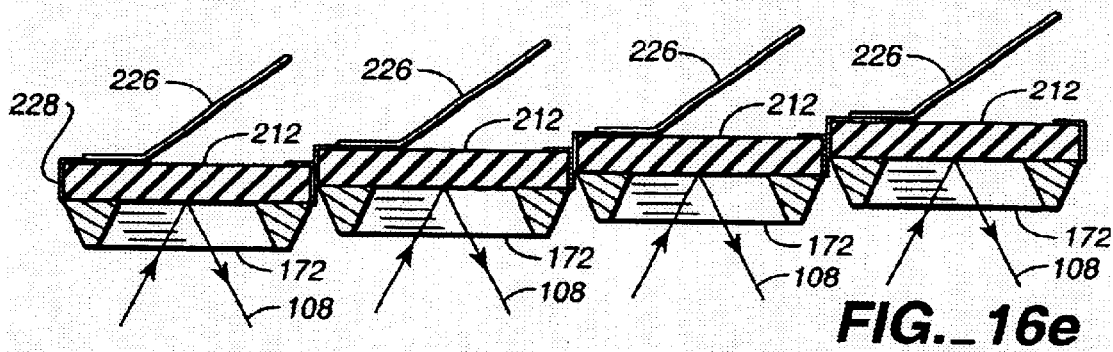
FIG._16e

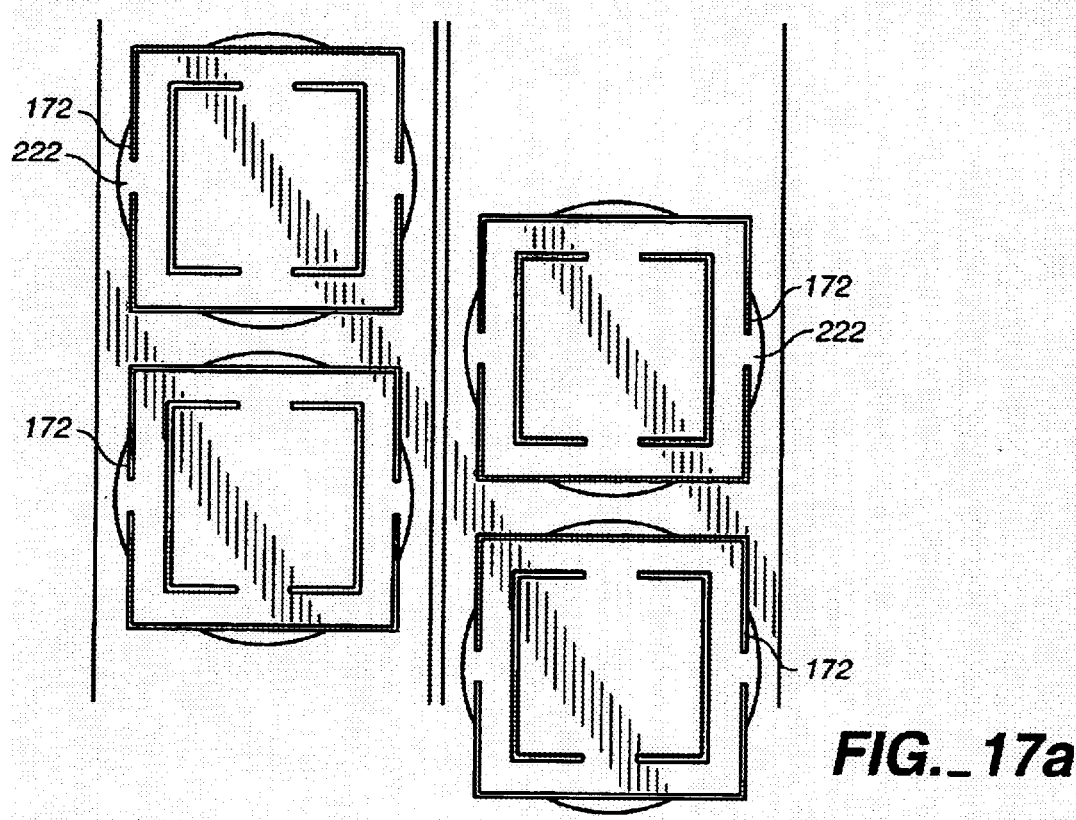
FIG._17a
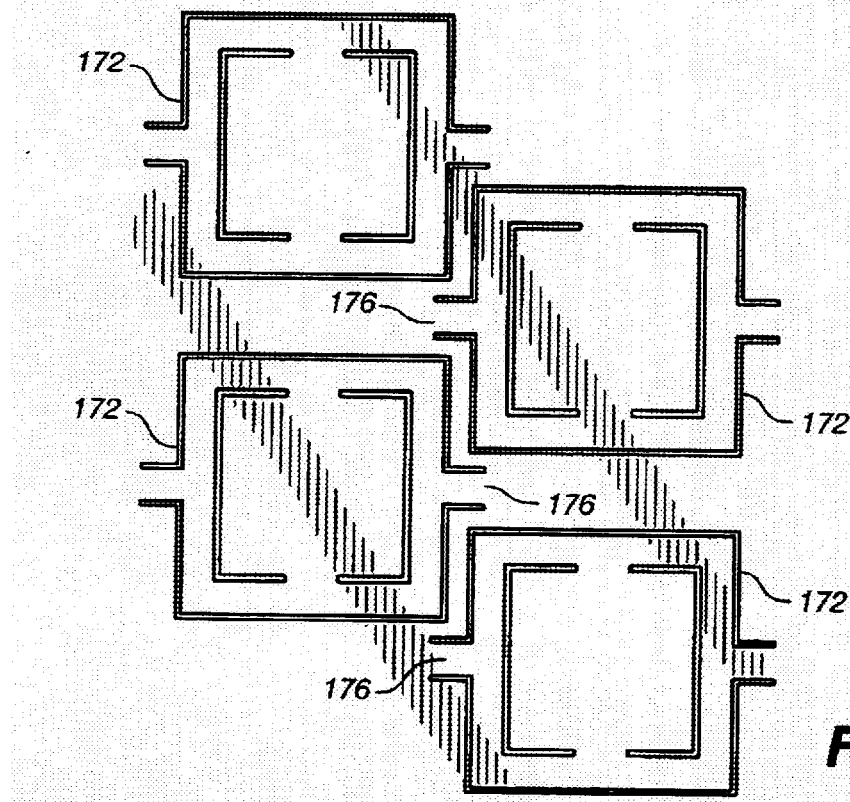
FIG._17b

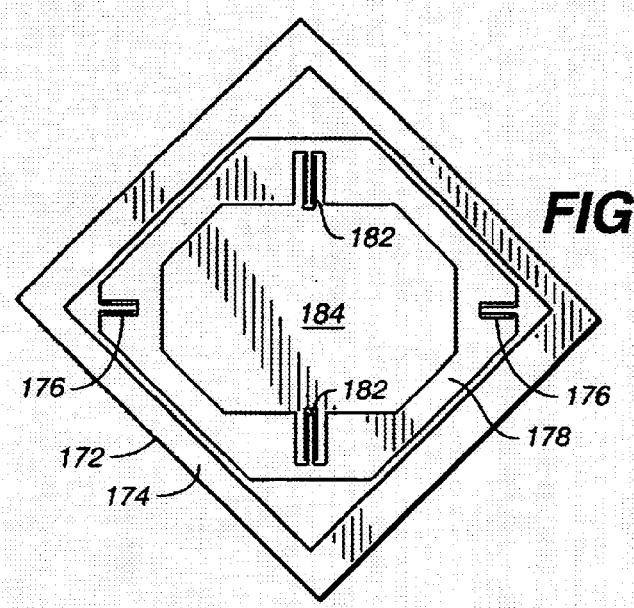
FIG._18a
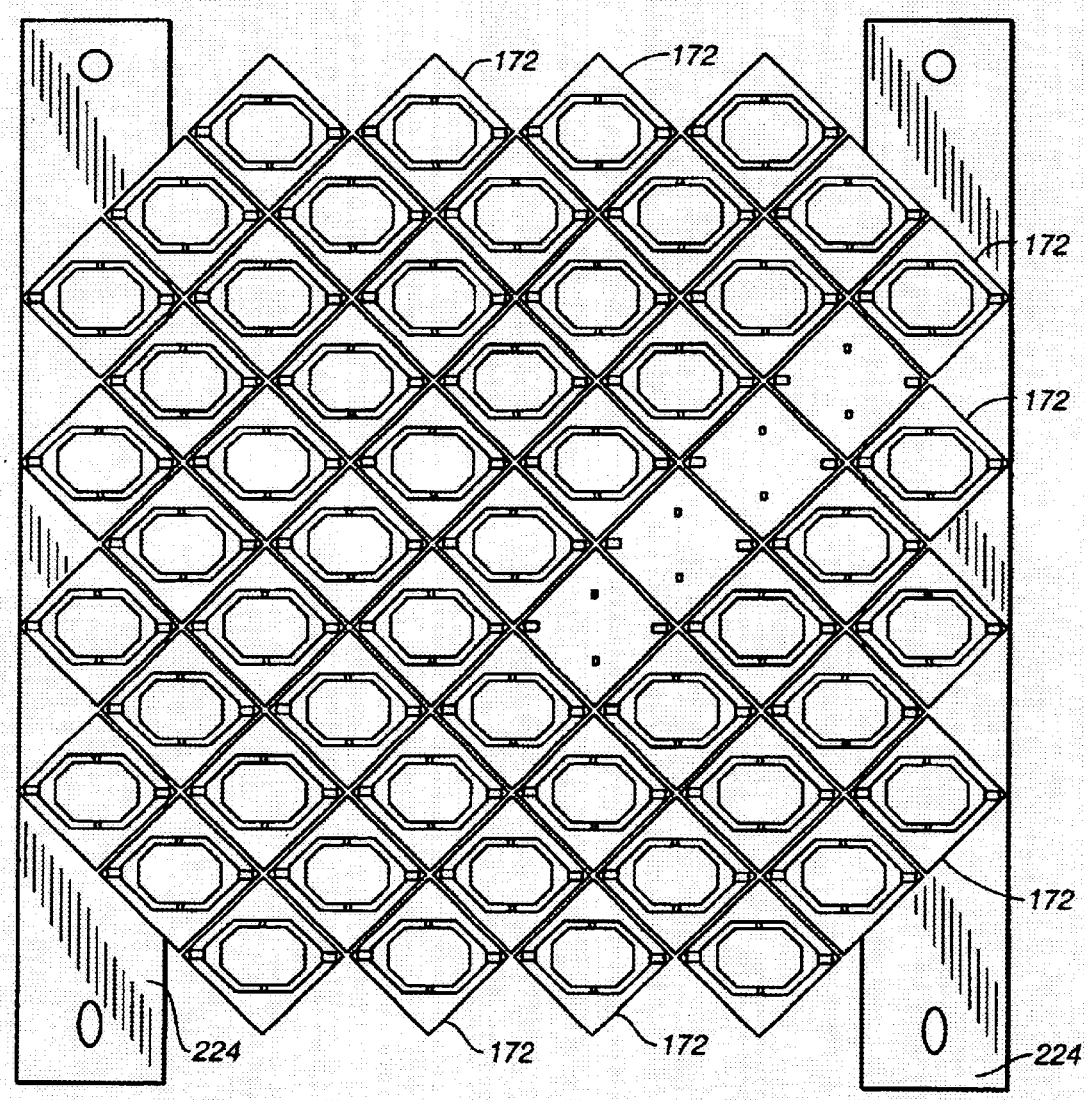
FIG._18b

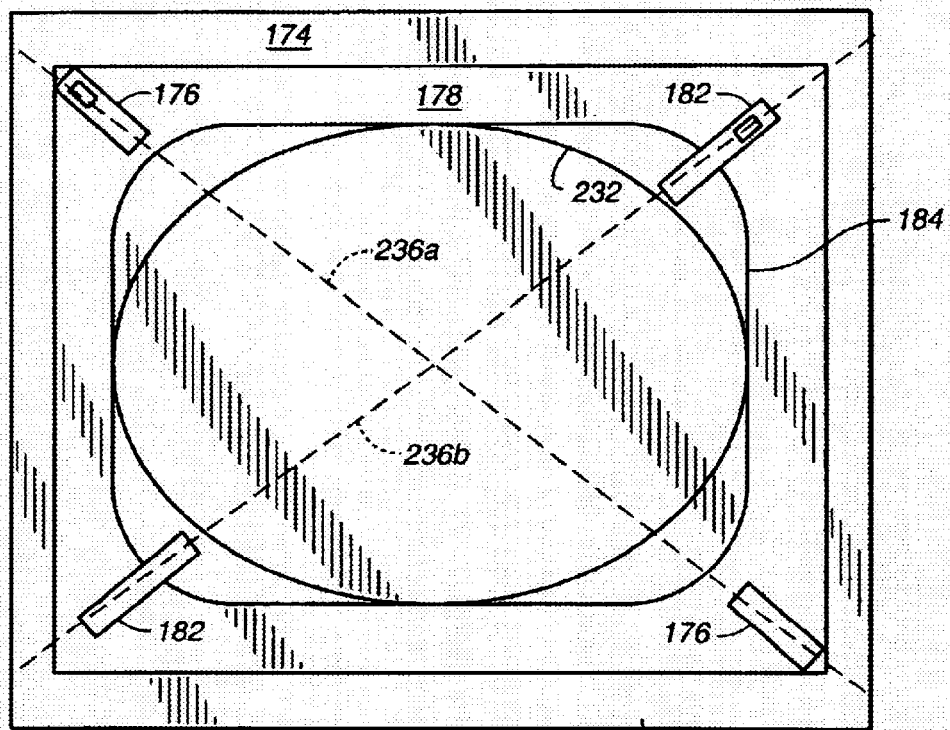
FIG._19a
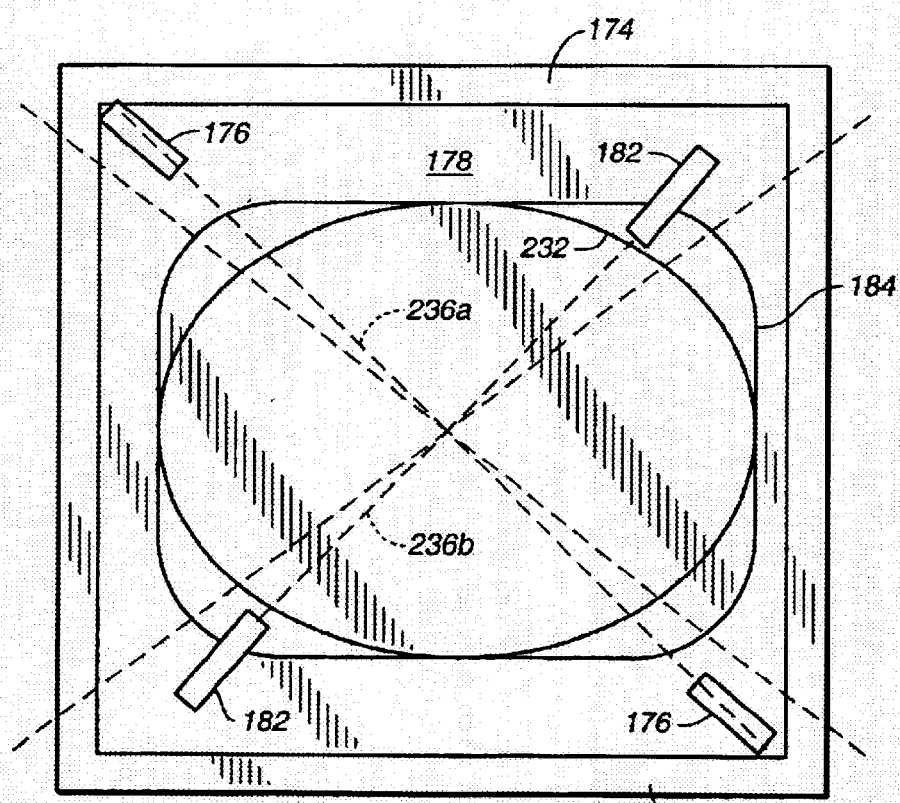
FIG._19b

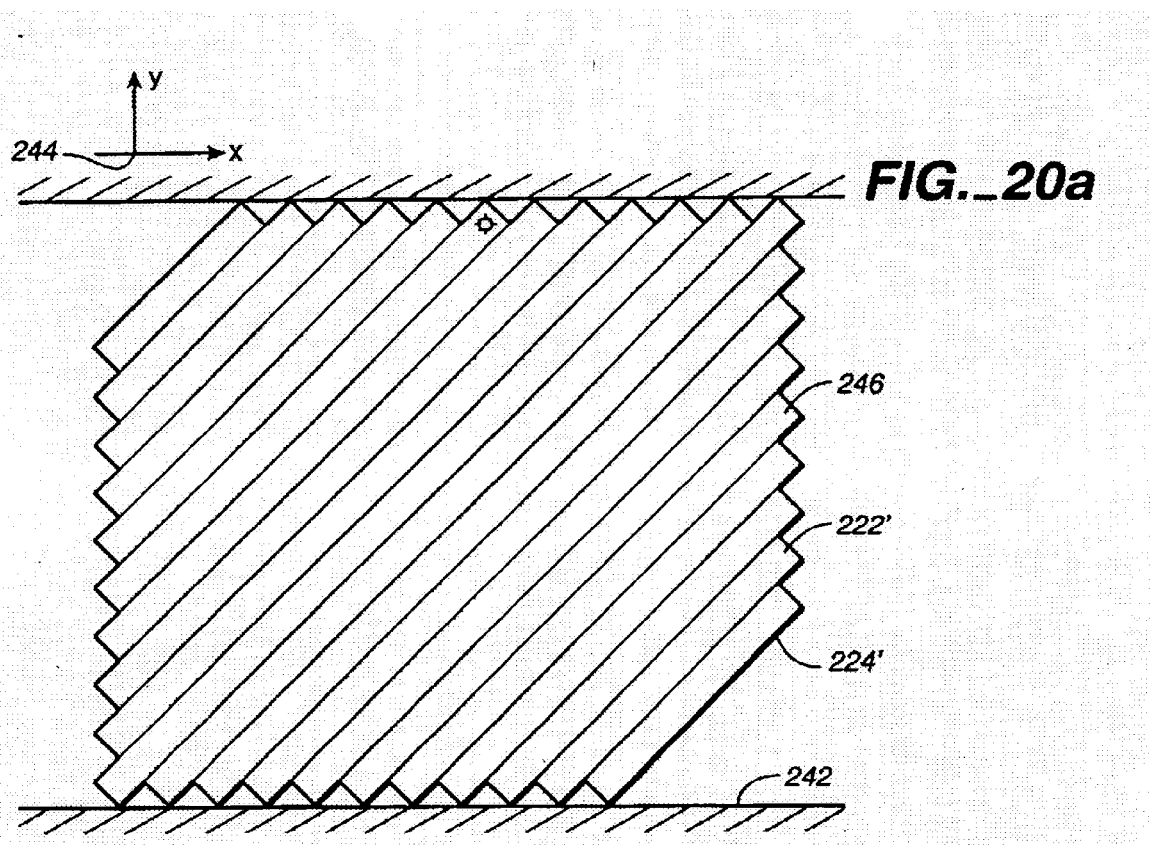
FIG._20a
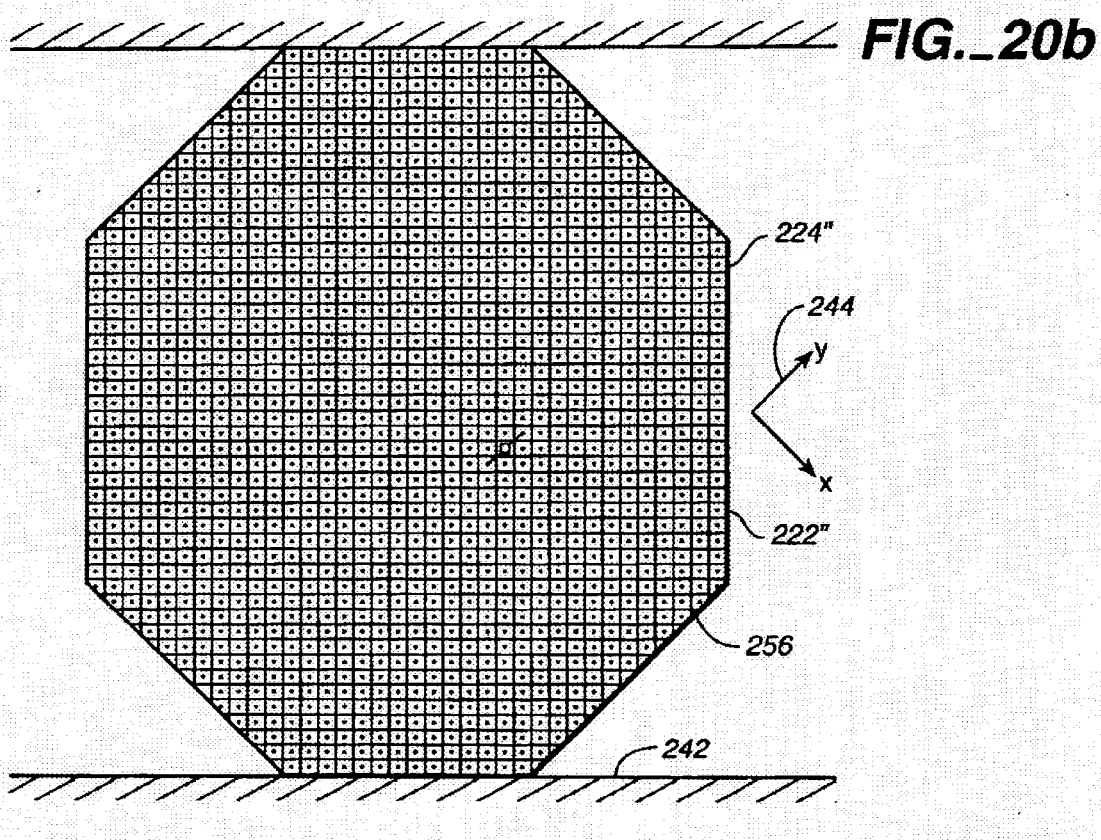
FIG._20b

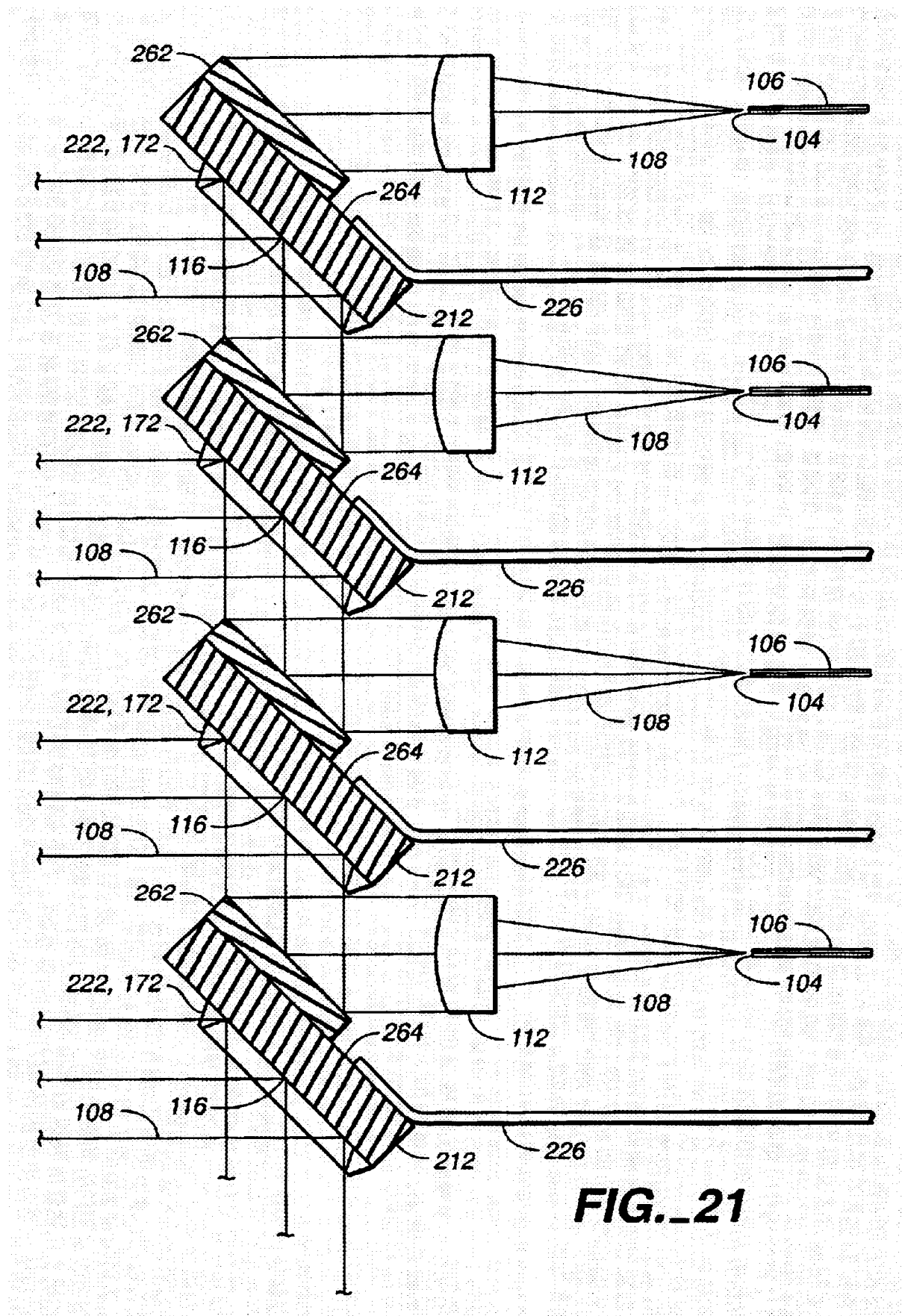
FIG._21

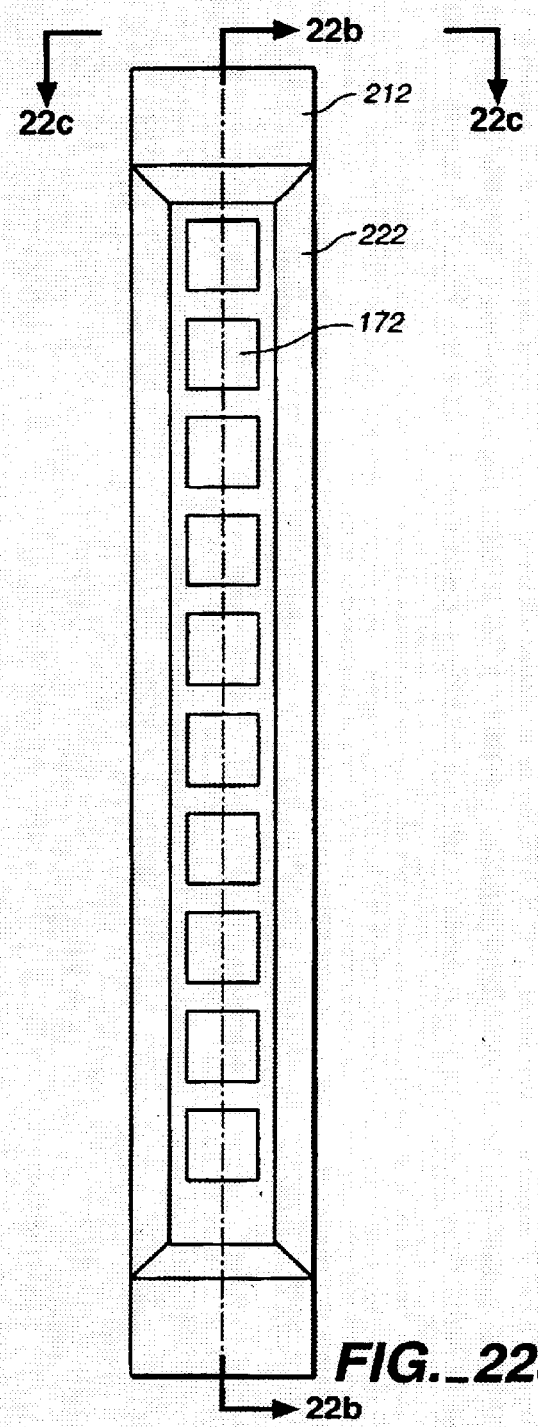
FIG._22a
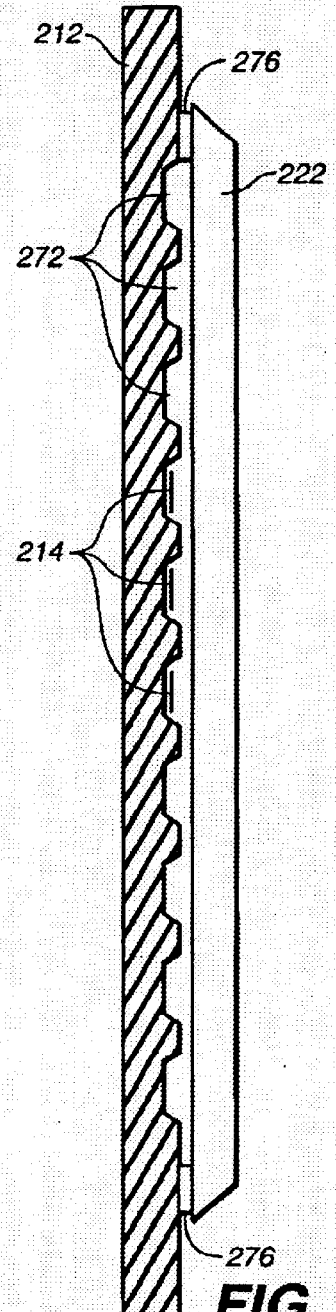
FIG._22b
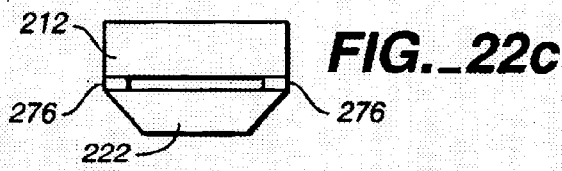
FIG._22c

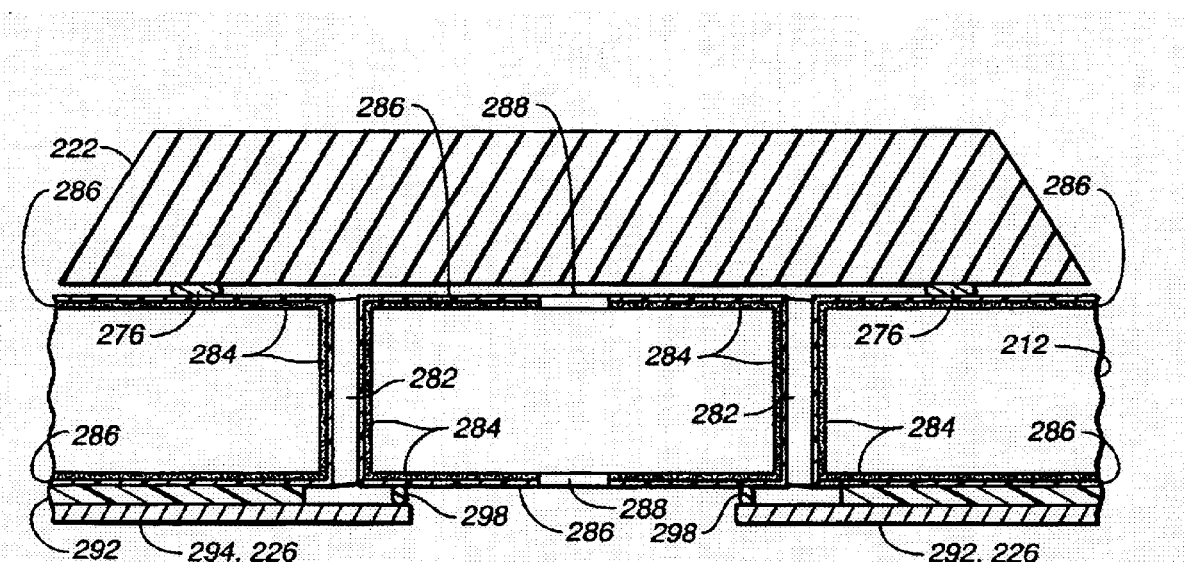
FIG._22d
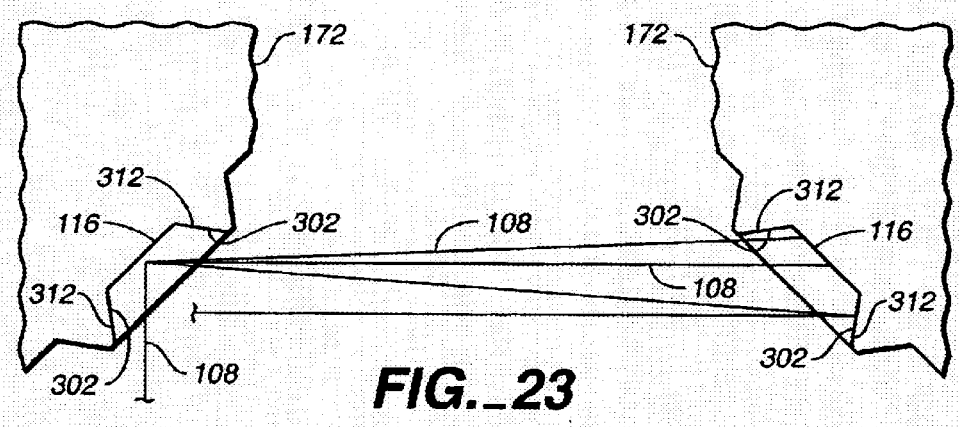
FIG._23
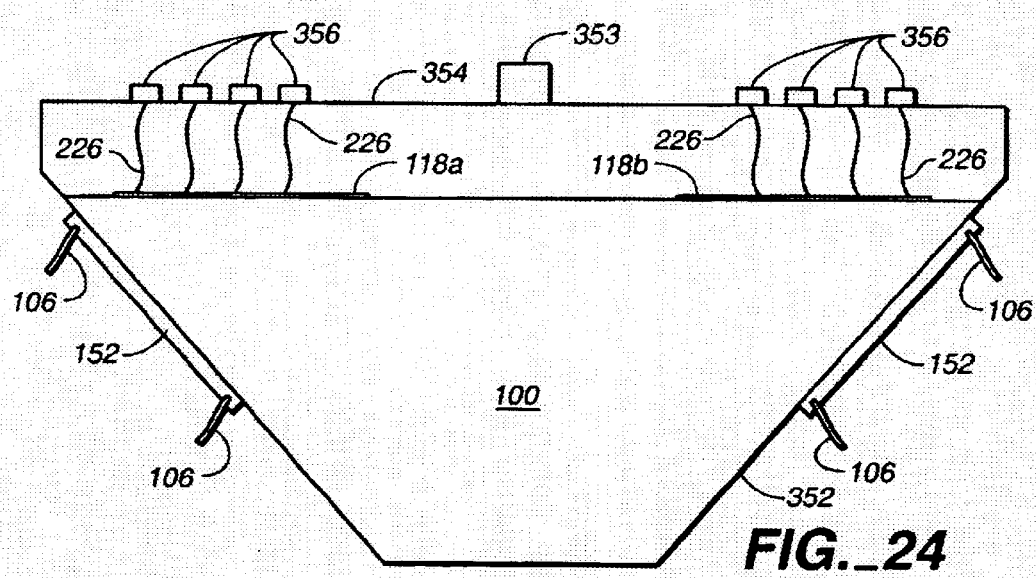
FIG._24

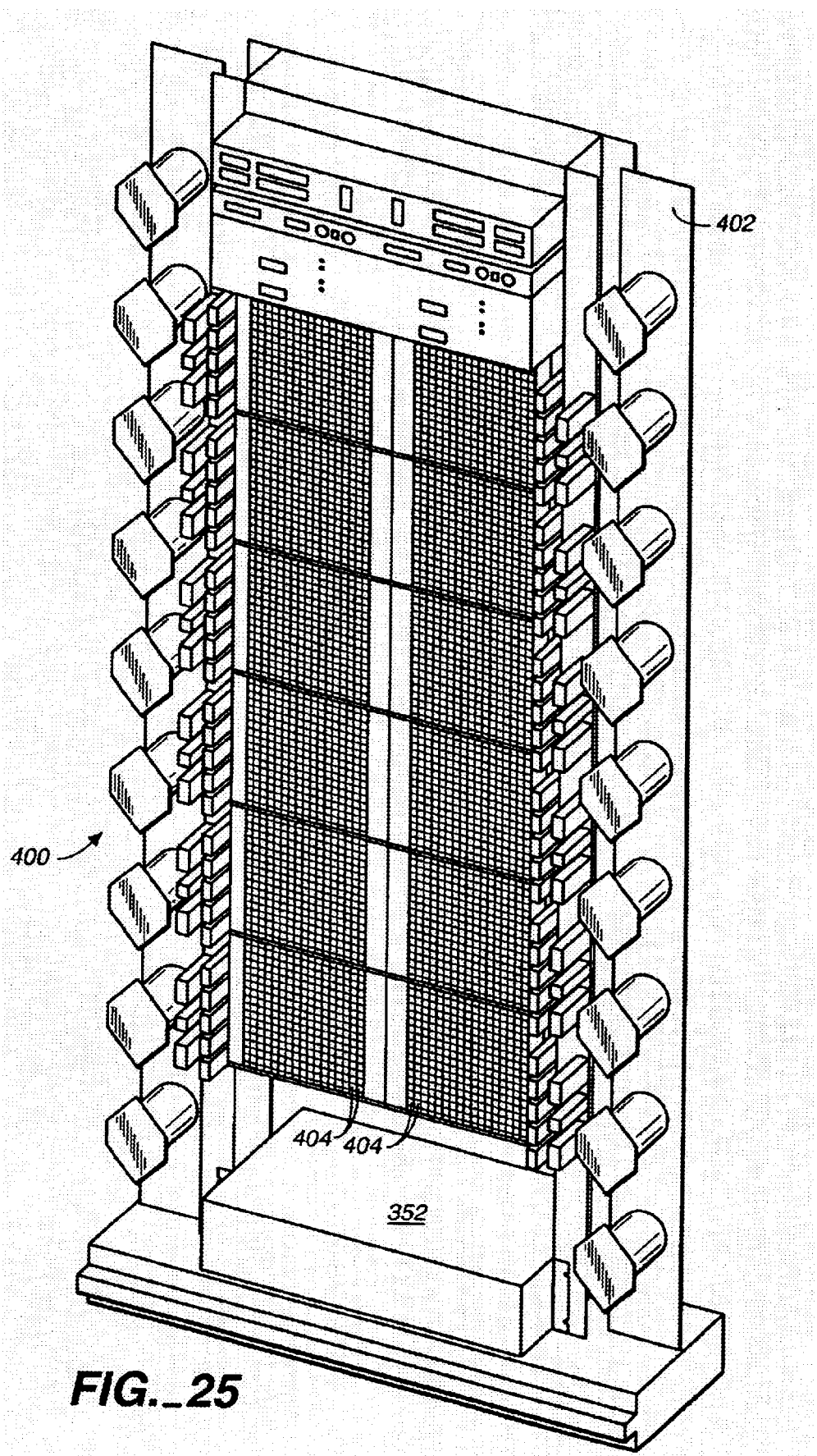
FIG._25

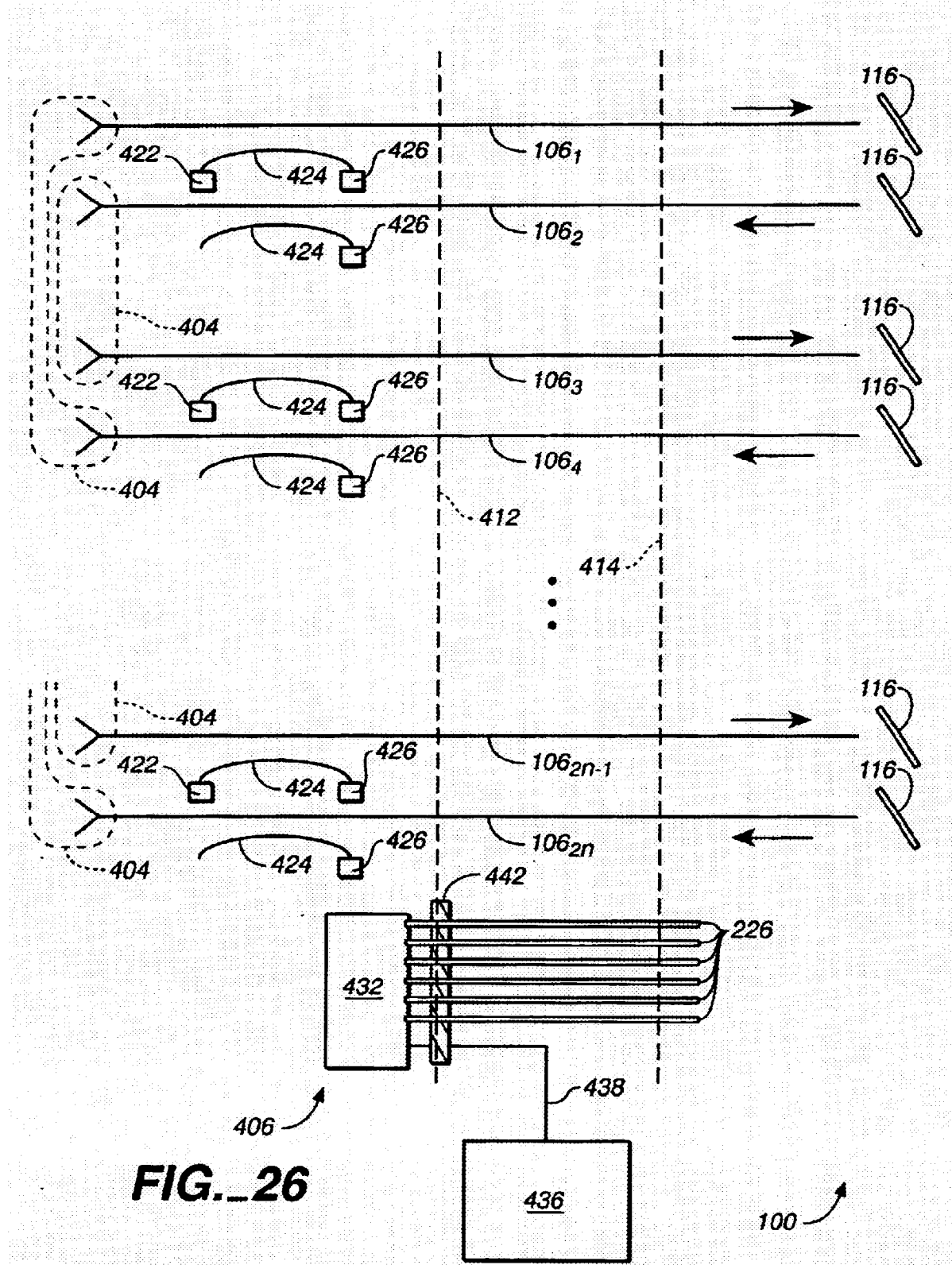
FIG._26

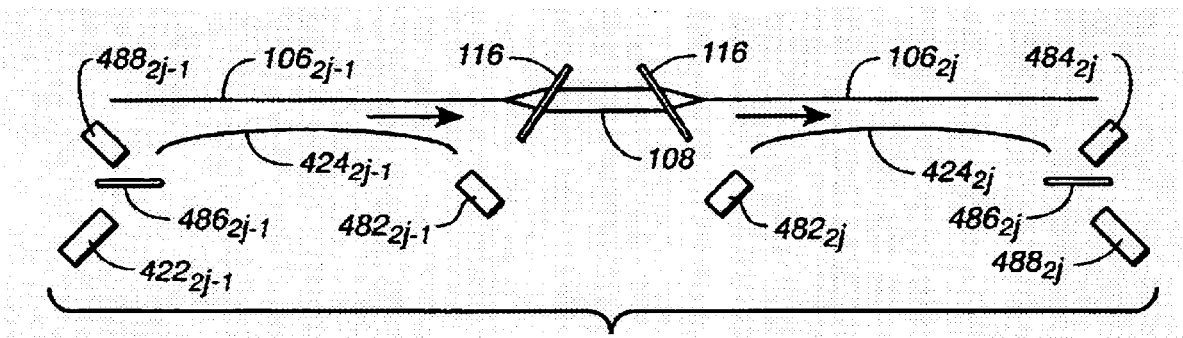
FIG._26a
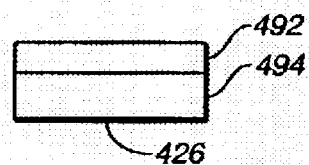
FIG._26b
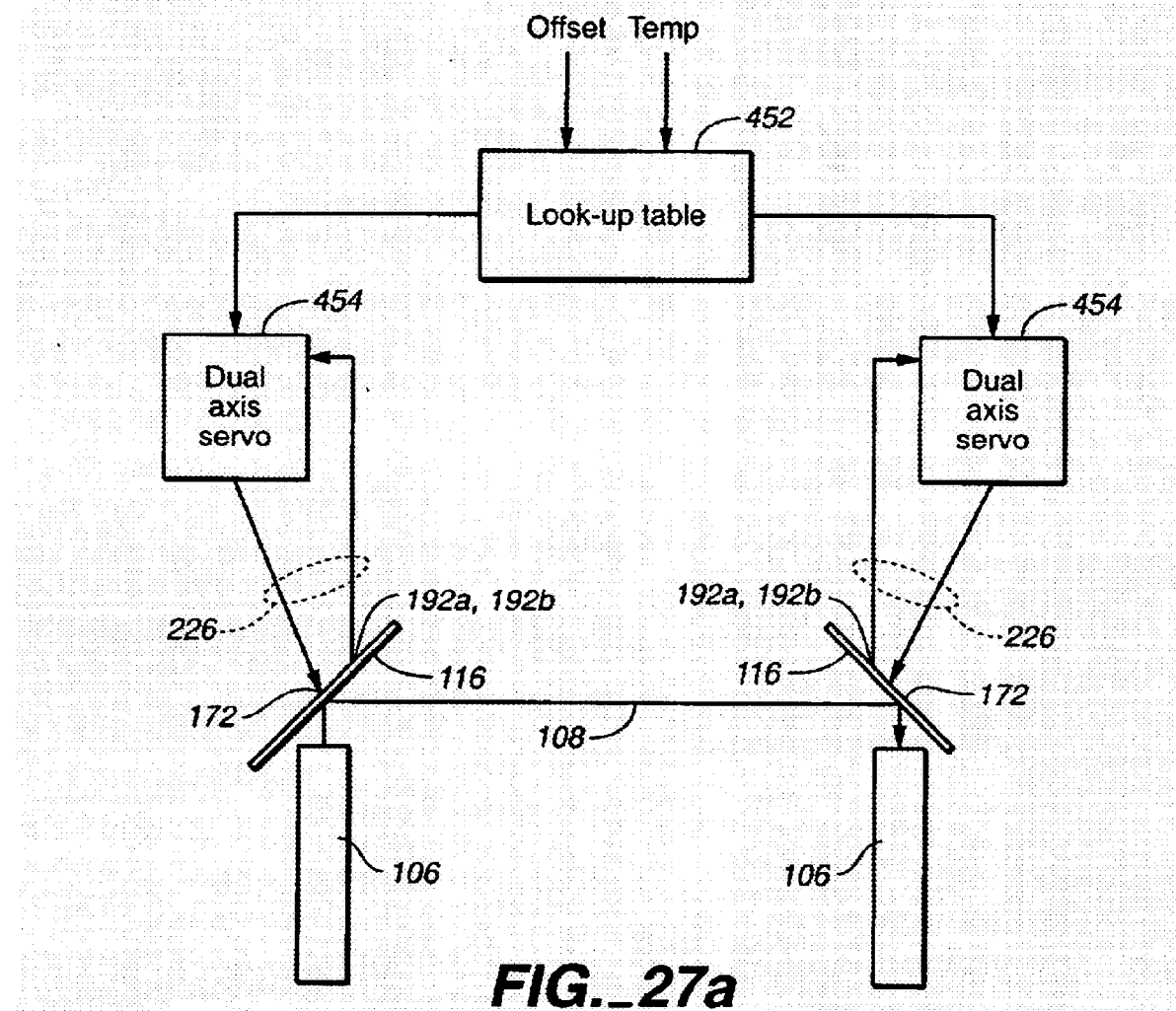
FIG._27a

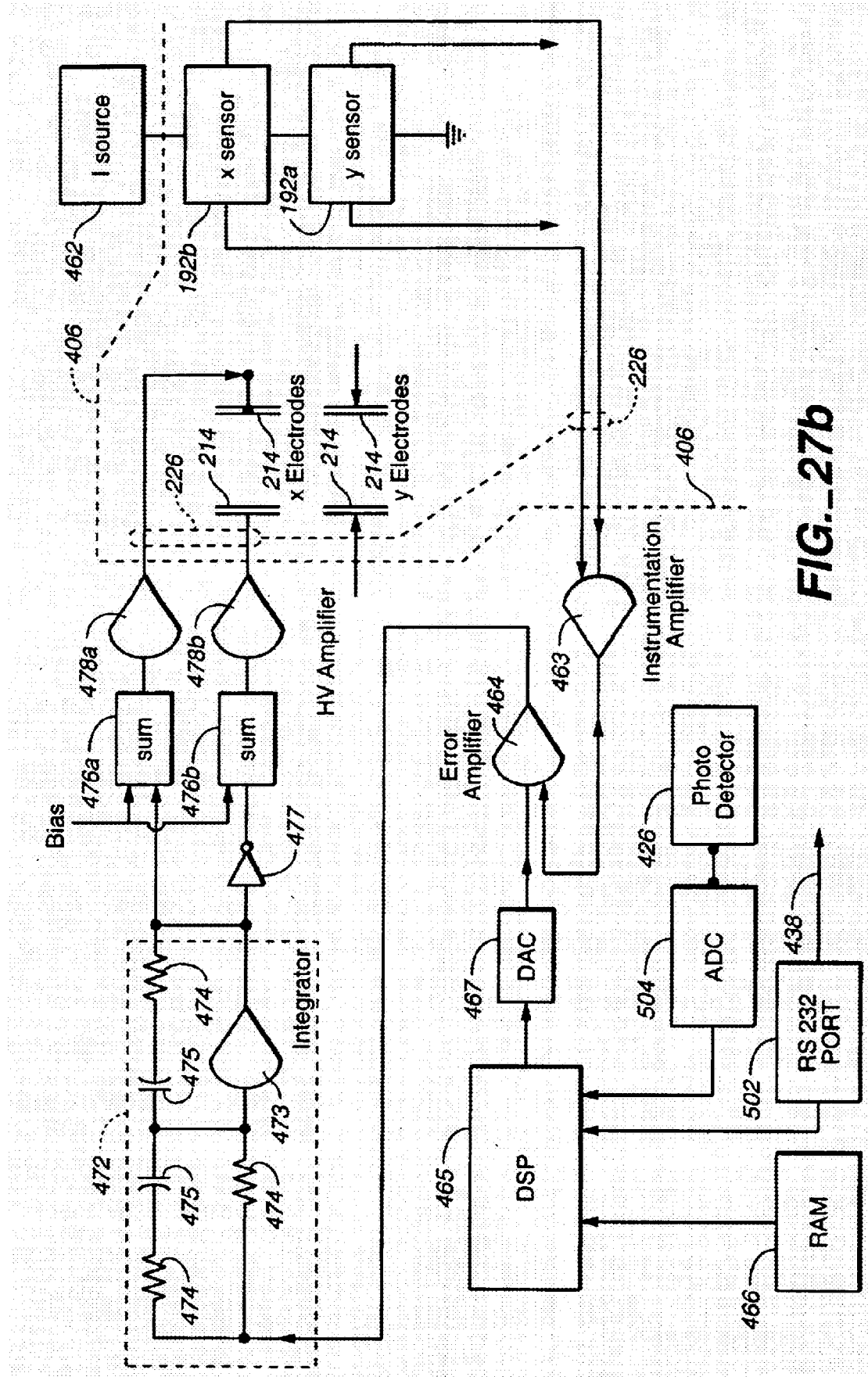
FIG._27b

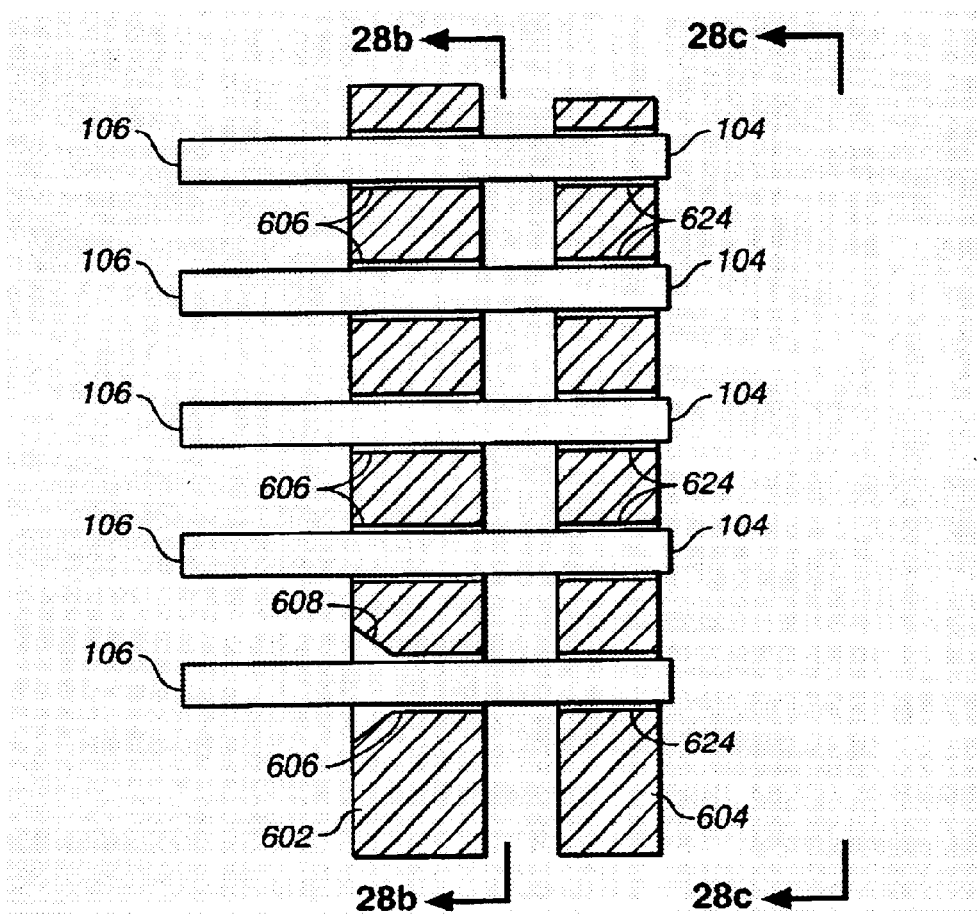
FIG._28a
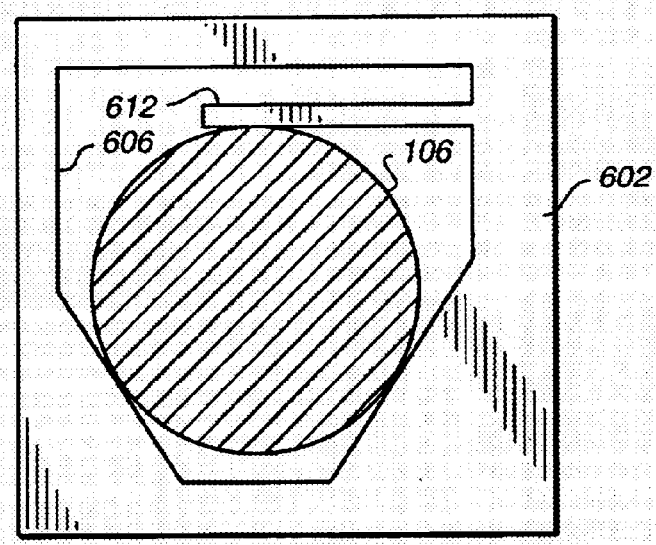
FIG._28b

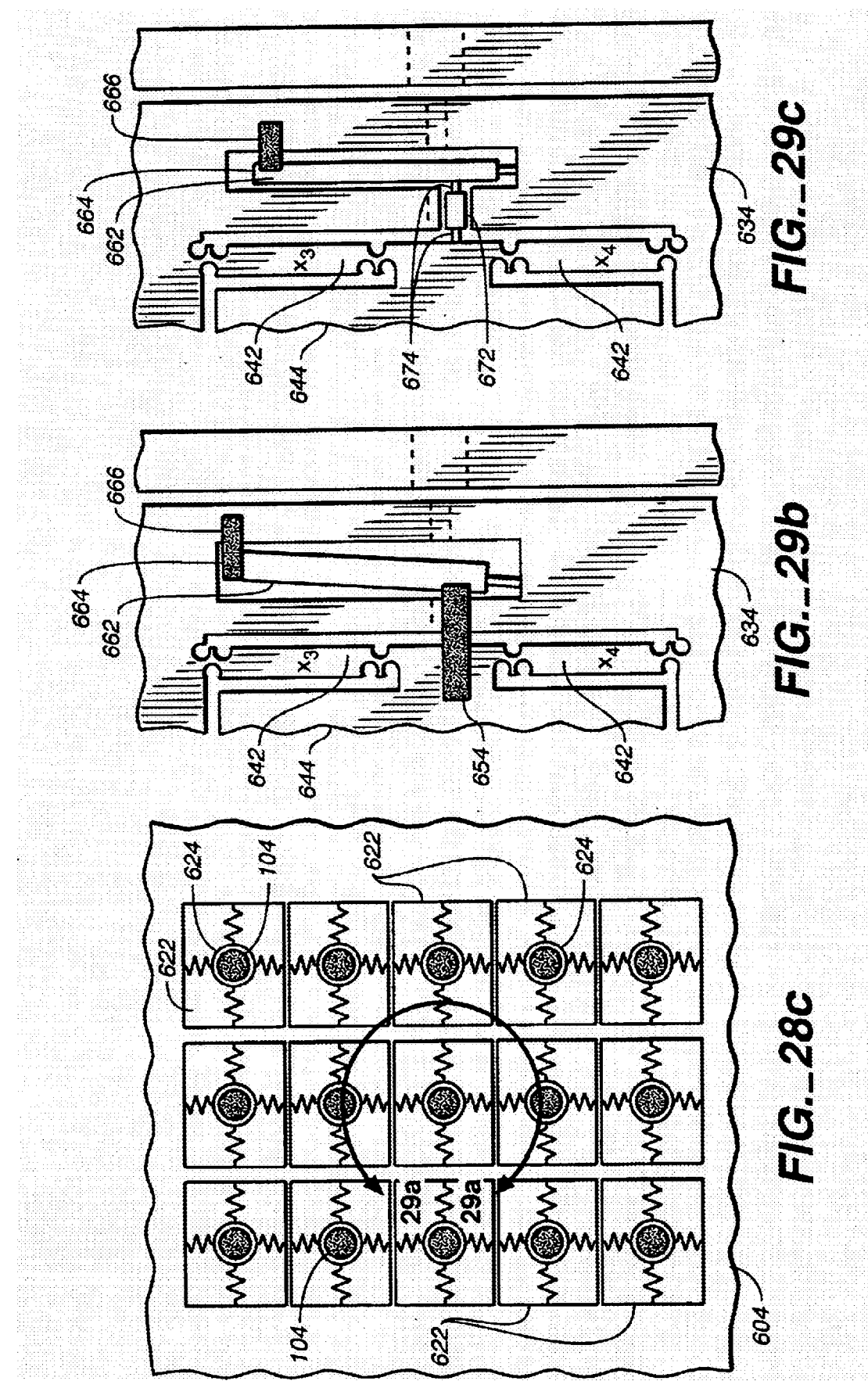

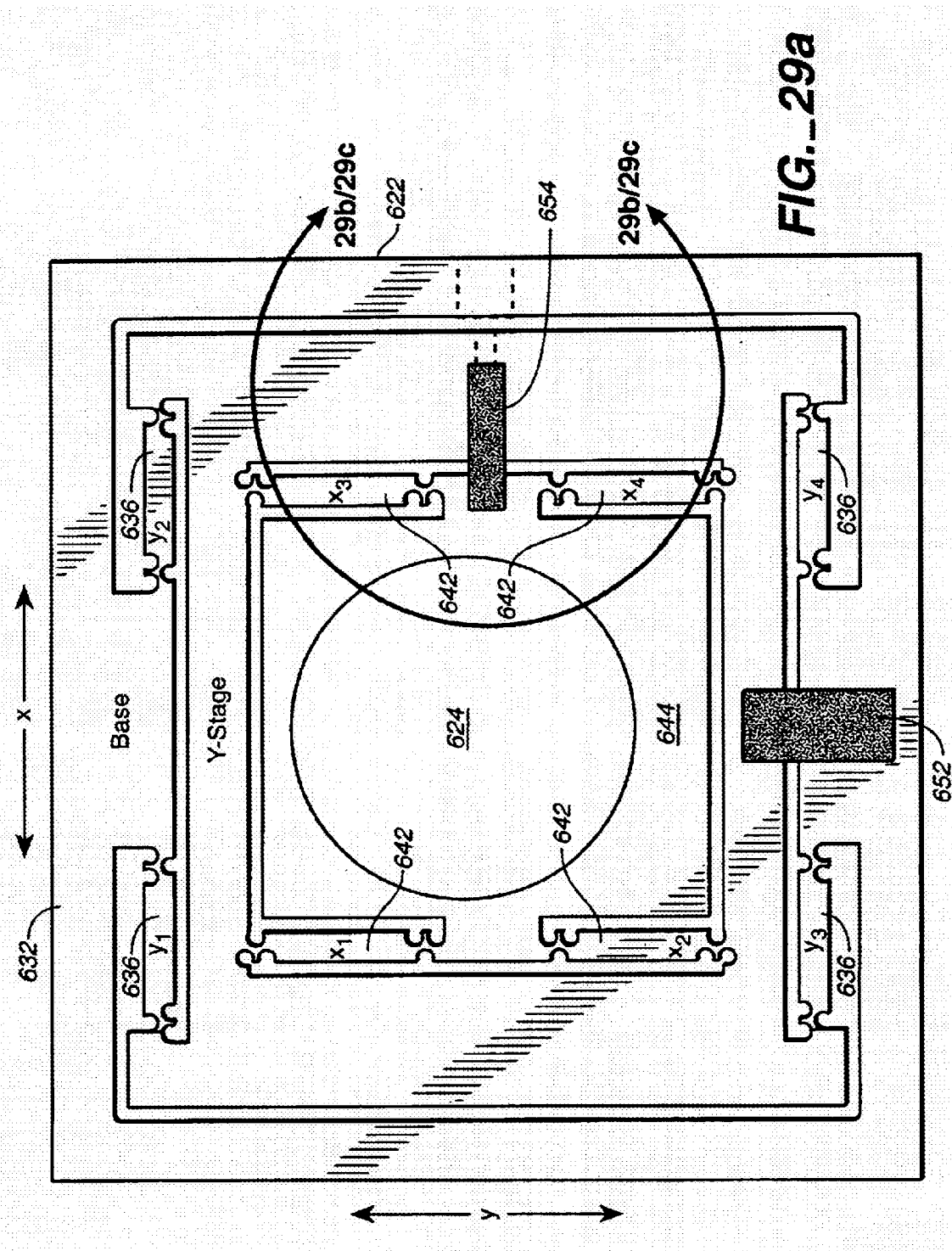

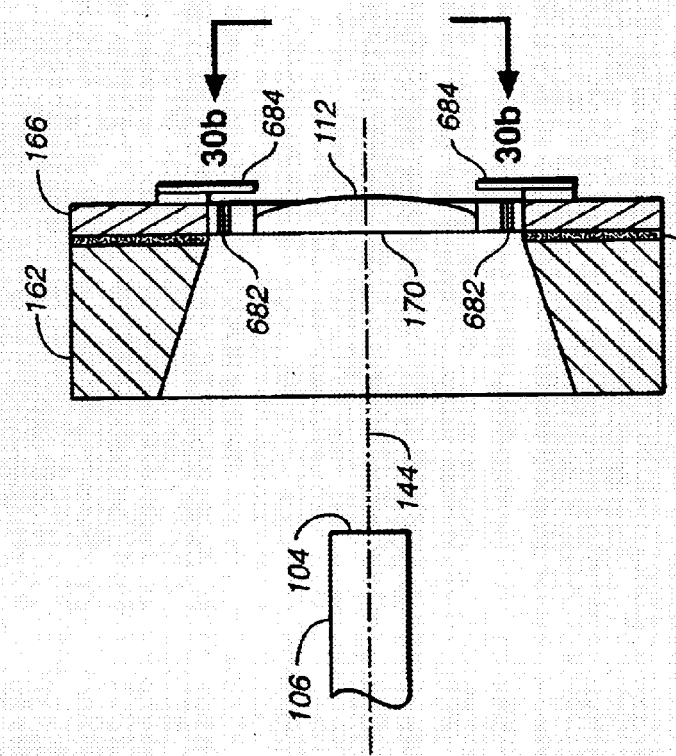
FIG._30a
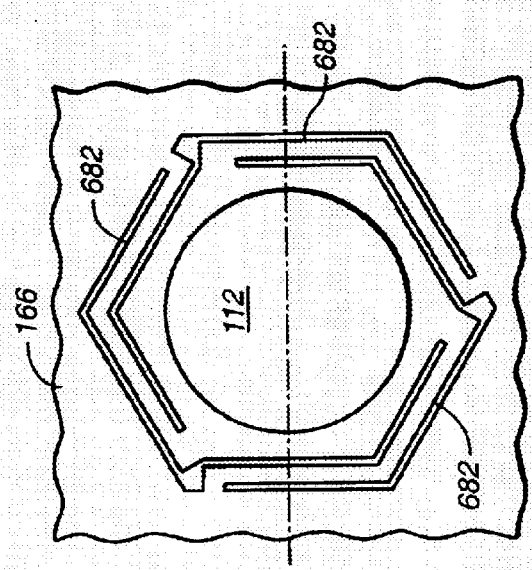
FIG._30b
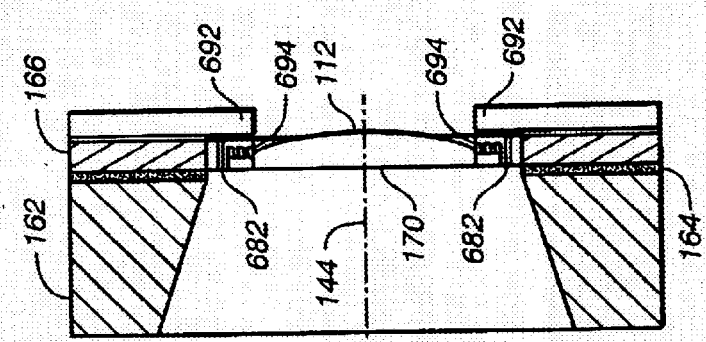
FIG._30c

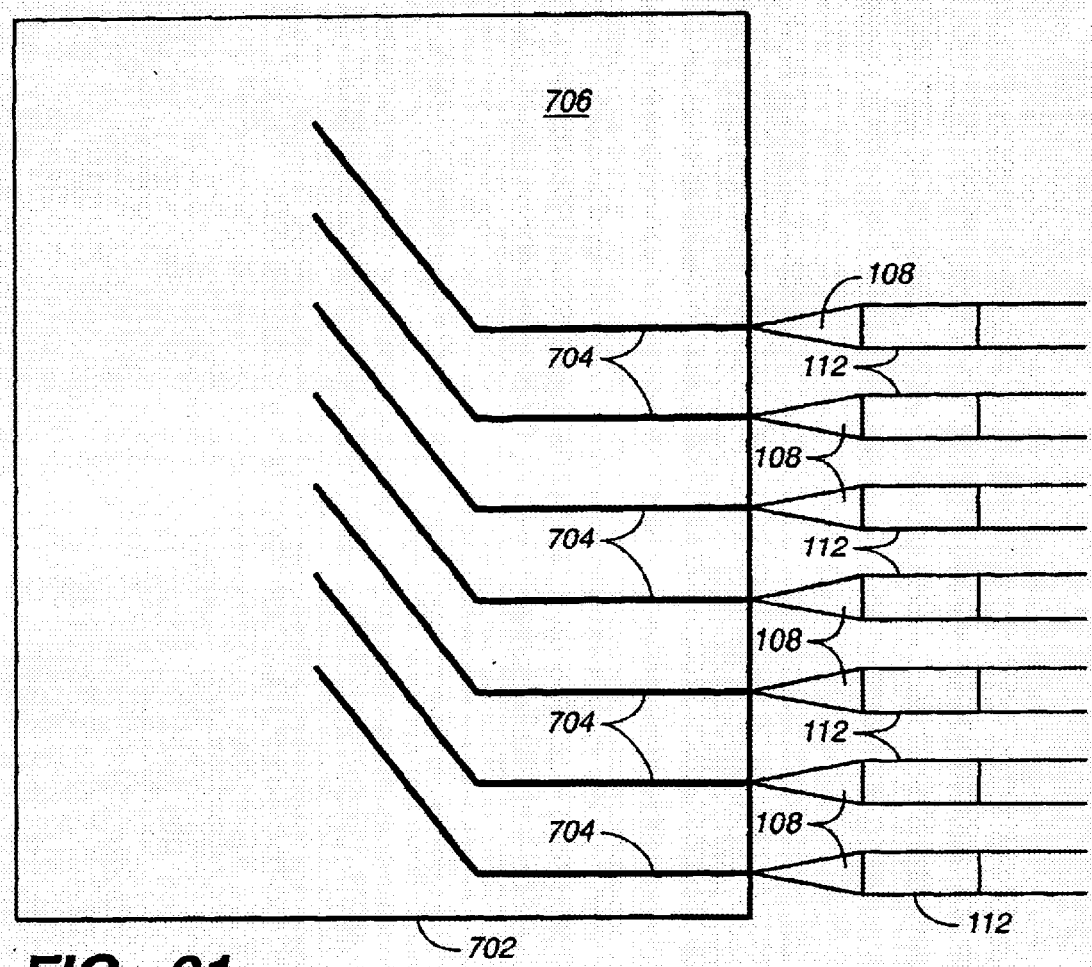
FIG._31

FLEXIBLE, MODULAR, COMPACT FIBER OPTIC SWITCH

This is a continuation of application Ser. No. 09/446,540 filed under 37 C.F.R. §371 on Dec. 21, 1999, now U.S. Pat. No. 6,445,844, and which claims priority from Patent Cooperation Treaty ("PCT") international application PCT/US99/21139 that was filed with the United States Patent and Trade-mark Office ("USPTO") Receiving Office (RO/US) on Sep. 15, 1999.

TECHNICAL FIELD

The present invention relates generally to the technical field of fiber optics, and, more particularly, to free-space, reflective N×N fiber optic switches.

BACKGROUND ART

A dramatic increase in telecommunications during recent years, which may be attributed largely to increasing Internet communications, has required rapid introduction and commercial adoption of innovations in fiber optic telephonic communication systems. For example, recently fiber optic telecommunication systems have been introduced and are being installed for transmitting digital telecommunications concurrently on 4, 16, 32, 64 or 128 different wavelengths of light that propagate along a single optical fiber. While multi-wavelength fiber optic telecommunications dramatically increases the bandwidth of a single optical fiber, that bandwidth increase is available only at both ends of the optical fiber, e.g. between two cities. When light transmitted into one end of the optical fiber arrives at the other end of the optical fiber, there presently does not exist a flexible, modular-, compact, N×N fiber optic switch which permits automatically forwarding light received at one end of the optical fiber onto a selected one of several different optical fibers which will carry the light onto yet other destinations.

Historically, when telecommunications were transmitted by electrical signals via pairs copper wires, at one time a human being called a telephone operator sat at a manually operated switchboard and physically connected an incoming telephone call, received on one pair of copper wires, that were attached to a plug, to another pair of copper wires, that were attached to a socket, to complete the telephone circuit. The telephone operator's task of manually interconnecting pairs of wires from two (2) telephones to establish the telephone circuit was first replaced by an electromechanical device, called a crossbar switch, which automated the operator's manual task in response to telephone dialing signals. During the past forty years, the electromechanical crossbar switch for electrical telecommunications has been replaced by electronic switching systems.

Presently, switches for fiber optic telephonic communications exist which perform functions for fiber optic telephonic communications analogous to or the same as the crossbar switch and electronic switching systems perform for electrical telephonic communications. However, the presently available fiber optic switches are far from ideal. That is, existing fiber optic telecommunications technology lacks a switch that performs the same function for optical telecommunications as that performed by electronic switching systems for large numbers of optical fibers.

One approach used in providing a 256×256 switch for fiber optic telecommunications first converts light received from an incoming optical fiber into an electrical signal, then transmits the electrical signal through an electronic switching network. The output signal from that electronic switching network is then used to generate a second beam of light that then passes into an output optical fiber. As those familiar with electronics and optical fiber telecommunications recognize, the preceding approach for providing a 256×256 fiber optic switch is physically very large, requires electrical circuits which process extremely high-speed electronic signals, and is very expensive.

Attempting to avoid complex electronic circuits and conversions between light and electronic signals, various proposals exist for assembling a fiber optic switch that directly couples a beam of light from one optical fiber into another optical fiber. One early attempt to provide a fiber optic switch, analogous to the electrical crossbar switch, mimics with machinery the actions of a telephone operator only with optical fibers rather than for pairs of copper wires. U.S. Pat. No. 4,886,335 entitled "Optical Fiber Switch System" that issued Dec. 12, 1989, includes a conveyor that moves ferrules attached to ends of optical fibers. The conveyer moves the ferrule to a selected adapter and plugs the ferrule into a coupler/decoupler included in the adapter. After the ferrule is plugged into the coupler/decoupler, light passes between the optical fiber carried in the ferrule and an optical fiber secured in the adapter.

U.S. Pat. No. 5,864,463 entitled "Miniature 1×N Electromechanical Optical Switch And Variable Attenuator" which issued Jan. 26, 1999, ("the '463 patent") describes another mechanical system for selectively coupling light between one optical fiber and one of a number of optical fibers. This patent discloses selectively coupling light between one optical fiber and a selected optical fiber by mechanically moving an end of one optical fiber along a linear array of ends of the other optical fibers. The 1×N switch uses a mechanical actuator to coarsely align the end of the one optical fiber to a selected one of the other optical fibers within 10 $\mu$m. The 1×N switch, using light reflected back into the moving optical fiber from the immediately adjacent end of the selected optical fiber, then more precisely aligns the end of the input optical fiber to the output optical fiber. U.S. Pat. No. 5,699,463 entitled "Mechanical Fiber Optic Switch" that issued Dec. 16, 1997, also aligns an end of one optical fiber to one of several other optical fibers assembled as a linear array, but interposes a lens between ends of the two optical fibers.

U.S. Pat. No. 5,524,153 entitled "Optical Fiber Switching System And Method Of Using Same" that issued Jun. 4, 1996, ("the '153 patent") disposes two (2) optically opposed groups of optical fiber switching units adjacent to each other. Each switching unit is capable of aligning any one of its optical fibers with any one of the optical fibers of the optically opposed group of switching units. Within the switching unit, an end of each optical fiber is positioned adjacent to a beamforming lens, and is received by a two-axis piezoelectric bender. The two-axis piezoelectric bender is capable of bending the fiber so light emitted from the fiber points at a specific optical fiber in the optically opposed group of switching units. Pulsed light generated by radiation emitting devices ("REDs") associated with each optical fiber pass from the fiber to the selected optical fiber in the opposing group. The pulsed light from the RED received by the selected optical fiber in the opposing group is processed to provide a signal that is fed back to the piezoelectric bender for pointing light from the optical fiber directly at the selected optical fiber.

Rather than mechanically effecting alignment of a beam of light from one optical fiber to another optical fiber either by translating or by bending one or both optical fibers, optical switches have been proposed that employ micromachined moving mirror arrays to selectively couple light emitted from an input optical fiber to an output optical fiber. Papers presented at OFC/IOOC '99, Feb. 21–26, 1999, describe elements that could be used to fabricate s a three (3) stage fully non-blocking fiber optic switch, depicted graphically in FIG. 1. This fiber optic switch employs moving mirror arrays in which each polysilicon mirror can selectively reflect light at a 90° angle. In this proposed fiber optic switch, rows of relatively small 32×64 optical switching arrays $52a_i$ (i=1, 2 ... 32) and $52b_k$ (k=1, 2 ... 32) receive light from or transmit light to thirty-two (32) input or output optical fibers $54a_n$ and $54b_n$. Thirty-two groups of sixty-four (64) optical fibers $56a_{l,m}$ and $56b_{l,m}$ carry light between each of the 32×64 optical switching arrays $52a_i$ and $52b_k$ and one of sixty-four 32×32 optical switching arrays $58_j$ (j=1, 2 ... 64).

The complexity of the fiber optic switch illustrated in FIG. 1 is readily apparent. For example, a 1024×1024 fiber optic switch assembled in accordance with that proposal requires 4096 individual optical fibers for interconnecting between the 32×64 optical switching arrays $52a_i$ and $52b_k$ and the 32×32 optical switching arrays $58_j$. Moreover, the 32×64 optical switching arrays $52a_i$ and $52b_k$ and 32×32 optical switching arrays $58_j$ require a total of 196,608 micromachined mirrors.

The polysilicon mirrors proposed for the fiber optic switch illustrated in FIG. 1 are curved rather than optically flat. Furthermore, while those mirrors possess adequate thermal dissipation for switching a single 0.3 mW wavelength of light and perhaps even a few such wavelengths, they are incapable of switching even ten (10) or twenty (20) such wavelengths. However, as described above fiber optic telecommunications systems are already transmitting many more than twenty (20) wavelengths over a single optical fiber, and, if not already, will soon be transmitting hundreds of wavelengths. If instead of a single wavelength of light one optical fiber carries 300 different wavelengths of light each having a power of 0.3 mW, then 100 mW of power impinges upon the polysilicon mirror proposed for this fiber optic switch. If the polysilicon mirror reflects 98.5% of that light, the mirror must absorb substantially all of the remainder, i.e. 1.5 mW of power. Absorption of 1.5 mW of power would likely heat the thermally non-conductive polysilicon mirror to unacceptable temperatures which would further degrade mirror flatness.

DISCLOSURE OF INVENTION

The present invention provides a fiber optic switch capable of concurrently coupling incoming beams of light carried on more than 1,000 individual optical fibers to more than 1,000 outgoing optical fibers.

An object of the present invention is to provide a simpler fiber optic switch that is capable of switching among a large number of incoming and outgoing beams of light carried on optical fibers.

Another object of the present invention is to provide an efficient fiber optic switch that is capable of switching among a large number of incoming and outgoing beams of light carried on optical fibers.

Another object of the present invention is to provide a fiber optic switch which has low cross-talk between communication channels.

Another object of the present invention is to provide a fiber optic switch which has low cross-talk between communication channels during switching thereof.

Another object of the present invention is to provide an highly reliable fiber optic switch.

Another object of the present invention is to provide a fiber optic switch that does not exhibit dispersion.

Another object of the present invention is to provide a fiber optic switch that is not polarization dependent.

Another object of the present invention is to provide a fiber optic switch that is fully transparent.

Another object of the present invention is to provide a fiber optic switch that does not limit the bitrate of fiber optic telecommunications passing through the switch.

Briefly the present invention is a fiber optic switch that includes a fiber optic switching module that receives and fixes ends of optical fibers. In addition to receiving and fixing ends of optical fibers, the fiber optic switching module includes a plurality of reflective light beam deflectors which may be selected as pairs to be oriented responsive to drive signals for coupling a beam of light between a pair of optical fibers fixed in the fiber optic switching module. The fiber optic switching module also produces orientation signals from each light beam deflector which indicate its orientation.

In addition to the fiber optic switch module, the fiber optic switch also includes at least one portcard that supplies the drive signals to the fiber optic switching module for orienting at least one light beam deflector included therein. Furthermore, the portcard also receives the orientation signals produced by that light beam deflector together with coordinates that specify an orientation for the light beam deflector. The portcard compares the received coordinates with the orientation signals received from the light beam deflector and adjusts the drive signals supplied to the fiber optic switching module to reduce any difference between the received coordinates and the orientation signals.

In a preferred embodiment, the fiber optic switching module of the fiber optic switch includes a first and a second group of optical fiber receptacles which are separated from each other at opposite ends of a free space optical path. Each of these groups of optical fiber receptacles are adapted for receiving and fixing ends of optical fibers. The fiber optic switching module includes lenses juxtaposed with ends of optical fibers fixed respectively at the first and second groups and disposed along the optical path between the groups. Each of these lenses are respectively disposed with respect to an end of an associated optical fiber of the first or second group so that a beams of light as may be emitted from the end of the optical fiber pass through the immediately adjacent lens to propagate as a quasi-collimated beams through the optical path from the lens toward the second or first group of optical fiber receptacles.

The preferred embodiment of the fiber optic switch also includes a first and a second sets of reflective light beam deflectors that are both disposed along the optical path between the groups of optical fiber receptacles. Each of the sets of light beam deflectors are associated with one of the groups of optical fiber receptacles and have a number of light beam deflectors that equals the optical fibers in the group with which it is associated. Each of the light beam deflectors in the first or the second set is:

1. associated with one of the optical fibers in the associated group of optical fiber receptacles;
2. along the optical path so the quasi-collimated beam of light as may be emitted from the lens associated with the optical fiber impinges upon the light beam deflector to be reflected therefrom through the optical path; and
3. energizable by drive signals supplied to the fiber optic switching module to be oriented for reflecting the quasi-collimated beam of light as may be emitted from the associated optical fiber to also reflect off a selected one of the light beam deflectors in the second or the first set.

In this way a pair of light beam deflectors, one light beam deflector of the pair belonging to the first set and one belonging to the second set, may be selected and oriented by the drive signals supplied to them to couple a quasi-collimated beam of light propagating through the optical path from the end of one optical fiber fixed in an optical fiber receptacle either of the first or of the second group to reflect sequentially off the pair of energized light beam deflectors into a selected one of the optical fiber receptacles so as to enter an optical fiber as may be fixed at the second or at the first group of optical fiber receptacles.

In a preferred embodiment the portcard of the fiber optic switch includes a driver circuit for supplying the drive signals to the fiber optic switching module for orienting at least one light beam deflector included in the fiber optic switching module. The portcard also includes a dual axis servo that receives coordinates which specify an orientation for the light beam deflector, and also receives the orientation signals produced by that light beam deflector. The portcard compares the received coordinates with the orientation signals received from the light beam deflector and adjusts the drive signals supplied to the fiber optic switching module to reduce any difference between the received coordinates and the orientation signals.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1 is a block diagram illustrating a proposed, prior art three (3) stage fully non-blocking fiber optic switch;

FIG. 2 is a plan view ray tracing diagram illustrating propagation of light beams through a trapezoidally-shaped free space, convergent beam N×N reflective switching module in accordance with the present invention;

FIG. 3 is a plan or elevational schematic diagram illustrating a single beam of light as may propagate between sides A and B of the trapezoidally-shaped free space, convergent beam N×N reflective switching module depicted in FIG. 2 in accordance with the present invention;

FIG. 4a is a perspective view ray tracing diagram illustrating propagation of light beams through an alternative embodiment, rectangularly-shaped free space, convergent beam N×N reflective switching module in accordance with the present invention;

FIG. 4b is plan view ray tracing diagram illustrating propagation of convergent light beams through the rectangularly-shaped reflective switching module illustrated in FIG. 4a in accordance with the present invention;

FIG. 5 is a plan view ray tracing diagram illustrating propagation of light beams through an alternative embodiment, polygonally-shaped free space, convergent beam N×N reflective switching module in accordance with the present invention;

FIG. 6 is a plan view ray tracing diagram illustrating propagation of light beams through a trapezoidally-shaped free space, convergent beam reflective switching module in accordance with the present invention that permits coupling a beam of light between any arbitrarily chosen pair of optical fibers;

FIG. 7 is a plan view ray tracing diagram illustrating propagation of light beams through an alternative trapezoidally-shaped free space, convergent beam N×N reflective switching module in accordance with the present invention which is more compact than the N×N reflective switching module depicted in FIG. 5;

FIG. 8a is an elevational view illustrating a preferred, cylindrically shaped micro-lens adapted for use in the N×N reflective switching module;

FIG. 8b is an elevational view illustrating a micro-lens adapted for use in the N×N reflective switching module that permits closer spacing between lenses and fibers;

FIG. 9 is a partially cross-sectioned elevational view illustrating a block included both in the side A and in side B of the N×N reflective switching module depicted in FIG. 7 that receives tapered optical fiber collimator assemblies;

FIG. 10 is a partially cross-sectioned plan view illustrating the block depicted in FIG. 9 that receives tapered optical fiber collimator assemblies;

FIG. 11 is a partially cross-sectioned elevational view illustrating a micro-lens adapted for use in the N×N reflective switching module for concurrently switching light carried by a duplex pair of optical fibers;

FIG. 12 is an elevational view illustrating a preferred type of silicon wafer substrate used in fabricating torsional scanners;

FIG. 13 is a plan view illustrating a 2D electrostatically energized torsional scanner particularly adapted for use in reflective switching modules such as those illustrated in FIGS. 2, 4a–4b, 5, 6 and 7;

FIG. 14 is an enlarged plan view illustrating a torsional flexure hinge used in the torsional scanner taken along the line 14—14 in FIG. 13;

FIG. 15 is a schematic cross-sectional elevational view illustrating a torsional scanner disposed above an insulating substrate having electrodes deposited thereon with a beam of light reflecting off a mirror surface located on the backside of a device layer;

FIGS. 15a and 15b are alternative plan views of the electrodes and a portion of the insulating substrate taken along the line 15a/15b—15a/15b in FIG. 15.

FIG. 16a is an elevational view illustrating a strip of torsional scanners adapted for use in reflective switching modules such as those illustrated in FIGS. 2, 4a–4b, 5, 6 and 7;

FIG. 16b is a cross-sectional plan view taken along the line 16b—16b in FIG. 16a illustrating overlapping immediately adjacent strips of torsional scanners to reduce the horizontal distance between immediately adjacent strips;

FIG. 16c is an elevational view illustrating a preferred strip of torsional scanners adapted for use in reflective switching modules such as those illustrated in FIGS. 2, 4a–4b, 5, 6 and 7;

FIG. 16d is a cross-sectional plan view illustrating the preferred strip of torsional scanners taken along the line 16d—16d in FIG. 16c;

FIG. 16e is across-sectional plan view taken along the line 16d—16d in FIG. 16a illustrating juxtaposition of the strips of torsional scanners depicted in FIG. 16c;

FIG. 17a is a plan view illustrating vertically offset strips of torsional scanners which permits a denser arrangement of optical fibers in reflective switching modules such as those illustrated in FIGS. 2, 4a–4b, 5, 6 and 7;

FIG. 17b is a plan view illustrating an even denser packing of offset rows or columns of torsional scanners that may be employed if all the torsional scanners are fabricated as a single monolithic array rather than in strips;

FIG. 18a is a plan view illustrating an alternative embodiment of the torsional scanner in which the outer torsional flexure hinges are oriented diagonally with respect to the scanner's outer frame;

FIG. 18b is a plan view illustrating an array of torsional scanner of the type illustrated in FIG. 18a;

FIG. 19a is a plan view illustrating an alternative embodiment of the torsional scanner in which the inner torsional flexure hinges are oriented along a diagonal of the scanner's non-square mirror plate;

FIG. 19b is a plan view illustrating an alternative embodiment of the torsional scanner depicted in FIG. 19a in which both pairs of torsional flexure hinges are suitably oriented with respect to crystallographic directions of silicon to permit fabrication of torsion sensors therein that have optimum characteristics;

FIG. 20a is an elevational view illustrating a dense arrangement of the torsional scanner illustrated in FIG. 18a adapted for inclusion in reflective switching modules such as those illustrated in FIGS. 2, 4a–4b, 5, 6 and 7;

FIG. 20b is an elevational view illustrating a dense arrangement of the torsional scanner illustrated in FIG. 19a adapted for inclusion in reflective switching modules such as those illustrated in FIGS. 2, 4a–4b, 5, 6 and 7;

FIG. 21 is a schematic cross-sectional elevational view illustrating an alternative embodiment strip of torsional scanners fastened to a substrate which also carries a mirror strip thereby permitting an arrangement in which collimator lenses and ends of optical fibers are positioned close to mirror surfaces on the torsional scanners;

FIGS. 22a is a front elevational view of a strip of torsional scanners flip-chip bonded to a substrate;

FIGS. 22b is a cross-sectioned, side elevational view of the strip of torsional scanners flip-chip bonded to the substrate taken along the line 22b—22b in FIG. 22a;

FIGS. 22c is a top view of the strip of torsional scanners that is flip-chip bonded to the substrate taken along the line 22c—22c in FIG. 22a;

FIGS. 22d is a cross-sectioned, side elevational views of the strip of torsional scanners flip-chip bonded to a silicon substrate having vias formed therethrough;

FIG. 23 is a ray tracing diagram illustrating scattering of light from portions of a torsional scanner that surrounds the mirror surface thereof;

FIG. 24 is a system level block diagram illustrating reflective switching modules such as those illustrated in FIGS. 2, 4a–4b, 5, 6 and 7;

FIG. 25 is a perspective drawing illustrating a modular fiber optic switch in accordance with the present invention;

FIG. 26 is a overall block diagram for modular fiber optic switch depicted in FIG. 25 including a portcard and the reflective switching module;

FIG. 26a is a diagram illustrating one embodiment of photo-detectors that may be used in an optical alignment servo for precisely orienting a pair of mirrors included in the reflective switching module;

FIG. 26b is a diagram illustrating a compound photo-detector that may be used in an optical alignment servo for precisely orienting a pair of mirrors included in the reflective switching module;

FIG. 27a is a block diagram illustrating a servo system which ensures precise alignment of mirrors included in a reflective switching module included in the modular fiber optic switch depicted in FIG. 25, such as one of the reflective switching modules illustrated in FIGS. 2, 4a–4b, 5, 6 and 7;

FIG. 27b is a block diagram illustrating one channel, either x-axis or y-axis, of a dual axis servo included in the servo system depicted in FIG. 27a;

FIG. 28a is a partially cross-sectioned elevational view illustrating an alternative embodiment double plate structure for receiving and fixing an array of optical fibers;

FIG. 28b is an elevational view illustrating a profile for one type of hole that may be formed through one of the plates taken along the line 28b—28b in FIG. 28a;

FIG. 28c is an elevational view illustrating an array of XY micro-stages formed in one of the plates taken along the line 28c—28c in FIG. 28a;

FIG. 29a is an elevational view illustrating an XY micro-stage of a type included array taken along the line 29a–298 in FIG. 28c;

FIGS. 29b and 29c are elevational views illustrating a portion of alternative embodiment XY micro-stages taken along the line 29b/29c—29b/29c in FIG. 29a;

FIG. 30a is a partially cross-sectioned view illustrating a lens micromachined from a silicon substrate that can be electrostatically activated to move along the lens' longitudinal axis;

FIG. 30b is an elevational view illustrating the silicon micromachined lens taken along the line 30b—30b in FIG. 30a;

FIG. 30c is a partially cross-sectioned view illustrating a lens micromachined from a silicon substrate, similar to the lens illustrated in FIG. 30a, that can be electro-magnetically activated to move along the lens' longitudinal axis; and FIG. 31, is an elevational view that illustrates coupling beams of light from a routing wavelength demultiplexer directly into one of the reflective switching modules illustrated in FIGS. 2, 4a–4b, 5, 6 and 7.

BEST MODE FOR CARRYING OUT THE INVENTION

Free Space
Convergent Beam
Double Bounce

Reflective Switching Module

FIG. 2 depicts ray tracings for light beams propagating through a trapezoidally-shaped, convergent beam, double bounce N×N reflective switching module in accordance with the present invention that is referred to by the general reference character 100. The N×N reflective switching module 100 includes sides 102a and 102b which are spaced apart from each other at opposite ends of a C-shaped free space optical path. Although as described below other geometrical relationships for the sides 102a and 102b may occur for other configurations of the N×N reflective switching module 100, for the embodiment of the N×N reflective switching module 100 illustrated in FIG. 2 having the C-shaped free space optical path the sides 102a and 102b are preferably coplanar. Both side 102a and side 102b are adapted to receive and fix ends 104 of N optical fibers 106, for example one-thousand one-hundred fifty-two (1152) optical fibers 106. The N optical fibers 106 are arranged in a rectangular array with thirty-six (36) columns, each of which contains thirty-two (32) optical fibers 106. A lens 112 is disposed immediately adjacent to the ends 104 of each of the optical fibers 106 along the optical path between sides 102a and 102b. Each of the lenses 112 are disposed with respect to the end 104 of the optical fiber 106 with which it is associated to produce from light, which may be emitted from the end 104 of the associated optical fiber 106, a quasi-collimated beam that propagates along the optical path between sides 102a and 102b.

FIG. 3 graphically illustrates a single beam of light 108 from a single optical fiber 106 as may propagate between sides 102a and 102b, or conversely. For wavelengths of light conventionally used in single mode fiber optic telecommunications, the lens 112 is a micro-lens which typically has a focal length of 2.0 to 12.0 mm. Such a lens 112 produces a quasi-collimated beam preferably having a diameter of approximately 1.5 mm which propagates along a five-hundred (500) to nine-hundred (900) mm long path between the sides 102a and 102b. Since the N×N reflective switching module 100 preferably uses the maximum relay length of the lens 112, the end 104 of each optical fiber 106 is positioned at the focal length of the lens 112 plus the Raleigh range of the beam of light 108 emitted from the optical fiber 106. Consequently, if the end 104 of the optical fiber 106 is displaced a few microns along the axis of the lens 112, that produces a negligible effect on the direction along which the maximum relay length quasi-collimated beam propagates between the sides 102a and 102b. Typically the exit angle of the maximum relay length quasi-collimated beam from the lens 112 will be a fraction of one milliradian, i.e. 0.001 radian. As will be described in greater detail below, any possible misalignment of the maximum relay length quasi-collimated beam due to misalignment between the end 104 of the optical fiber 106 and the lens 112 can be easily accommodated by providing sufficiently large surfaces from which the beam reflects.

After passing through the associated lens 112, a beam of light 108 emitted from the end 104 of each optical fiber 106 reflects first off a mirror surface 116a or 116b, indicated by dashed lines in FIG. 3, that is associated with a particular lens 112 and optical fiber 106 pair. The mirror surfaces 116, described in greater detail below, are preferably provided by two-dimensional ("2D") torsional scanners of a type similar to those described in U.S. Pat. No. 5,629,790 ("the '790 patent"), that is incorporated herein by reference. The N×N reflective switching module 100 includes two sets 118a and 118b of mirror surfaces 116 respectively disposed between the lenses 112 along the optical path between the sides 102a and 102b. Each set 118a or 118b includes a number of individual, independent mirror surfaces 116, each of which is supported by a pair of gimbals that permits each mirror surface 116 to rotate about two non-parallel axes. The number of mirror surfaces 116 equals the number, N, of optical fibers 106 and lenses 112 at the nearest side 102a or 102b. After reflecting off the mirror surface 116a or 116b, the beam of light 108, propagating between sets 118a and 118b in FIG. 2, then reflects off a selected one (1) of the mirror surface 116b or 116a further along the C-shaped optical path between the sides 102a and 102b, through one of the lenses 112 at the distant side 102b or 102a, and into the optical fiber 106 associated with that particular lens 112.

FIGS. 4a–4b depict ray tracings for light beams propagating through an alternative embodiment, rectangularly-shaped, convergent N×N reflective switching module 100. The rectangularly-shaped configuration of the N×N reflective switching module 100 illustrated in FIGS. 4a–4b employs a horizontally-elongated Z-shaped free space optical path. While in the illustration of this FIG. the distances between the side 102a and the curved set 118a, the curved set 118a and the curved set 118b, the curved set 118b and the side 102b are substantially equal, those skilled in the art will recognize that these distances need not be equal. Moreover, those skilled in the art will recognize that the sets 118a and 118b may be curved to provide either one dimensional ("1D") or 2D convergence. Thus, for the configuration of the N×N reflective switching module 100 depicted in FIGS. 4a–4b the curved set 118a may be advantageously moved nearer to the side 102a and the curved set 118b moved nearer to the side 102b. Such a shortening of the distances between the sides 102a and 102b and the curved sets 118a and 118b correspondingly lengthens the distance between the curved set 118a and curved set 118b which produces a parallelogram-shaped N×N reflective switching module 100. FIG. 5 depicts ray tracings for light beams propagating through an alternative embodiment, polygonally-shaped N×N reflective switching module 100. The polygonally-shaped configuration of the N×N reflective switching module 100 illustrated in FIG. 5 also produces a Z-shaped free space optical path.

FIG. 6 depicts a trapezoidally-shaped reflective switching module 100 that consist of only one half of the N×N reflective switching module 100 depicted in FIG. 1, i.e. either the left half thereof or the right half thereof. The reflective switching module 100 depicted in FIG. 6 fundamentally differs from that depicted in FIG. 1 only by including a mirror 120 disposed at the middle of the optical path between sides 102a and 102b. While for equivalent sides 102a the reflective switching module 100 depicted in FIG. 6 can couple light selectively between only one-half as many optical fibers 106 as the N×N reflective switching module 100 illustrated in FIG. 1, the reflective switching module 100 depicted in FIG. 6 can couple light between any arbitrarily chosen pair of those optical fibers 106. FIG. 7 depicts another trapezoidally shaped N×N reflective switching module 100 which also employs a mirror 120 for folding the optical path of the N×N reflective switching module 100 depicted in FIG. 5. Folding the optical path into a W-shape provides a more compact reflective switching module 100 than the N×N reflective switching module 100 depicted in FIG. 1.

Considering the beam of light 108 depicted schematically in FIG. 3, solely from the perspective of optical design, the various different embodiments of the reflective switching module 100 described above and illustrated in FIGS. 2, 4a, 4b, 5, 6, and 7 differ principally in the location of the mirror surfaces 116a and 116b along the beam of light 108, and in the folding of the optical path. For example, in the embodiment of the N×N reflective switching module 100 illustrated in FIGS. 4a–4b the mirror surfaces 116a and 116b are located approximately one-third (⅓) of the path length between the sides 102a and 102b from the nearest lenses 112. Conversely for other configurations of the reflective switching module 100 such as those illustrated in FIGS. 2, 5, 6, and 7 the mirror surfaces 116a and 116b are immediately adjacent to the respective sides 102a and 102b. However, those skilled in the art of optical design will readily understand that differences among the various configurations, particularly locations for the mirror surfaces 116a and 116b with respect to the lenses 112 and the ends 104 of the optical fibers 106, influence or affect other more detailed aspects of the optical design.

Those skilled in the art of optical design will also understand that conceptually there exist an unlimited number of other possible geometrical arrangements and optical path shapes in addition to those illustrated in FIGS. 2, 4a, 4b, 5, 6 and 7 for placing the ends 104 of the optical fibers 106 respectively at one or more both sides 102a and 102b, the associated lenses 112 and the mirror surfaces 116a and 116b. With regard to such alternative geometrical arrangements for the free space optical path of the reflective switching module 100, a preference for one arrangement in comparison with other possible arrangements usually involves issues related to suitability for a particular optical switching application, size, ease of fabrication, relaxing mechanical tolerances for assembly of the reflective switching module 100, reliability, cost, etc. Specifically, the trapezoidally-shaped, convergent beam N×N reflective switching module 100 with the W-shaped free space optical path illustrated in FIG. 7 is presently preferred because:

1. it fits within a standard twenty-three (23) inch wide telecommunications rack;
2. mechanical tolerances are acceptable;
3. long effective relay length for the beams of light 108; and
4. runs for electrical cables and optical cables are well separated.

As described above, the beam of light 108 produced by the lens 112 from light emitted from the end 104 of the associated optical fiber 106 first impinges upon the associated mirror surface 116 of one of the torsional scanners included in the sets 118a and 118b. As described in greater detail below, for the configuration of the N×N reflective switching module 100 depicted in FIG. 7, the mirror surfaces 116 are preferably provided by thirty-six (36) linear strips of thirty-two (32) torsional scanners. Preferably, all thirty-two (32) mirror surfaces 116 in each strip are substantially coplanar. As an example, within each strip immediately adjacent mirror surfaces 116 may be spaced 3.2 mm apart, and the immediately adjacent columns of mirror surfaces 116 are preferably spaced 3.2 mm apart with respect to the beams of light 108 impinging thereon from the immediately adjacent sides 102a and 102b.

Also for all the various configurations of the N×N reflective switching module 100, the ends 104 of the optical fibers 106, the lenses 112, and the mirror surfaces 116 of un-energized torsional scanners are preferably oriented so all of the beams of light 108 produced by light emitted from optical fibers 106 having their ends 104 at the side 102a converge at a point 122b that is located behind the set 118b of mirror surfaces 116. Correspondingly, the beams of light 108 emitted from optical fibers 106 having their ends 104 at the side 102b converge at a point 122a that is located behind the set 118a of mirror surfaces 116. Horizontally the convergence point 122 is established by considering mirror surfaces 116 at opposite sides of the sets 118a and 118b. The point 122 lies at the intersection of two lines that respectively bisect angles having their vertices at those two mirror surface 116 and sides which extend from the respective mirror surfaces 116 through mirror surfaces 116 at opposite ends of the other set 118b or 118a. The point 122 is located vertically one-half the height of the sets 118a and 118b. The geometrical arrangement of the ends 104 of the optical fibers 106, the lenses 112, and the mirror surfaces 116 which produces the preceding convergence provides equal clockwise and counter-clockwise rotation angles and minimal rotation angles for mirror surfaces 116 for each of the sets 118a and 118b that require the greatest movement in reflecting a beam of light 108 from one mirror surface 116 in the set 118a or 118b to any of the mirror surfaces 116 in the other set 118b or 118a. If in the configuration for the N×N reflective switching module 100 depicted in FIG. 7 a pair of mirror surfaces 116a and 116b are separated six-hundred and fifty (650) mm along the beam of light 108, then the maximum angular rotation of the mirror surfaces 116 is approximately 3.9° clockwise and counter-clockwise.

Although individual pairs of optical fibers 106 and lenses 112 could be inserted into grooves to assemble the sides 102a and 102b which yield the convergence of the beams of light 108 described in the preceding paragraph, for maximum density of lenses 112 and optical fibers 106 a monolithic block is preferably used that has holes appropriately pre-drilled therein. Each pre-drilled hole receives one of the lenses 112 and a conventional optical fiber ferrule secured about the end 104 of one optical fiber 106. The compound angles required to align the optical fiber 106 and the lens 112 for 2D convergence of the beams of light 108 are provided by suitably orienting the holes drilled into the block.

FIG. 8a depicts a preferred, cylindrically shaped micro-lens 112 fabricated with its focal point at, or as close as possible to, a face 138 of the lens 112. As those skilled in the art of fiber optics will understand, the optical fiber 106 emits the beam of light 108 at an angle with respect to a center line of the optical fiber 106 because the end 104 is polished at an angle to eliminate reflections back from the end 104. Because the end 104 is angled, the axis of the beam of light 108 emitted from the end 104 diverges from the longitudinal axis of the optical fiber 106. To align the beam of light 108 with a longitudinal axis 144 of the lens 112, the face 138 of the lens 112 is angled to center the beam of light 108 within the lens 112. With the focal point of the lens 112 at the face 138 as described above, the end 104 of the optical fiber 106 is positioned one Raleigh range of the beam of light 108, e.g. 50–60 microns, from the face 138. The diameter of a cylindrical surface 136 of the lens 112 is made sufficiently large to contain the diverging beam of light 108 before it exits the lens 112 through a convex surface 142 as the quasi-collimated beam of light 108.

This configuration for the lens 112 and the end 104 of the optical fiber 106 centers the beam of light 108 about the longitudinal axis 144 of the lens 112 at the convex surface 142 of the lens 112, with the quasi-collimated beam of light 108 oriented essentially parallel to the longitudinal axis 144. Usual manufacturing tolerances for the lens 112 described above produce acceptable deviations in exit angle and offset of the beam of light 108 from the longitudinal axis 144 of the lens 112. For example, if the lens 112 is fabricated from BK7 optical glass and the end 104 of the optical fiber 106 angles at 8°, then the angle of the beam of light 108 within the lens 112 is 6.78°, and the lateral offset from the longitudinal axis 144 is less than 50 microns both at the face 138 and also 140 mm from the face 138. Such a well centered beam of light 108 permits reducing the diameter of the surface 136 thus allowing the lenses 112 to be placed closer to each other. This lens 112 is preferably made from Gradium material marketed by LightPath Technologies, Inc.

FIG. 8b depicts an alternative embodiment "champagne cork" shaped micro-lens 112 which advantageously permits spacing lenses 112 and optical fibers 106 closer together at the sides 102a and 102b. The lens 112 includes a smaller diameter surface 132 which a conically-shaped optical fiber collimator assembly 134 illustrated in FIG. 9 receives. The larger diameter surface 136 of the lens 112 protrudes out of the optical fiber collimator assembly 134. The champagne cork shaped embodiment of the micro-lens 112 may be fabricated by grinding down a portion of the lens 112 illustrated in FIG. 8a.

As illustrated in FIG. 9, in addition to receiving one of either the cylindrically shaped lens depicted in FIG. 8a or the champagne cork shaped micro-lens 112 depicted in FIG. 8b, each optical fiber collimator assembly 134 also provides a receptacle that receives a conventional fiber optic ferrule 146 secured about the end 104 of the optical fiber 106. A convergence block 152, one of which is respectively disposed at both sides 102a and 102b of the reflective switching module 100, is pierced by a plurality of conically shaped holes 154 as illustrated in FIG. 10 that equal in number to the number N of optical fibers 106. Convergence of the beams of light 108 as described above is effected by the alignment of the optical fiber collimator assemblies 134 upon insertion into the holes 154. The optical fiber collimator assemblies 134 and holes 154 are preferably formed from the same material with identically shaped, mating, conical surfaces that taper at an angle of a few degrees. Configured in this way, when all optical fiber collimator assemblies 134 carrying the optical fibers 106 are fully seated into their mating holes 154, the optical fiber collimator assemblies 134 becomes fixed in the convergence block 152 and hermetically seal the interior of the reflective switching module 100 through which the quasi-collimated beams of light 108 propagate.

The convergence block 152 may be simply machined out a single piece of metal such as stainless steel, or from a ceramic material, etc. Alternatively, the convergence block 152 may be made out of Kovar, 42% nickel-iron alloys, titanium (Ti), tungsten (W) or molybdenum (Mo) suitably plated for corrosion resistance. These materials all have coefficients of expansion which approximately match that of the lenses 112 and minimize birefringent effects that may take place as lenses 112 are heated or cooled in their operating environment.

In addition to the preceding preferred way of providing convergence by suitably orienting the optical fibers 106 and the lenses 112 at each of the sides 102a and 102b, either 1D or 2D convergence may also be obtained in other ways. For example, the configuration of the optical fibers 106 and the lenses 112 could provide some of the convergence which the arrangement of the mirror surfaces 116 upon which the beams of light 108 first impinge could provide the remainder of the convergence. For example the mirror surfaces 116 in each column could be arranged along a cylindrical surface. Alternatively, the optical fibers 106 and the lenses 112 might be arranged to provide none of the convergence, i.e. beams of light 108 propagate parallel from the sides 102a and 102b to the first mirror surfaces 116, with the mirror surfaces 116 being arranged to provide all of the convergence as illustrated in FIGS. 4a–4b. For example the mirror surfaces 116 in each column could be arranged along a spherical surface. Moreover, the optical fibers 106, lenses 112, and sets 118a and 118b of mirror surfaces 116 may be arranged to provide either 1D or 2D convergence either behind the sets 118a and 118b or at the sets 118a and 118b. With regard to the various alternative ways of arranging convergence of the beams of light 108, selecting one way in comparison with other possible ways usually involves issues related to ease of fabrication, relaxing mechanical tolerances for assembly of the reflective switching module 100, reliability, cost, etc.

The preceding convergence criterion not only affects the optical design of the reflective switching module 100, that criteria also interacts with reliability considerations. If each optical fiber 106 of a reflective switching module 100 capable of switching among 1152 optical fibers 106 carries a beam of light 108 having a total power of 100 mW, the cumulative power of all beams of light 108 passing through the reflective switching module 100 at any instant is in excess of 100 watts. However, assuming that, on average, equal numbers of the beams of light 108 propagate in opposite directions between the sides 102a and 102b, then at any instant, on average, each set 118a or 118b of mirror surfaces 116 reflects beams of light 108 carrying slightly more than 50 watts of power. From a worst-case analysis perspective, at any instant beams of light 108 carrying at least 50 watts of power impinge either on one or the other of the set 118a or 118b of mirror surfaces 116. If electrical power supplied to the reflective switching module 100 for orienting the mirror surfaces 116 were to fail, then within a short time, e.g. milliseconds, at least 50 watts of power and perhaps more than 100 watts of power becomes directed at the convergence point. This amount of power would soon destroy the one or the few of the mirror surfaces 116 included in the set 118a or 118b upon which all of the beams of light 108 concentrate. To prevent such an catastrophe from occurring, the sets 118a and 118b both omit any mirror surfaces 116 from their centers where the beams of light 108 will converge if electrical power to the reflective switching module 100 should fail. To detect such a failure, the reflective switching module 100 may include a photo-detector behind this hole in the mirror surfaces 116.

In most telecommunication installations, optical fibers are generally matched as a duplex pair in which one fiber carries communications in one direction while the other fiber of the pair carries communications in the opposite direction. Connectors adapted for coupling light between two duplex pairs of optical fibers which secure the two optical fibers of a pair in a single ferrule are presently available. Because both optical fibers of a duplex pair are switched concurrently, and because the reflective switching module 100 can couple light in either direction between a pair of optical fibers 106 one of which is respectively located at side 102a and the other of which is located at side 102b, suitably adapting the lenses 112 for use with duplex pairs of optical fibers 106 permits using a single pair of mirror surfaces 116a and 116b for switching light carried in opposite directions respectively in the two optical fibers 106 of the duplex pair.

FIG. 11 depicts a lens 112 adapted for use in the reflective switching module 100 for concurrently switching light carried by a duplex pair of optical fibers 106a and 106b. As illustrated in FIG. 11, the duplex optical fiber ferrule 146 carries the duplex pair of optical fibers 106a and 106b. The ends 104a and 104b of the optical fibers 106a and 106b and the faces 138a and 138b of the lens 112 are all polished at an angle. The angles of the faces 138a and 138b are formed to compensate for the off-axis position of the optical fibers 106a and 106b so beams of light 108a and 108b impinging upon faces 138a and 138b from the optical fibers 106a and 106b are formed into quasi-collimated beams which exit the convex surface 142 parallel to but slightly offset from the longitudinal axis 144, and propagate in that way through the reflective switching module 100. Both of the beams of light 108a and 108b impinge upon the same pair of mirror surfaces 116a and 116b which are made large enough to simultaneously reflect both beams of light 108a and 108b. When the two quasi-collimated beams of light 108a and 108b impinge upon another identically configured lens 112 and duplex pair of optical fibers 106 at the opposite side 102a or 102b of the reflective switching module 100, the lens 112 located there couples the beams of light 108a and 108b into the respective optical fibers 106 of the duplex pair.

Torsional Mirror Configuration

As described above, the mirror surfaces 116a and 116b of the sets 118a and 118b are preferably provided by electrostatically energized 2D torsional scanners of a type described in the '790 patent. U.S. patent application Ser. No. 08/885,883 filed May 12, 1997, and published Patent Cooperation Treaty ("PCT") Patent Application International Publication Number: WO 98/44571, both of which are also incorporated by reference, provide additional more detailed information regarding the preferred 2D torsional scanner. Hinges which permit the mirror surfaces 116 to rotate about two (2) non-parallel axes preferably include torsion sensors of a type disclosed in U.S. Pat. No. 5,648,618 ("the '618 patent") that is also incorporated herein by reference. The torsion sensors included in the hinges measure rotation of a second frame or a plate, that has been coated to provide the mirror surface 116, respectively with respect to the first frame or with respect to the second frame.

As described in the patents and patent applications identified above, torsional scanners are preferably fabricated by micro-machining single crystal silicon using Simox, silicon-on-insulator or bonded silicon wafer substrates. Such wafer substrates are particularly preferred starting material for torsional scanner fabrication because they permit easily fabricating a very flat, stress-free membrane, possibly only a few microns thick, which supports the mirror surfaces 116. As illustrated in FIG. 12, a silicon-on-insulator ("SOI") wafer 162 includes an electrically insulating silicon dioxide layer 164 that separates single crystal silicon layers 166 and 168. Torsion bars and plates that carry the mirror surfaces 116 of torsional scanners are formed in the thinner device silicon layer 166 while other portions of torsional scanners are formed by backside etching in the thicker handle silicon layer 168. As is well known to those skilled in the art of micro-machining, the device silicon layer 166 has a frontside 169 furthest from the handle silicon layer 168 and a backside 170 at the silicon dioxide layer 164. The intermediate silicon dioxide layer 164 provides a perfect etch stop for etching the wafer 162 from its backside, and yields torsion bars and plates having uniform thickness.

FIG. 13 depicts a single electrostatically energized 2D torsional torsional scanner 172 adapted for providing the mirror surfaces 116 for the reflective switching module 100. The torsional scanner 172 includes an outer reference frame 174 to which are coupled a diametrically opposed pair of outer torsional flexure hinges 176. The torsional flexure hinges 176 support an inner moving frame 178 for rotation about an axis established by the torsional flexure hinges 176. A diametrically opposed pair of inner torsional flexure hinges 182 couple a central plate 184 to the inner moving frame 178 for rotation about an axis established by the torsional flexure hinges 182. The axes of rotation established respectively by the torsional flexure hinges 176 and by the torsional flexure hinges 182 are non-parallel, preferably perpendicular.

It is important to note that the plate 184 of the torsional scanner 172 is rectangularly shaped with the longer side being approximately 1.4 times wider than the height of the plate 184. The plate 184 included in the reflective switching module 100 has a rectangular shape because the beam of light 108 impinges obliquely at an angle of 45° on the mirror surface 116 carried by the plate 184. Consequently, for reflection of the beam of light 108 from the mirror surface 116 the rectangularly shaped plate 184 becomes effectively square. The plate 184 is preferably 2.5 mm×1.9 mm, and is typically between 5 and 15 microns thick as are the inner moving frame 178, the torsional flexure hinges 176 and 182. The torsional flexure hinges 176 and 182 are between 200 and 400 microns long, and between 10 and 40 microns wide. The resonance frequencies on both axes are on the order of 400 to 800 Hz which permits switching a beam of light 108 between two optical fibers 106 in approximately 1 to 5 milliseconds. Both the frontside 169 and the backside 170 of the plate 184 are coated in perfect stress balance with identical metallic adhesion layers, preferably 10.0 to 100.0 Å of titanium (Ti) or zirconium (Zr) which underlie a 500 to 800 Å thick metallic reflective layer of gold (Au).

The torsional flexure hinges 176 and 182, which are illustrated in greater detail in FIG. 14, provide various advantages in comparison with a conventional unfolded torsion bar. U.S. patent application Ser. No. 09/388,772 and published Patent Cooperation Treaty ("PCT") international patent application WO 00/13210, which are both entitled "Micromachined Members Coupled for Relative Rotation by Torsional Flexure Hinges," which were both filed Sep. 2, 1999, by Timothy G. Slater and Armand P. Neukermans and which are both incorporated herein by reference, describe in greater detail various advantages provided by the torsional flexure hinges 176 and 182. Most significant for the reflective switching module 100, the torsional flexure hinges 176 and 182 are more compact than a conventional unfolded torsion bar having an equivalent torsional spring constant. Consequently, use of the torsional flexure hinges 176 and 182 instead of a conventional unfolded torsion bar permits making much smaller torsional scanners 172 that can be packed more closely together which correspondingly increases the number of optical fibers 106 that may be accommodated at the sides 102a and 102b of the reflective switching module 100.

Each torsional scanner 172 included in the reflective switching module 100 includes a pair of torsion sensors 192a and 192b, of a type disclosed in the '618 patent. The torsion sensors 192a and 192b measure orientation of the supported member, i.e. the plate 184 or the inner moving frame 178, with respect to the supporting member, i.e. the inner moving frame 178 or the outer reference frame 174, at a theoretical resolution of approximately 1.0 micro-radians. In accordance with the description in the '618 patent, when the torsional scanner 172 is operating in the reflective switching module 100 an electrical current flows in series through the two torsion sensors 192a and 192b between a pair of sensor-current pads 194a and 194b. Accordingly, the torsional scanner 172 includes a meandering metal conductor 196 that is bonded to the frontside 169 of the device silicon layer 166. Starting at the sensor-current pad 194a, the meandering metal conductor 196 crosses the immediately adjacent torsional flexure hinge 176 from the outer reference frame 174 onto the inner moving frame 178 to reach the X-axis torsion sensor 192b that is located in the lower torsional flexure hinge 182. From the X-axis torsion sensor 192b the meandering metal conductor 196 continues onto a reflective, stress balanced metal coating, that is applied to both sides of the plate 184 to provide the mirror surface 116, and across the plate 184 and the upper torsional flexure hinge 182 back onto the inner moving frame 178. The meandering metal conductor 196 then leads to the Y-axis torsion sensor 192a that is located in the left hand torsional flexure hinge 176. From the Y-axis torsion sensor 192a, the meandering metal conductor 196 then curves around the outer reference frame 174 to the sensor-current pad 194b. Metal conductors, that are disposed on opposite sides of the meandering metal conductor 196 across the right hand torsional flexure hinge 176 and on the inner moving frame 178, connect a pair of inner-hinge sensor-pads 198a and 198b to the X-axis torsion sensor 192b. Similarly, metal conductors, one of which is disposed along side the meandering metal conductor 196 on the outer reference frame 174 and the other with curves around the opposite side of the torsional scanner 172 on the outer reference frame 174, connect a pair of inner-hinge sensor-pads 202a and 202b to the Y-axis torsion sensor 192a. A pair of grooves 204, cut only through the device silicon layer 166 on opposite sides of the inner-hinge sensor-pads 198a and 198b, increase electrical isolation between the sensor-current pad 194a and the inner-hinge sensor-pads 198a and 198b and the sensor-current pad 194b and the inner-hinge sensor-pads 202a and 202b.

Preferably, the backside 170 of the plate 184 provides the mirror surface 116 because, as illustrated in FIG. 15, the frontside 169 faces an insulating substrate 212 which carries both electrodes 214 used in energizing rotation of the plate 184 and contacts for the sensor-current pads 194a and 194b, the inner-hinge sensor-pads 198a and 198b and the inner-hinge sensor-pads 202a and 202b not illustrated in FIG. 15. The plates 184 of each torsional scanner 172 are separated a distance, e.g. from 40 to 150 microns, from the substrate 212 by spacers which are also not depicted in FIG. 15. The separation between the plate 184 and the substrate 212 depends upon how far edges of the plate 184 move during rotation.

Note that for the reflective switching module 100, very thin plates 184, only a few microns thick, are desirable and can be fabricated using the device silicon layer 166 of the wafer 162. In many instances the plate 184 and the torsional flexure hinges 176 and 182 can be made of the same thickness as the device silicon layer 166. Alternatively, as illustrated in FIG. 15 the torsional flexure hinges 182 may be thinned by etching. For example, the torsional flexure hinges 182 may be 6 microns thick while the plate 184 may be 10 microns thick. Analogously, the plate 184 may be thinned to reduce its moment of inertia by etching a cavity 216 into the plate 184 leaving reinforcing ribs 218 on the thinned plate 184.

A telecommunication system component such as the reflective switching module 100 must exhibit high reliability. A plate 184 of the torsional scanner 172 that accidentally collides with the electrode 214 should not stick to it, and should immediately rotate to its specified orientation. Furthermore, such accidental collisions should not damage the torsional scanner 172, or any circuitry connected to the torsional scanner 172. To preclude stiction, as illustrated in FIG. 13 the periphery of the plate 184 and of the inner moving frame 178 have rounded corners that reduce the strength of the electrostatic field. Rounding the periphery of the plate 184 also reduces its effective turning radius which results from compound rotation of the plate 184 about the axes respectively established by both torsional flexure hinges 176 and 182.

In addition to rounding the periphery of the plate 184 and the inner moving frame 178, as illustrated in FIG. 15a locations where the plate 184 may contact the electrodes 214 are overcoated with electrical insulating material 219 such as polyimide. Overcoating only those portions of the electrodes 214 which may contact the plate 184 with the electrical insulating material 219 avoids charge stored on most of the electrodes 214. Analogously, during fabrication of the torsional scanner 172 some of the silicon dioxide layer 164 may be left at the periphery of the plate 184 so the metallic reflective layer which provides the mirror surface 116 never contacts the electrode 214. Alternatively, as illustrated in FIG. 16b holes 220 are formed through the metal of the electrodes 214 in areas of possible contact.

During operation of the reflective switching module 100, the torsional scanner 172 is at a ground electrical potential while driving voltages are applied to the electrodes 214. To reduce electrical discharge currents if the plate 184 contacts the electrodes 214, large resistors (e.g. 1.0 MΩ) may be connected in series with the driving circuit for the electrodes 214. Ideally these resistors should be located as close as practicable to the electrodes 214 otherwise the conductor connecting between the electrodes 214 and the resistors might pickup stray electric fields that rotate the plate 184. Therefore, one alternative is to overcoat the electrodes 214 with a very high resistivity but slightly conductive material in selected areas such as those illustrated in FIG. 16a to provide a bleed path from the electrodes 214 for DC charges. Furthermore, inputs of all amplifiers connected to torsional scanners 172, such as those which receive orientation signals from the torsion sensors 192a and 192b, should include diode protection to prevent damage from an over-voltage condition due to arcing or accidental contact between the plate 184 and the electrodes 214.

Several configurations exist that may be exploited advantageously to increase the density of the mirror array, which is usually the limiting factor on the density of optical fibers 106 at the sides 102a and 102b. For several reasons, particularly the large number of contacts that must be brought out for each torsional scanner 172, the torsional scanners 172 are preferably arranged into strips 222 as illustrated in FIGS. 16a and 16b. Organizing the torsional scanners 172 into strips 222 increases their density above that which might be achieved if arranged as a 2 dimensional array of discrete torsional scanners 172. Each strip 222 includes a metal support frame 224 to which the substrate 212 is fastened.

As explained in greater detail below, the strip 222 is flip-chip bonded to the substrate 212 so all electrical connections to the strip 222 are made between the strip 222 and the substrate 212. A flat polyimide backed multi-conductor ribbon cable 226 connects to the substrate 212 to exchange electrical signals between the pads 194, 198 and 202 and the electrodes 214. Since each support frame 224 may be an open frame possibly including reinforcing ribs, the ribbon cable 226 can be freely bent and guided away from the substrate 212.

FIG. 16b illustrates how, without obscuring the mirror surfaces 116, the substrates 212 and the strips 222 may be overlapped with the ribbon cable 226 serpentined along the staircased substrates 212. Arranging the strips 222 in this way reduces the horizontal distance between the mirror surfaces 116 of immediately adjacent strips 222 in relationship to the beams of light 108. Since the beams of light 108 impinge upon the mirror surfaces 116 at approximately 45°, the apparent distance between immediately adjacent strips 222 is further foreshortened by a factor of approximately 1.4 which, as described above, is why the plate 184 is preferably rectangularly shaped.

One disadvantage with the configuration of strips 222 illustrated in FIG. 16b is that the offset between immediately adjacent strips 222 cannot be less than the thickness of the torsional scanners 172 plus the substrate 212. Furthermore, overlapping of immediately adjacent strips 222 and substrates 212 hinders removing a single defective strip 222 without disturbing immediately adjacent strips 222.

FIGS. 16c and 16d illustrate a preferred embodiment for the strips 222 and the support frames 224 in which electrical leads 228 that connect to the torsional scanners 172 are plated or screened onto one face, around one edge, and onto the other face of the substrate 212. With this configuration for the leads 228, attachment of the ribbon cable 226 to the substrate 212 is unhindered. Plating or screening the leads 228 onto the substrate 212 and including some via holes through the substrate 212 permits the substrate 212 to be as narrow as the strip 222. Narrowed to this extent, the combined strips 222, substrates 212 and support frames 224 may now be arranged as illustrated in FIG. 16e for both of the sets 118a and 118b. This permits the offset between immediately adjacent strips 222 to be established as required by the optics of the reflective switching module 100 rather than by packaging considerations. The optimum offset between immediately adjacent strips 222 is approximately 0% to 10% of the distance between plates 184 in immediately adjacent strips 222. The configuration of the substrate 212 illustrated in FIG. 16d facilitates access to the substrate 212 and removal of the strip 222 without disturbing adjacent support frames 224. Note that if necessary the leads 228 may be brought out around both edges of the substrate 212. This capability may be exploited advantageously to separate leads 228 carrying high voltage driving signals that are applied between the plate 184 and the electrodes 214 from leads 228 which carry signals from the torsion sensors 192a and 192b.

Without reducing the size of the plate 184, as illustrated in FIG. 17a the density of the optical fibers 106 at the sides 102a and 102b may be increased by offsetting the torsional scanners 172 of immediately adjacent strips 222 vertically by one-half the vertical distance between torsional scanners 172 within the strip 222. Due to the convergence criteria set forth above for arranging the beams of light 108 within the reflective switching module 100, offsetting the torsional scanners 172 in immediately adjacent strips 222 effects a reorganization of the holes 154 which receive the optical fiber collimator assemblies 134 from a quasi rectangular array into a quasi hexagonally close packed array. While offsetting the torsional scanners 172 in immediately adjacent strips 222 does not increase the density of the torsional scanners 172, such an arrangement of the torsional scanners 172 does increase the density of the optical fibers 106 at the sides 102a and 102b to the extent that the diameter, either of lenses 112 or of optical fiber collimator assemblies 134, limits the spacing between immediately adjacent optical fibers 106.

The density of torsional scanners 172 may be even further increased by fabricating the torsional scanners 172 as completely monolithic two dimensional arrays rather than as strips 222. As illustrated in FIG. 17b, offsetting the torsional scanners 172 in immediately adjacent columns permits interdigitation of the torsional flexure hinges 176 of torsional scanners 172 into an empty space that occurs between torsional scanners 172 in immediately adjacent columns or rows of the array. This interdigitating of the torsional flexure hinges 176 provides a shorter distance between centers of plates 184 of torsional scanners 172 in adjacent columns or rows, and more closely approximates a hexagonal close packing of the torsional scanners 172 and, correspondingly, of the optical fibers 106 at the sides 102a and 102b.

An alternative embodiment for strips 222 orients the torsional flexure hinges 176 and 182 at 45° with respect to the vertical and horizontal axes of the support frame 224. FIGS. 18a and 18b illustrate a diagonal configuration for the torsional flexure hinges 176 and 182 which more efficiently uses area on the strips 222 than a configuration in which the torsional flexure hinges 176 and 182 are oriented parallel and perpendicular to strips 222. Using a diagonal orientation for the torsional flexure hinges 176 and 182 oriented at 45° with respect to the outer reference frame 174, they can be longer without increasing the area occupied by the torsional scanner 172. The plate 184 is elongated in one direction to accommodate the 45° impingement angle of the beam of light 108. Due to the elliptical shape of the beam of light 108 as it impinges upon the plate 184, corners of the beam of light 108 may be eliminated resulting in an octagonally shaped plate 184, which conveniently provides room for the outer reference frame 174. Sides of the outer reference frame 174 are oriented in the <110> crystallographic direction of silicon for ease of fabrication. This configuration for the torsional scanner 172 orients the torsion sensors 192a and 192b along the <100> crystallographic direction of silicon.

Thus, a wafer 162 having a p-type device silicon layer 166 or p-type implantation must be used in fabricating the torsion sensors 192a and 192b. The <110> and <100> crystallographic directions of silicon may be interchanged with suitable process changes.

Using the arrangement of the torsional scanner 172 illustrated in FIG. 18b, 1.5×2 mm plates 184 may be spaced only 2.5 mm apart effectively increasing the density of mirror surfaces 116 by a factor of 1.4. When viewed at the approximate 45° incident angle of the beams of light 108, the strips 222 slope at 54°. In this configuration the strips 222 are oriented at 45° to the support frames 224. This orientation of the strips 222 is necessary if the mirror surfaces 116 are to fully intercept the beams of light 108. The support frames 224 could be oriented at 45° which permits all the strips 222 to be the same length, thereby using area on wafers 162 more efficiently.

FIG. 19a illustrates yet another alternative embodiment of the torsional scanner 172 which further reduces its size thereby further shortening distances between immediately adjacent mirror surfaces 116 in the reflective switching module 100. From the preceding description it is apparent that positioning the torsional flexure hinges 176 and 182 at corners rather than sides of the plate 184 advantageously reduces the size of the torsional scanner 172. In FIG. 19a an elliptically-shaped curve 232 represents an outline of the beam of light 108 impinging on the mirror surface 116 of the plate 184. Because the beam of light 108 does not impinge on the corners of the plate 184, the inner torsional flexure hinges 182 may be rotated with respect to the plate 184 to occupy unused corner space. As in the configuration of the torsional scanner 172 illustrated in FIG. 18a, the outer torsional flexure hinges 176 continues to occupy corners of the outer reference frame 174.

Not only does placement of the torsional flexure hinges 182 at the corners of the plate 184 as illustrated in FIG. 19a reduce the size of the torsional scanner 172, it also reduces compounding of the angles when the plate 184 rotates simultaneously about both axes. Compounding increases the distance through which corners of the plate 184 move when the plate 184 simultaneously rotates about axes established by both torsional flexure hinges 176 and 182. Compounding increases the separation required between the plate 184 and the substrate 212 which correspondingly increases the voltage that must be applied between the plate 184 and the electrodes 214 for equivalent performance in rotating the plate 184. However, if the plate 184 has an aspect ratio that is not square as will usually occur for plates 184 included in the reflective switching module 100, then the torsion sensors 192a and 192b in torsional flexure hinges 176 and 182 depicted in FIG. 19a are no longer oriented along orthogonal crystallographic directions, i.e. either <100> or <110> directions, of silicon. This is undesirable, since the torsion sensors 192a and 192b in the torsional flexure hinges 176 and 182 then respond both to bending and torsion of the torsional flexure hinges 176 and 182.

Because the plate 184 depicted in FIG. 19a has an aspect ratio of approximately 1.4:1, axes of rotation 236a and 236b established by the torsional flexure hinges 176 and 182 intersect at approximately 70.5°. However, reorienting the axes of rotation 236a and 236b slightly until they intersect at 90°, as illustrated in FIG. 19b, permits the torsional flexure hinges 176 and 182 to be oriented along a single crystallographic direction of silicon, e.g. the <100> crystallographic orientation if the outer reference frame 174 is aligned along the <110> crystallographic direction of silicon. Configured as illustrated in FIG. 19b, the torsional scanner 172 provides a significant amount of space for the inner torsional flexure hinges 182 in the corners of the plate 184 which reduces the size of the torsional scanner 172. Furthermore, the configuration of the torsional scanner 172 illustrated in FIG. 19b preserves the crystallographic orientation of the torsion sensors 192a and 192b while the compounding effect, though not completely eliminated, is significantly reduced. However, in the configuration of the torsional scanner 172 depicted in FIG. 19, the orthogonal axes of rotation established by the torsional flexure hinges 176 and 182 are oriented obliquely to the length and width of the plate 184. Nevertheless, because only small angular rotations of the plate 184 occur during operation of the reflective switching module 100 the area of the plate 184 upon which the beam of light 108 impinges changes insignificantly when the plate 184 rotates.

Incorporating the torsional scanners 172 illustrated in FIGS. 18a or 19a into one of the set 118a or 118b of mirror surfaces 116 to maximize their respective advantages requires rearranging the shape of the set 118a or 118b. A preferred arrangement for strips 222' of torsional scanners 172 depicted in FIG. 18a is illustrated in FIG. 20a. As described above and depicted FIG. 20a, the strips 222' are mounted at a 45° angle with respect to a horizontal base 242 of the reflective switching module 100. In the illustration of FIG. 20a, the support frames carrying the strips 222' are also mounted at a 45° angle with respect to the base 242. The two axes established by the torsional flexure hinges 176 and 182 about which the plates 184 rotate are indicated by x and y axes 244 depicted in FIG. 20a. The maximum rotation angles for plates 184 about axes established by the torsional flexure hinges 176 and 182 allowed for identical torsional scanners 172 at the other set 118b or 118a of mirror surfaces 116 establishes a serrated rectangularly-shaped field 246 of addressable torsional scanners 172 in the addressed set 118a or 118b.

This optimum rectangularly-shaped field 246 is truncated at the corners and has sides that are approximately diagonal to the strips 222'. For the arrangement illustrated in FIG. 20a, the longest strip 222' must include at least 1.4 times more torsional scanners 172 than that required for a rectangular array of the torsional scanners 172 assembled from the strip 222 illustrated in FIG. 16a. However, torsional scanners 172 may be omitted from locations in the set 118a or 118b that cannot be addressed from the other set 118b or 118a. Thus, only a few of the strips 222' illustrated in FIG. 20a need be full length. Those strips 222' that include only a few torsional scanners 172 might even be eliminated entirely. For example by using 40 strips 222' containing a maximum 44 torsional scanners 172, it is possible to arrange as many as 1152 torsional scanners 172 in the set 118a or 118b, with very small scan angles, and relatively small mirror sizes. A different arrangement provides for 1132 torsional scanners 172, which measure only 1.59 by 2.2 mm, and requires deflection angles of 3.69° and 3.3°. The strips 222' of the torsional scanners 172 are oriented at an average of 550 to the optical fiber collimator assemblies 134. The arrangement illustrated in FIG. 20a, though slightly more complex substantially increases the density of the torsional scanners 172 and, correspondingly, the optical fiber collimator assemblies 134, and allows more scanners to be addressed for particular rotation angles specified for the plates 184.

FIG. 20b illustrates an analogous re-arrangement at the sets 118a and 118b of torsional scanners 172 of the type depicted in FIG. 19b. For this arrangement of the torsional scanners 172 depicted in FIG. 19b the strips 222" and the support frames 224" are oriented vertically similar to the illustration of FIG. 16a. However, the x and y axes 244 about which the plate 184 rotate are oriented at 45° with respect to the strips 222" and their support frames 224". The oblique orientation of the x and y axes 244 with respect to the strips 222" and the support frames 224" again means that the maximum rotation angles for plates 184 of corresponding torsional scanners 172 at the other set 118b or 118a of mirror surfaces 116 establishes a serrated octagon or truncated rectangularly-shaped field 256 of addressable torsional scanners 172 at the addressed set 118a or 118b. If the rectangularly-shaped field 256 established for these torsional scanners 172 is p×q, then the optimum field coverage for strips is a square or rectangular field with an area of 0.7 to 1.2 pq, symmetrically arranged along the diagonal x and y axes 244. This results in an aspect ratio for the rectangularly-shaped field 256 that is slightly elongated in the direction of the strips 222", e.g. 1.0:1.3. If the set 118a or 118b have horizontally oriented strips 222" and support frames 224", then the elongation of the rectangularly-shaped field 256 becomes horizontal rather than vertical. For manufacturing convenience, all strips 222" are made the same length. Analogous to the arrangement of torsional scanners 172 depicted in FIG. 20a, there again exist areas of the rectangularly-shaped field 256 which can omit torsional scanners 172. Again it is advantageous to omit shorter strips 222" along the sides of the rectangularly-shaped field 256 which have few torsional scanners 172, and to slightly elongate others strips 222". In the example illustrated in FIG. 20b, for a 1.8 by 2.4 mm plate 184 and rotation angles for the plates 184 about the x and y axes 244 of 5.6° and 3.7° the arrangement significantly increases the number of torsional scanners 172 to approximately 1,500.

In the configurations of the reflective switching module 100 described thus far, the optical fiber collimator assemblies 134 are fastened in the convergence block 152 which is located some distance from at least portions of the sets 118a and 118b of mirror surfaces 116. This configuration for the reflective switching module 100 requires very good alignment of the collimators to the mirror surfaces 116. FIG. 21 illustrates an arrangement of whereby the collimating lens 112, optical fibers 106 and strips 222 of torsional scanners 172 are brought closer together thereby relaxing tolerances for their alignment. In that illustration, the substrate 212 is made wider than the strip 222 and a mirror strip 262 attached to the surface of the substrate 212 opposite to the strip 222 to establish a beam-folding and deflecting assembly 264. The beam-folding and deflecting assemblies 264 are then arranged into a repeating, regular structure in which the quasi-collimated beam of light 108 reflecting off the mirror strip 262 of one beam-folding and deflecting assembly 264 impinges upon the mirror surface 116 provided by the immediately adjacent torsional scanner 172. Since in the arrangement illustrated in FIG. 21 all the lenses 112 are located an identical short distance from their associated mirror surface 116, alignment of the beams of light 108 to their respective mirror surfaces 116 is less critical. Convergence of the beams of light 108 may be provided in one dimension by arranging immediately adjacent beam-folding and deflecting assemblies 264 at slightly differing angles. Convergence in a second dimension may be obtained by appropriately positioning the optical fibers 106 and lenses 112 with respect to their respective associated mirror surfaces 116. Because in the arrangement illustrated in FIG. 21 the substrates 212 are near their associated mirror surface 116, almost the entire five-hundred (500) to nine-hundred (900) mm long path between the sides 102a and 102b is between pairs of mirror surfaces 116 in the sets 118a and 118b thereby reducing the angles through which the plates 184 must rotate.

As illustrated in FIG. 13, all electrical connections to the torsional scanners 172 occur at the frontside 169 of the device silicon layer 166, and as illustrated in FIG. 15 the beam of light 108 reflects off a metallic layer coated onto the backside 170 of the device silicon layer 166. To form electrical connections between the substrate 212 and the torsional scanners 172 in the strip 222, the strip 222 is preferably flip-chip bonded to the substrate 212. The substrate 212 may accommodate more than one strip 222 by using a substrate 212 that is larger than the strip 222. The substrate 212 may be fabricated in various different ways.

The substrate 212 may be fabricated from a 100 wafer of silicon. If the substrate 212 is fabricated from a silicon wafer, then cavities 272 may be anisotropically etched into the substrate 212 to provide space for rotation of the plates 184, and to establish a precisely controlled spacing between the plate 184 and electrodes 214 located in the cavities 272. Electrical insulation between leads 228 and between electrodes 214 may be obtained by forming an electrically insulating oxide on the surface of the silicon substrate 212. The electrodes 214 may either be integrated into the silicon substrate 212 or deposited onto the silicon surfaces within each of the cavities 272.

If the substrate 212 is fabricated from a silicon wafer, then electronic circuits may also be advantageously integrated thereinto. The circuits included in a silicon substrate 212 may include current sources for providing an electrical current to the torsion sensors 192a and 192b of the torsional scanners 172, differential amplifiers for receiving signals from the torsion sensors 192a and 192b which indicate the orientation of the inner moving frame 178 and the plate 184, and amplifiers for supplying high voltage signals to the electrodes 214 that energize rotation of the plate 184. Incorporating these various different type of electronic circuits into the substrate 212 significantly reduces the number of leads that must be included in the ribbon cable 226. The number of leads in the ribbon cable 226 may be even further reduced by including one or more multiplexer circuits in the silicon substrate 212.

Photo-detectors which respond to a wavelength of light present in the beam of light 108 and which are disposed on the surface of the substrate 212 adjacent to the strip 222 outside shadows cast by the mirror surfaces 116 may be advantageously included on the substrate 212 to detect if a portion of the beam of light 108 misses the mirror surfaces 116. For wavelengths of light used for optical fiber telecommunications, such photo-detectors sense if a portion of the beam of light 108 misses the mirror surfaces 116 even if they are covered by portions of the strip 222 other than the mirror surfaces 116 because silicon is transparent to light at wavelengths used for optical fiber telecommunications.

Referring now to FIGS. 22a–22c, the strip 222 is joined to the substrate 212 by solder-bumps 276 or other bonds formed by solder reflow. The solder-bumps 276 rigidly interconnect pads on the substrate 212 with the pads 194, 198 and 202 of the torsional scanners 172 of the strip 222. The flip-chip bonding of the similar material strip 222 and substrate 212 perfectly matches temperature coefficients between them, and therefore introduces no stresses which keeps the strip 222 flat.

If the substrate 212 is fabricated from silicon or from polysilicon, then as depicted in FIG. 22d a large number of very small electrically conductive vias 282 may be formed, using a process similar to that described by Calmes, et al. in Transducers 99 at page 1500, through the silicon wafer during fabrication of the substrate 212. Holes for the vias 282 are first formed through the wafer using the standard Bosch deep reactive ion etch ("RIE") process. The holes may be 50 micron wide and 500 micron deep. The wafer is then oxidized thus establishing an electrically insulating oxide layer 284 which isolates the hole from the surrounding wafer. Then a highly doped polysilicon layer 286 is grown over the oxide layer 284 by providing a conductive path along the surface of wafer and in the holes. Obtaining a sufficiently conductive polysilicon layer may also require gas phase doping of the polysilicon layer 286 with phosphorus. The conductive polysilicon layer 286 formed in this way electrically connects both sides of wafer. If desired, rings 288 may then be etched through the polysilicon layer 286 around each via 282 thereby electrically isolating the vias 282 from each other. To increase electrical conductivity of substrate 212 and to facilitate forming an electrical contact to the vias 282, one or more additional metal layers may be coated either on one or both sides of the substrate 212 and appropriately patterned.

Mounting of the strip 222 to the substrate 212 that includes the vias 282 is depicted in FIG. 22d. Electrical connections between the strip 222 and vias 282 of the substrate 212 are again formed by solder-bumps 276. An elastomer layer 292 fastens a polyimide and copper sheet 294 which forms the ribbon cable 226 to the side of the substrate 212 furthest from the strip 222 of torsional scanners 172. Ballgrid or TAB bumps 298 make contact to the conductive vias 282 to establish electrical connections with the polyimide and copper sheet 294. In this way a very large number of contacts to be brought through the substrate 212 with relatively low electrical resistance vias 282.

If the substrate 212 is fabricated from polysilicon or from Pyrex glass, then the cavities 272 may be etched thereinto. However, if the substrate 212 is made from Pyrex then the electrodes 214 must be deposited onto the surfaces of the cavities 272. The substrate 212 may also be fabricated from a suitable ceramic such as aluminum oxide or preferably aluminum nitride which has a coefficient of thermal expansion that more closely matches that of the silicon forming the strip 222. If the strip 222 is fabricated from a ceramic material, then a spacer must be screened onto the substrate 212 to provide space for rotation of the plates 184, and to establish a precisely controlled spacing between the plate 184 and the electrodes 214. However, forming spacers on the surface of a ceramic substrate 212 usually requires repetitive coatings to establish a sufficient gap between the electrodes 214 and the plate 184.

Note that steep sides 302 formed by 111 planes exposed by anisotropic etching of the handle silicon layer 168 of the wafer 162, illustrated in FIG. 15, prove very advantageous for flip-chip bonding. Not only do the sides 302 substantially protect the mirror surface 116 on the backside 170 of the plate 184 from damage during manufacturing while concurrently mechanically reinforcing the strip 222, but their steep angle scarcely obscures the beam of light 108 impinging upon the mirror surface 116 at an angle of approximately 45°. Furthermore, the mirror surface 116 may be protected from contamination by stretching an extremely thin pellicle 304, similar to those used for integrated circuit ("IC") masks, across the backside of the handle silicon layer 168.

Due to the presence of the handle silicon layer 168 surrounding the mirror surface 116, the flip-chip configuration for mounting the torsional scanner 172 also permits advantageously reducing light scattering as illustrated in FIG. 23. The steep sides 302 and surrounding backside of the handle silicon layer 168 may be coated with an anti reflection layer 312 which effectively absorbs stray light impinging thereon as the beam of light 108 switches between mirror surfaces 116. The steep sides 302 also scatter stray light from the beam of light 108 at very large angles which prevents the side 102a or 102b toward which the beam of light 108 propagates from receiving stray light as the beam of light 108 switches between mirror surfaces 116.

FIG. 24 schematically illustrates the reflective switching module 100, such as those illustrated in FIGS. 2, 4a–4b, 5, 6 and 7 as described thus far, encased within an environmental housing 352 that completely encloses the optical path through which the beams of light 108 propagate. As described above, the reflective switching module 100 mechanically interconnects the sides 102a and 102b and the sets 118a and 118b and keeps them rigidly aligned. The environmentally sealed environmental housing 352, which protects the reflective switching module 100, may provide temperature regulation thereby maintaining a stable operating environment for the reflective switching module 100. A controlled, dry gas, such as nitrogen, may flow through the environmental housing 352 to hinder moisture from condensing within the reflective switching module 100. The environmental housing 352 may also be slightly pressurized to exclude the surrounding atmosphere from the reflective switching module 100. The environmental housing 352 may include a nonsaturable microdryer 353 as described in U.S. Pat. No. 4,528,078 to control the humidity of atmosphere within the reflective switching module 100. A wall 354 of the environmental housing 352 is pierced by electrical feed-throughs 356 for ribbon cables 226. The optical fiber collimator assemblies 134 secured about the ends 104 of the optical fibers 106 plug directly into the convergence blocks 152 which project through the environmental housing 352. In this way, the environmental housing 352 almost hermetically encloses the reflective switching module 100. Within the environmental housing 352, to reduce the possibility of optical misalignment, the ribbon cables 226 are routed carefully to avoid applying stresses to the reflective switching module 100, particularly the support frames 224 and the substrates 212.

Fiber Optic Switch

FIG. 25 illustrates a modular fiber optic switch in accordance with the present invention referred to by the general reference character 400. The fiber optic switch 400 includes a standard twenty-three (23) inch wide telecommunications rack 402 at the base of which is located the environmental housing 352 containing the reflective switching module 100. The environmental housing 352 containing all the torsional scanners 172 rests on a special pedestal on the floor immediately beneath the rack 402, and is only very flexibly connected to the rack 402. Supporting the environmental housing 352 on the special pedestal minimizes vibration, etc. and thermally couples the environmental housing 352 to the floor to enhance its thermal regulation.

Portcard

Mounted in the rack 402 above the environmental housing 352 are numerous duplex sockets 404 included in portcards 406 that are adapted to receive duplex pairs of optical fibers 106. One optical fiber 106 of a duplex pair brings one beam of light 108 to the fiber optic switch 400 and another receives one beam of light 108 from the fiber optic switch 400. The portcards 406 are arranged either horizontally or vertically within the rack 402, and can be individually removed or installed without interfering with immediately adjacent portcards 406. As is a common practice in the telecommunications industry, the portcards 406 are hot swappable. The reflective switching module 100 may contain spare mirror surfaces 116 so the fiber optic switch 400 can retain its full operating capability if a few of the mirror surfaces 116 were to fail. It is readily apparent that, in principle, all or any lesser number of the optical fibers 106 connected to a portcard 406 may receive a beam of light 108 therefrom. Similarly, all or any lesser number of the optical fibers 106 connected to a portcard 406 may carry a beam of light 108 to the portcard 406. The optical fibers 106 may be organized in duplex pairs as illustrated in FIG. 26, but need not be so organized.

In the block diagram of FIG. 26, all items to the left of a dashed line 412 are included in the portcard 406, and all items to the right of a dashed line 414 are included in the reflective switching module 100. The area between the dashed lines 412 and 414 illustrates a backplane of the rack 402. Each portcard 406 includes electronics, alignment optics and electro-optics required to control operation of a portion of the reflective switching module 100. Thus, all of the optical fibers 106 included in the reflective switching module 100 connect to a portcard 406. Similarly, all of the torsional scanners 172 having mirror surfaces 116 upon which any of the beams of light 108 may impinge connect via its substrate 212 and a ribbon cable 226 to a portcard 406. Each portcard 406 preferably, but not necessarily, connects to sixteen (16) or thirty-two (32) optical fibers 106, one-half of which it is envisioned may be receiving a beam of light 108 from the portcard 406 and one-half that may be carrying a beam of light 108 to the portcard 406. In FIG. 26 the odd number subscripted optical fibers $106_1$, $106_3$, . . . $106_{2n-1}$ carry a beam of light 108 to the reflective switching module 100 while the even number subscripted optical fibers $106_2$, $106_4$, . . . $106_{2n}$ carry a beam of light 108 from the reflective switching module 100.

The portcard 406 includes light sources 422 and taps or directional couplers 424 for supplying and coupling light into the optical fiber 106 for use in servo alignment of the reflective switching module 100. The directional couplers 424 also supply light received from the reflective switching module 100 via optical fibers 106 to light detectors 426. The portcard 406 also includes driving, sensing and control electronics 432, e.g. a digital signal processor ("IDSP") together with its associated circuits, which exchange electrical signals via the ribbon cables 226 with the electrodes 214 included in the substrates 212 and with the torsion sensors 192a and 192b included in each of the torsional scanners 172 mounted on the substrates 212. The driving, sensing and control electronics 432 controls the orientation of mirror surfaces 116 including implementing servo loops that ensure their proper orientation, and also communicates with the supervisory processor 436 through an RS232 data communication link 438.

The backplane between dashed lines 412 and 414 includes connections for the optical fibers 106 to the portcards 406, preferably multifiber connectors for single mode, optical fiber ribbon cables that connect, for example, 12, 16 or more optical fibers 106. The backplane between dashed lines 412 and 414 also includes connectors 442 for all the ribbon cables 226, the data communication link 438 and other miscellaneous electrical connections such as electrical power required for operation of the driving, sensing and control electronics 432.

In orienting a pair of mirror surfaces 116, one in each of the sets 118a and 118b, to couple one beam of light 108 between one optical fiber 106 at side 102a and another at side 102b, the two mirror surfaces 116 are initially oriented appropriately using pre-established angular coordinates which specify rotations about two (2) axes for each mirror surface 116 in the pair. Thus, for an N×N reflective switching module 100 and ignoring any spare mirror surfaces 116 included in the reflective switching module 100, the fiber optic switch 400 must store 4×$N^2$ values for orientation signals produced by the torsion sensors 192a and 192b included in each torsional scanner 172. Accordingly, the reflective switching module 100 includes a look-up table 452, illustrated in FIG. 27a that is maintained in the supervisory processor 436, that stores the 4×$N^2$ values for orientation signals for use at any time during the operating life of the fiber optic switch 400.

The 4×$N^2$ values for orientation signals produced by the torsion sensors 192a and 192b included in each torsional scanner 172 may be initially determined analytically. During assembly of the fiber optic switch 400, the analytically determined coordinates and orientation signals are fine tuned to accommodate manufacturing tolerances, etc. Furthermore, throughout the operating life of the fiber optic switch 400 these coordinates and orientation signals may be updated when necessary. Accordingly, the look-up table 452 stores compensation data for initial values of the coordinates and orientation signals, e.g. sensor offsets and temperature compensation since the temperature coefficient of the torsion sensors 192a and 192b is well characterized.

In a preferred embodiment of the fiber optic switch 400, a higher frequency servo system uses the orientation signals produced by the torsion sensors 192a and 192b in controlling orientation of each mirror surface 116. The frequency response of this higher frequency servo system permits accurate orientation of pairs of mirror surfaces 116 when switching from one pairing of optical fibers 106 to another pairing. The higher frequency servo system also maintains orientation of all mirror surfaces 116 despite mechanical shock and vibration. To ensure precise orientation of pairs of mirror surfaces 116 during operation of the fiber optic switch 400, the fiber optic switch 400 also employs lower frequency optical feedback servo described in greater detail below.

In initially orienting a pair of mirror surfaces 116, one in each of the sets 118a and 118b, to couple one beam of light 108 between one optical fiber 106 at side 102a and another at side 102b, stored values for orientation signals are transmitted from the look-up table 452 respectively to two dual axis servos 454 that are included in the portcards 406 for each torsional scanner 172 which exchanges signals with the portcard 406. Each dual axis servo 454 transmits driving signals via the ribbon cable 226 to the electrodes 214 included in the substrates 212 to rotate the mirror surfaces 116 to pre-established orientations. The two torsion sensors 192a and 192b included in each torsional scanner 172 transmit their respective orientation signals back to the respective dual axis servos 454 via the ribbon cable 226. The dual axis servos 454 respectively compare the orientation signals received from their associated torsion sensors 192a and 192b with the values for orientation signals received from the look-up table 452. If any difference exists between the stored values for orientation signals received from the look-up table 452 and the orientation signals which the dual axis servos 454 receive from their respective torsion sensors 192a and 192b, then the dual axis servos 454 appropriately correct the driving signals which they transmit to the electrodes 214 to reduce any such difference.

FIG. 27b depicts one of two identical channels, either x-axis or y-axis, of the dual axis servos 454. As depicted in that FIG. and as described above, a current source 462, included in the portcard 406, supplies an electric current to the series connected torsion sensors 192a and 192b of the torsional scanner 172. Differential output signals from one or the other of the torsion sensors 192a and 192b, in the illustration of FIG. 27 the X-axis torsion sensor 192b, are supplied in parallel via the ribbon cable 226 to inputs of an instrumentation amplifier 463 also included in the portcard 406. The instrumentation amplifier 463 transmits an output signal that is proportional to the signal produced by the X-axis torsion sensor 192b to an input of an error amplifier 464.

As described above, the driving, sensing and control electronics 432 of the portcard 406 includes a DSP 465 which executes a computer program stored in a random access memory ("RAM") 466. Also stored in the RAM 466 are values for orientation signals which specify an orientation for the mirror surface 116 that have been supplied from the look-up table 452 maintained at the supervisory processor 436. The computer program executed by the DSP 465 retrieves the angular coordinate, either X-axis or Y-axis as appropriate, and transmits it to a digital-to-analog converter (DAC) 467. The DAC 467 converts the angular coordinate received from the DSP 465 in the form of digital data into an analog signal which the DAC 467 transmits to an input of the error amplifier 464.

An output of the error amplifier 464 transmits a signal to an input of an integrator circuit 472 that is proportional to the difference between the analog signal representing the angular coordinate and the signal from the instrumentation amplifier 463 that is proportional to the signal produced by the X-axis torsion sensor 192b. The integrator circuit 472, consisting of an amplifier 473 and a network of resistors 474 and capacitors 475, transmits an output signal directly to an input of a summing amplifier 476a, and to an input of an inverting amplifier 477. The inverting amplifier 477 transmits an output signal to an input of a second summing amplifier 476b. In addition to the signals respectively received directly from the integrator circuit 472 and indirectly from the integrator circuit 472 via the inverting amplifier 477, inputs of the summing amplifiers 476a and 476b also receive a fixed bias voltage. The summing amplifiers 476a and 476b respectively transmit output signals, which are proportional to a sum of their respective input signals, to inputs of a pair of high voltage amplifiers 478. The high voltage amplifiers 478 respectively transmit driving signals via the ribbon cable 226 either to the X-axis or to Y-axis electrodes 214 of the torsional scanner 172.

In this way the dual axis servos 454 supply differential drive signals to the electrodes 214 of the torsional scanner 172 which respectively are symmetrically greater than and less than a voltage established by the bias voltage supplied to the summing amplifiers 476a and 476b. Furthermore, the drive signals which the dual axis servos 454 supply to the electrodes 214 are appropriately corrected to reduce any difference that might exist between the output signals from the torsion sensors 192a and 192b and the values for orientation signals specified in the look-up table 452.

Since single crystal silicon at room temperatures does not undergo plastic deformation, is dislocation free, has no losses, and does not exhibit fatigue, the mechanical characteristics of torsional flexure hinges 176 and 182 made from that material remain stable for years. Consequently, a combination of the long term stability of the torsional flexure hinges 176 and 182 and the torsion sensors 192a and 192b assure that the values for orientation signals which the look-up table 452 supplies to the pair of dual axis servos 454 will effect almost precise alignment of pairs of mirror surfaces 116.

However, as is disclosed in the '463 and the '153 patents, inclusion of an optical servo loop in a fiber optic switch ensures precise alignment. To permit implementing such an optical servo loop, as depicted in FIG. 26 each portcard 406 included in the fiber optic switch 400 includes one directional coupler 424 for each optical fiber 106 together with one light detector 426. Each directional coupler 424 couples approximately 5% to 10% of light propagating through one optical fiber included in the directional coupler 424 into another optical fiber with 95% to 90% of that light remaining in the original optical fiber. Consequently, if a light source 422 is turned-on 5% to 10% of the light emitted by the light source 422 into the directional coupler 424 passes into an incoming optical fiber 106, e.g. optical fiber $106_1$, for transmission onto the reflective switching module 100 together with 95% to 90% of any other light that is already propagating along the optical fiber 106 toward the reflective switching module 100. The reflective switching module 100 couples this combined light from the incoming optical fiber 106, e.g. optical fiber $106_1$, into an outgoing optical fiber 106, e.g. optical fiber $106_2$. Upon reaching the directional coupler 424 associated with the outgoing optical fiber 106, e.g. optical fiber $106_2$, 5% to 10% of the light received from the reflective switching module 100 passes from the optical fiber 106 through the directional coupler 424 to the light detector 426 connected to that directional coupler 424. If necessary, the fiber optic switch 400 exploits the ability to introduce light into the optical fiber 106 for transmission through the reflective switching module 100 and then recovering a fraction of the transmitted light to analyze and adjust the operating state of specific pairs of mirror surfaces 116, and to ensure precise alignment of pairs of mirror surfaces 116 during operation of the fiber optic switch 400.

In considering operation of this optical servo portion of the fiber optic switch 400, it is important to note that the optical servo aligns a pair of mirror surfaces 116 regardless of the direction in which alignment light propagates through the pair of mirror surfaces 116, i.e. from incoming optical fiber 106 to outgoing optical fiber 106 or conversely. Consequently, in principle the portcards 406 need equip only one-half of the optical fibers 106 included in the fiber optic switch 400, e.g. all the incoming optical fibers 106 or all the outgoing optical fibers 106, with the light source 422. However, to facilitate flexible and reliable operation of the fiber optic switch 400 in a telecommunication system all of the directional couplers 424, both those connected to incoming and to outgoing optical fibers 106, may, in fact, be equipped with the light source 422.

Referring now to FIG. 26a, an output from every directional coupler 424 of the portcard 406 supplies light to a telecom-signal-strength photo-detector 482. Every telecom-signal-strength photo-detector 482 receives and responds to a fraction of light propagating into the reflective switching module 100 along the optical fibers 106 regardless of whether the optical fiber 106 is an incoming or an outgoing optical fiber 106. Thus, before a pair of mirror surfaces 116 are precisely aligned optically, output signals from two telecom-signal-strength photo-detectors 482 indicate whether portcard 406 must supply light from the light source 422 for that purpose, or whether the incoming optical fiber 106 carries a telecommunication signal of sufficient strength to permit optical alignment. If the signals from the pair of telecom-signal-strength photo-detectors 482 indicate that neither of the two optical fibers 106 carry sufficient light to perform optical alignment, then the portcard 406 turns-on the light source 422 to obtain light required for optical alignment, otherwise light present on the incoming optical fiber 106 is used for that purpose.

One approach for using light introduced into the optical fiber 106 from the light source 422 illustrated in FIG. 26a envisions using 850 nm light from a relatively inexpensive laser diode for the light source 422. In this approach, an alignment-light detector 484 that is sensitive to red wavelengths of light may be an inexpensive silicon photo-detector. However, in addition to light generated by the light source 422 at 850 nm, the incoming optical fiber 106 may also be concurrently carrying light at optical telecommunication wavelengths, e.g. 1310 Å or 1550 Å, which perhaps has greater power than that generated by the light source 422. To ensure separation of the 850 nm alignment light generated by the light source $422_{2j-1}$ and supplied to the reflective switching module 100 via optical fiber $106_{2j-1}$ from light at optical telecommunication wavelengths, the output of the directional coupler 424 which emits a portion of the light received by the portcard 406 from the reflective switching module 100 directs such light onto a dichroic mirror $486_{2j}$. The dichroic mirror $486_{2j}$ reflects the 850 nm alignment light to the alignment-light detector 484 while permitting light at optical telecommunication wavelengths to pass onto a telecom-signal-monitoring photo-detector 488. If the reflective switching module 100 is to be fully bidirectional so any optical fiber 106 may at any instant be an incoming or an outgoing optical fiber 106, then a dichroic mirror $486_{2j-a}$ must be used with the directional coupler $424_{2j-1}$ to separate light from the light source $422_{2j-1}$ from light at optical telecommunication wavelengths that the telecom-signal-monitoring photo-detector $488_{2j-1}$ receives.

For several reasons after the pair of mirror surfaces 116 have been initially precisely aligned optically to establish a connection via the reflective switching module 100 between an incoming optical fiber 106 and an outgoing optical fiber 106, it appears advantageous to turn-off the light source 422 and to use light coming to the fiber optic switch 400 at optical telecommunication wavelengths in periodically checking alignment. The configuration of the light source 422 and light detector 426 remains as depicted in FIG. 26a. Operating in this way, the telecom-signal-strength photo-detector 482 which first receives light at optical telecommunication wavelengths coming into the fiber optic switch 400 via the duplex sockets 404 detects loss of light or loss of modulation in incoming light. During such operation of the fiber optic switch 400, the telecom-signal-monitoring photo-detectors 488 are used in conjunction with the telecom-signal-strength photo-detectors 482 for periodically monitoring and maintaining the quality of light transmission through the reflective switching module 100. Tests have demonstrated that the orientation signals from the torsion sensors 192a and 192b supplied to the dual axis servo 454 maintain adequate alignment of the mirror surfaces 116 for extended period of time, e.g. hours. Consequently, after a pair of mirror surfaces 116 have been precisely aligned optically only relatively infrequent adjustment of the mirror orientation is required to compensate for drift in the torsion sensors 192a and 192b, temperature changes, mechanical creep of the reflective switching module 100 including the support frames 224 and perhaps the substrates 212, etc.

In an alternative approach for detecting alignment light supplied from the light source 422 at 850 nm, the dichroic mirror $486_{2j}$ and its associated photo-detectors 484 and 488 may be replaced by a compound sandwich photo-detector, illustrated in FIG. 26b. In the compound sandwich detector illustrated there, a silicon photo-detector 492 is mounted over a long wavelength photo-detector 494 such as germanium (Ge) or indium gallium arsenide (InGaAs) photo-detector. The compound sandwich photo-detector absorbs the shorter alignment wavelength in the silicon photo-detector 492. However, longer wavelengths of the optical telecommunications light pass virtually un-attenuated through the silicon photo-detector 492 to be absorbed in the long wavelength photo-detector 494. Use of the compound sandwich photo-detector fully separates the two signals. The InGaAs photo-detector may be replaced by a second Ge photo-detector to detect the longer wavelength light, but with less sensitivity than the InGaAs photo-detector. However, a difficulty associated with using light at 850 nm for alignment is that the directional couplers 424 become multi-mode devices so the fraction of the alignment light being coupled into and out of the optical fiber 106 varies over time.

To avoid difficulties associated with using 850 nm light for precisely aligning a pair of mirror surfaces 116 optically, it is also possible and advisable to supply light at optical telecommunication wavelengths, e.g. 1310 Å or 1550 Å, from the light source 422. Light at these wavelengths may be provided by an inexpensive vcsel. While vcsels lack the precise wavelength or stability of expensive laser sources of such light, the precision and stability provided by laser sources are not required for optically aligning a pair of mirror surfaces 116. Using light at optical telecommunication wavelengths has the advantage that the and the alignment-light detector 484 may be eliminated, and that the coupling coefficient for the directional couplers 424 are higher and more stable than for 850 nm light. Therefore, a vcsel need supply less light or power for optical alignment than a laser diode producing 850 nm light.

If initial optical alignment of pairs of mirror surfaces 116 requires using an expensive laser that generates light at optical telecommunication wavelengths for the light source 422, the cost of that source may be shared among directional couplers 424 using a 1×N optical switch. Such a 1×N optical switch may be very large to provide light to all the portcards 406. Alternatively, to enhance reliability the fiber optic switch 400 might include several such optical telecommunication lasers with a smaller 1×N optical switches each one of which provides light to only the directional couplers 424 included in a single portcard 406.

Optical Beam Alignment

Including the fiber optic switch 400 in a telecommunications network makes reliability and availability of utmost importance. Therefore, it is extremely important that the mirror surfaces 116 are always under control of the dual axis servos 454, that initially forming a connection which couples light from one optical fiber 106 to another optical fiber 106 via the reflective switching module 100 be precise, and that the quality of the coupling be maintained while the connection persists. As described above in connection with FIGS. 26 and 26a, all the portcards 406 provide a capability for monitoring the precise alignment of pairs of mirror surfaces 116 either with light incoming to the fiber optic switch 400 or with light generated by one of the light sources 422.

The fiber optic switch 400 exploits the capability of the portcards 406 to facilitate optical alignment of pairs of mirror surfaces 116 by monitoring the quality of coupling between pairs of optical fibers 106 connected to the reflective switching module 100. In monitoring the quality of that coupling, the fiber optic switch 400 tilts slightly each mirror surface 116 in a pair from the orientation specified by the values for orientation signals stored in the look-up table 452, i.e. dithering both mirror surfaces 116, while concurrently monitoring the strength of the beam of light 108 coupled between the two optical fibers 106. Because, in general, monitoring the strength of the beam of light 108 coupled between two optical fibers 106 requires coordination between two of the at least thirty-six (36) portcards 406 included in the fiber optic switch 400, that process must at least be supervised by the supervisory processor 436 illustrated in FIG. 26. Accordingly, whenever it is necessary or helpful to optically align a pair of mirror surfaces 116 the supervisory processor 436 sends appropriate commands to the DSP 465 included in each of the involved portcards 406, illustrated in FIG. 27b, via the data communication link 438 and a RS232 port 502 included in each of the portcards 406. The commands sent by the supervisory processor 436 cause the DSP 465 to send coordinate data to the two DACs 467 included in the dual axis servo 454 which tilts slightly the mirror surface 116 whose orientation the dual axis servo 454 controls. Because this change in orientation changes the impingement of the beam of light 108 on the lens 112 associated with the outgoing optical fiber 106, the amount of light coupled into the associated optical fiber 106 changes. This change in the light coupled into the optical fiber 106 is coupled through the directional coupler 424 through which the outgoing light passes to the light detector 426 included in that portcard 406. To permit detecting this change of light, the computer program executed by the DSP 465 acquires light intensity data from an analog-to-digital converter ("ADC") 504 that is coupled to the light detector 426 as illustrated in FIG. 27b. The fiber optic switch 400, either in the DSP 465 on the portcard 406 or in the supervisory processor 436, or in both, analyzes this light intensity data to precisely align the two mirror surfaces 116 for coupling the beam of light 108 between the two optical fibers 106.

After the mirror surfaces 116 have been precisely aligned optically, the fiber optic switch 400 confirms that light from the incoming optical fiber 106 is being coupled through the reflective switching module 100 to the proper outgoing optical fiber 106 by dithering only the mirror surface 116 upon which the incoming beam of light 108 first impinges. If the reflective switching module 100 has been properly aligned to couple light between a specified pair of optical fibers 106, the intensity modulation of light from the incoming beam of light 108 caused by dithering this particular mirror surface 116 must appear in only the correct outgoing optical fiber 106, and in no other optical fiber 106.

After the pair of mirror surfaces 116 have been optically aligned as described above, and after confirming that incoming light is being coupled through the reflective switching module 100 into the proper optical fiber 106, the fiber optic switch 400 periodically monitors the quality of the connection using the ability to dither the orientation of the mirror surfaces 116. The computer program executed by the supervisory processor 436 as appropriate uses the alignment data acquired in this way for updating the angular coordinate data stored in the look-up table 452, and may also preserve a log of such data thereby permitting long term reliability analysis of fiber optic switch 400.

Industrial Applicability

FIG. 28a shows an alternative embodiment structure for receiving and fixing optical fibers 106 that may be used at the sides 102a and 102b instead of the convergence block 152 and the optical fiber collimator assemblies 134. In the structure depicted in FIG. 28a, a clamping plate 602, micromachined from silicon, secures the optical fibers 106. An adjustment plate 604, also micromachined from silicon, permits adjusting the ends 104 of the optical fibers 106 that protrude therethrough both from side-to-side and up-and-down, and then fixing the ends 104 in their adjusted position. The clamping plate 602 is pierced by an array of holes 606 which are etched through a 1.0 to 2.0 mm thick silicon substrate using the Bosch deep RIE process. The holes 606, which have a diameter only a few microns larger than the optical fibers 106, typically have a diameter of 100 to 125 microns which matches the outer diameter of typical optical fibers 106. If the clamping plate 602 must be thicker than 1.0 to 2.0 mm, then two or more plates can be juxtaposed and registered kinematically to each other using V-groves and rods. After being registered, two or more juxtaposed clamping plates 602 can be glued together.

The hole 606 positions the optical fibers 106 precisely with respect to each other within a few microns. The high depth-to-diameter ratio of the holes 606, e.g. 10:1 or greater, facilitates fixing the optical fibers 106 longitudinally. To ease insertion of optical fibers 106 into the holes 606, a pyramidally shaped entrance 608 to the holes 606, only one of which is illustrated in FIG. 28a, may be formed on one side of the clamping plate 602 using anisotropic etching.

While the holes 606 may be formed as right circular cylinders, they may also have more complicated cylindrical profiles such as that illustrated in FIG. 28b. The holes 606 may be RIE or wet etched to provide a profile in which a cantilever 612 projects into the hole 606. The cantilever 612 is positioned with respect to the remainder of the hole 606 so that insertion of the optical fiber 106 thereinto bends the cantilever 612 slightly. In this way the cantilever 612 holds the optical fiber 106 firmly against the wall of the hole 606 while permitting the optical fiber 106 to slide along the length of the hole 606. The holes 606 may incorporate other more complicated structures for fixing the optical fiber 106 with respect to the holes 606. For example, a portion of each hole 606 may be formed with the profile depicted in FIG. 28b while the remainder, etched in registration from the opposite side of the clamping plate 602, may be shaped as a right circular cylinder.

After the clamping plate 602 has been fabricated, optical fibers 106 are inserted through all the holes 606 until all the optical fibers 106 protrude equally a few millimeters, e.g. 0.5 to 3.0 mm, out of the clamping plate 602. Protrusion of the optical fibers 106 this far beyond the clamping plate 602 permits easily bending them. Identical protrusion of all the optical fibers 106 may be ensured during assembly by pressing the ends 104 of the optical fibers 106 against a stop. The optical fibers 106 may be fixed to the clamping plate 602 by gluing, soldering, or simply be held by frictional engagement with the cantilever 612.

The adjustment plate 604, best illustrated in FIG. 28c, includes an array of XY micro-stage stages 622 also etched through a 1.0 to 2.0 mm thick silicon substrate using the Bosch deep RIE process. Each XY micro-stage 622 includes a hole 624 adapted to receive the end 104 of the optical fiber 106 that projects through the clamping plate 602. The distances between holes 624 piercing the adjustment plate 604 are identical to those which pierce the clamping plate 602, and may be formed with the profile depicted in FIG. 28b. Each optical fiber 106 fits snugly within the hole 624.

FIG. 29 a depicts in greater detail one of the XY micro-stage stages 622 included in the adjustment plate 604. An analogous monolithic silicon XY stage is described in U.S. Pat. No. 5,861,549 ("the '549 patent") that issued Jan. 19, 1999. FIG. 29a illustrates that the entire XY micro-stage 622 is formed monolithically from a silicon substrate using RIE etching. An outer base 632, that encircles the XY micro-stage 622, is coupled to an intermediate Y-axis stage 634 by four (4) flexures 636 of a type described by Teague et al in, Rev. SCI. Instrum., 59, pg. 67, 1988. Four similar flexures 642 couple the Y-axis stage 634 to a X-axis stage 644. The flexures 636 and 642 are of the paraflex type and therefore stretch adequately for the XY motion envisioned for the hole 624. The XY micro-stage 622 need only to be able to move and position the ends 104 of the optical fibers 106 over small distances which avoids undue stress on the flexures 636 and 642. Other configurations for the flexures 636 and 642, similar to those described in the '549 patent, may also be used.

The XY micro-stage 622 likely omits any actuators, but the Y-axis stage 634 may be fixed in relation to the outer base 632 with a metal ribbon, e.g. gold, kovar, tungsten, molybdenum, aluminum, or wire linkage 652. Similarly, the X-axis stage 644 may be fixed in relation to the Y-axis stage 634 also with a metal ribbon or wire linkage 654. The material chosen for the linkages 652 and 654 preferably has a coefficient of expansion the same as or close to that of silicon. However, if the linkages 652 and 654 are short, e.g. 100 microns, then even for a 20 PPM differential coefficient of expansion between the silicon and the metal (e.g. aluminum), the movement of the X-axis stage 644 with respect to the outer base 632 would only be approximately 20 Å per degree Celsius. Metals other than aluminum provide even greater thermal stability.

In adjusting the XY micro-stage 622, the linkages 652 and 654 are first bonded respectively to the Y-axis stage 634 and to the X-axis stage 644. By pulling the metal linkages 652 and 654 simultaneously while viewing the end 104 of the optical fiber 106 through a microscope, the X-axis stage 644 may be moved along both the X and Y axes to position the end 104 at a specified location. After the X-axis stage 644 has been move to properly position the end 104, the linkages 652 and 654 are bonded or spotwelded in place.

The XY micro-stage 622 may include a lever 622 illustrated in FIG. 29c to reduce movement of the X-axis stage 644 in comparison with movement of a distal end 664 of the XY micro-stage 622. For the XY micro-stage 622 illustrated in that FIG., etching to form the stages 634 and 644 also yields the lever 622 that is cantilevered from the Y-axis stage 634. The linkage 654 is initially bonded both to the X-axis stage 644 and to the lever 622. A similar linkage 666 is fastened to the end of the lever 622 distal from its juncture with the Y-axis stage 634. After the X-axis stage 644 has been move to properly position the end 104, as before the linkage 666 is bonded or spotwelded to the Y-axis stage 634. Alternatively, as illustrated in FIG. 29c, the linkage 654 may be omitted from the XY micro-stage 622 to be replaced by a flexible pushpin 672, well known in the art, that couples between the X-axis stage 644 and the lever 622 cantilevered from the Y-axis stage 634. Opposite ends of the flexible pushpin 672 are coupled by flexures 674 respectively to the X-axis stage 644 and to the lever 622. The embodiment of the XY micro-stage 622 depicted in FIG. 29c requires only one linkage 666 for fixing the X-axis stage 644 when the end 104 of the optical fiber 106 is at its specified location. Furthermore, the movement of the X-axis stage 644 is now bi-directional because the flexible pushpin 672 can both push and pull on the X-axis stage 644.

While the preceding description of the lever 622 has addressed only X-axis motion of the X-axis stage 644, it is readily apparent that a similar lever could be incorporated into the outer base 632 for effecting Y-axis motion of the Y-axis stage 634 and of the X-axis stage 644 with respect to the outer base 632.

As described above, the XY micro-stage 622 permits fixing and adjusting the ends 104 of optical fibers 106 along their X and Y axes. However, properly focusing the lens 112 with respect to the ends 104 of optical fibers 106 may require relative movement either of the end 104 or the lens 112 along the longitudinal axis 144. The separation between the end 104 of optical fiber 106 and the lens 112 may be adjusted in various different ways. Bright, et al., SPIE Proc., vol. 2687, pg.34, describe a poly-silicon mirror, moving like a piston, which may be electrostatically displaced perpendicular to the substrate upon which it has been fabricated.

FIG. 30a depicts a monolithic plano-convex lens 112 micromachined from a SOI wafer 162 using RIE etching that can be electrostatically displaced along the longitudinal axis 144 perpendicular to the substrate upon which it was been fabricated. To permit electrostatically displacing the lens 112 along the longitudinal axis 144, as illustrated in FIG. 30b the lens 112 is supported from the surrounding device silicon layer 166 of the wafer 162 by three (3) V-shaped flexures 682. One end of the flexures 682, each of which extends part way around the periphery of the lens 112, is coupled to the surrounding device silicon layer 166 while the other end is coupled to the lens 112. Except for deflection electrodes 684 that are disposed to the right of the lens 112 in FIG. 30a and electrically insulated from the wafer 162, the entire assembly is made as one monolithic silicon structure. Electrostatic attraction between the electrodes 684 and the combined flexures 682 and the lens 112, created by applying an electrical potential between the electrodes 684 and the device silicon layer 166, pulls the lens 112 toward the electrodes 684 along the longitudinal axis 144.

Silicon lenses suitable for IR optical fiber transmission are commercially available and may be adapted for use in this invention. Accordingly, small individual commercially available micro-lenses may be placed into a cavity etched into a flat membrane supported by the flexures 682. Alternatively, the lens 112 may be formed using RIE while the flexures 682 are being formed. Yet another alternative is to first diamond turn the lens 112 and then protect it from etching while the flexures 682 are formed using RIE. Still another alternative is to first form the flexures 682 using RIE while protecting the area where the lens 112 is to be formed, and then diamond turning the lens 112. After the lens 112 and the flexures 682 have been formed in any of these ways, the wafer 162 underlying them is removed with anisotropic etching to expose the silicon dioxide layer 164. The backside 170 of the lens 112 fabricated in this way is optically flat.

Instead of electrostatic actuation, the lens 112 may be moved along the longitudinal axis 144 electro-magnetically. As illustrated in FIG. 30c, the electrodes 684 disposed adjacent to the lens 112 in the illustration of FIG. 30a are replaced with permanent magnets 692 oriented with their magnetic field parallel to the longitudinal axis 144 of the lens 112. Also a coil 694 encircles the lens 112. Electrical leads from the coil 694 are brought out to the device silicon layer 166, preferably symmetrically, via the flexures 682 to ensure linear displacement of the lens 112. Depending upon the direction of current flow applied to the coil 694, the lens 112 moves toward or away from the end 104 of the optical fiber 106.

In many telecommunication applications for the fiber optic switch 400, light arriving at the fiber optic switch 400 may have previously passed through a routing wavelength demultiplexer which may typically be in integrated chip form. A significant cost in fabricating routing wavelength demultiplexers is often that of connecting from its planar circuit to outgoing optical fibers. If the reflective switching module 100 of the fiber optic switch 400 described above is properly configured, making connections between the routing wavelength demultiplexer and optical fibers becomes unnecessary. Rather, outgoing beams of light from the routing wavelength demultiplexer are simply coupled in free space to the lenses 112 of the reflective switching module 100 which may include an anti reflection overcoating to reduce reflection.

FIG. 31 illustrates an arrangement in which a routing wavelength demultiplexer 702 includes several demultiplexed planar waveguides 704. The demultiplexed planar waveguides 704 radiate beams of light 108 directly toward the lenses 112 facing them thereby avoiding any necessity for coupling the routing wavelength demultiplexer 702 to optical fibers. A substrate 706 of the routing wavelength demultiplexer 702, which carries demultiplexed planar waveguides 704, may be placed adjacent to the lenses 112 to supply incoming beams of light 108 to the reflective switching module 100. Likewise where outgoing beams of light 108 leave the reflective switching module 100, the lenses 112 may couple the beams of light 108 directly to demultiplexed planar waveguides 704 from which the beams of light may be multiplexed into one or several outgoing optical fibers. By providing and reserving some extra output and input holes 154 in the convergence blocks 152 for use with wavelength converters, the fiber optic switch 400 may provide wavelength conversion for light received from any optical fiber coupled to the fiber optic switch 400.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and (b) a plurality of reflective light beam deflectors that are fixed to a surface of said substrate (212) which respectively:

i. are:

(1) associated with one of the lenses;

(2) positioned so the quasi-collimated beam of light propagatable from the associated lens impinges upon one of said light beam deflectors to be reflected therefrom; and (3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also;
   A. positionable along the optical path between the groups of collimator receptacles;
   B. energizable by drive signals supplied to said fiber optic switching module; and
   associated with one of the lenses;

whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;

wherein the substrate (212) is formed from an electrically insulating material;

wherein said substrate (212) has electrically conductive electrodes formed on the surface to which said light beam deflectors are fixed, and wherein the drive signals supplied to said substrate (212) generate an electrostatic force between said electrodes and said light beam deflector to energize orientation of said light beam deflectors fixed to said substrate (212);

wherein areas on said electrodes of possible contact with said light beam deflectors are at least partially overcoated with electrically insulating material.

2. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and (b) a plurality of reflective light beam deflectors that are fixed to a surface of said substrate (212) which respectively:
   i. are:
      (1) associated with one of the lenses;
      (2) positioned so the quasi-collimated beam of light propagatable from the associated lens impinges upon one of said light beam deflectors to be reflected therefrom; and
      (3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also;
         A. positionable along the optical path between the groups of collimator receptacles;
         B. energizable by drive signals supplied to said fiber optic switching module; and
         C. associated with one of the lenses;

whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;

wherein the substrate (212) is formed from an electrically insulating material;

wherein said substrate (212) has electrically conductive electrodes formed on the surface to which said light beam deflectors are fixed, and wherein the drive signals supplied to said substrate (212) generate an electrostatic force between said electrodes and said light beam deflector to energize orientation of said light beam deflectors fixed to said substrate (212);

wherein areas on said electrodes of possible contact with said light beam deflectors are pierced by holes.

3. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and (b) a plurality of reflective light beam deflectors that are fixed to a surface of said substrate (212) which respectively:
   i. are:
      (1) associated with one of the lenses;
      (2) positioned so the quasi-collimated beam of light propagatable from the associated lens impinges upon one of said light beam deflectors to be reflected therefrom; and
      (3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
  A. positionable along the optical path between the groups of collimator receptacles;
  B. energizable by drive signals supplied to said fiber optic switching module; and
  C. associated with one of the lenses;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;
wherein the substrate (212) is formed from an electrically insulating material;
wherein said light beam deflectors are organized as a group;
wherein said substrate (212) is elongated, and wherein each light beam deflector fixed to said substrate (212) is supported by hinges for rotation about an axis that is oriented substantially perpendicular to a longitudinal axis of said elongated substrate (212).

4. A light beam deflector assembly adapted for use in a fiber optic switching module that includes:
a first and a second group of collimator receptacles which are separated from each other at opposite ends of a free space optical path with each collimator receptacle being respectively adapted for receiving and fixing an end of an optical fiber; and
lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;
the light beam deflector assembly being positionable along the optical path between the groups of collimator receptacles so at least one quasi-collimated beam of light propagatable from at least one of the lenses impinges thereon, the light beam deflector assembly comprising:
(a) a substrate (212); and
(b) a plurality of reflective light beam deflectors that are fixed to a surface of said substrate (212) which respectively:
  i. are:
    (1) associated with one of the lenses;
    (2) positioned so the quasi-collimated beam of light propagatable from the associated lens impinges upon one of said light beam deflectors to be reflected therefrom; and
    (3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
      A. positionable along the optical path between the groups of collimator receptacles;
      B. energizable by drive signals supplied to said fiber optic switching module; and
      C. associated with one of the lenses;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;
wherein the substrate (212) is formed from an electrically insulating material;
wherein said light beam deflectors are organized as a group;
wherein each light beam deflector fixed to said substrate (212) is supported by hinges for rotation about an axis that is oriented at an angle of approximately forty-five degrees (45°) to an axis of the group of light beam deflectors.

5. A light beam deflector assembly adapted for use in a fiber optic switching module that includes:
a first and a second group of collimator receptacles which are separated from each other at opposite ends of a free space optical path with each collimator receptacle being respectively adapted for receiving and fixing an end of an optical fiber; and
lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;
the light beam deflector assembly being positionable along the optical path between the groups of collimator receptacles so at least one quasi-collimated beam of light propagatable from at least one of the lenses impinges thereon, the light beam deflector assembly comprising:
(a) a substrate (212); and
(b) a plurality of reflective light beam deflectors that are fixed to a surface of said substrate (212) which respectively:
  i. are:
    (1) associated with one of the lenses;
    (2) positioned so the quasi-collimated beam of light propagatable from the associated lens impinges upon one of said light beam deflectors to be reflected therefrom; and
    (3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
      A. positionable along the optical path between the groups of collimator receptacles;
      B. energizable by drive signals supplied to said fiber optic switching module; and
      C. associated with one of the lenses;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;

wherein the substrate (212) is formed from an electrically insulating material;

wherein the substrate (212) is fabricated from material selected from a group consisting of silicon, polysilicon, Pyrex glass, aluminum oxide and aluminum nitride;

wherein the substrate (212) has integrated circuits integrated therein or thereon;

wherein the integrated circuits include amplifiers that receive electrical signals which indicate light beam deflector orientation.

6. The light beam deflector assembly of claim 5 wherein each light beam deflector fixed to said substrate (212) is supported for rotation by hinges which include at least one torsion sensor for sensing light beam deflector orientation, the torsion sensors of said light beam deflectors supplying the electrical signals to at least one amplifier included in the light beam deflector assembly.

7. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and (b) a plurality of reflective light beam deflectors that are fixed to a surface of said substrate (212) which respectively:

i. are:
(1) associated with one of the lenses;
(2) positioned so the quasi-collimated beam of light propagatable from the associated lens impinges upon one of said light beam deflectors to be reflected therefrom; and
(3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
A. positionable along the optical path between the groups of collimator receptacles;
B. energizable by drive signals supplied to said fiber optic switching module; and
C. associated with one of the lenses;

whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;

wherein said light beam deflectors are monolithically fabricated from a single-crystal semiconductor layer of a silicon wafer (162)

wherein light beam deflectors respectively include:
an outer frame;
first torsional hinges that project inwardly from the outer frame;
an inner frame supported by the first torsional hinges for rotation about a first axis;
second torsional hinges that project inwardly from the inner frame; and
a central plate that is supported by the second torsional hinges for rotation about a second axis that is not oriented parallel to the first axis, and that has a reflective mirror surface formed thereon;

wherein the central plate of light beam deflectors has a width that exceeds a height of the central plate measured perpendicular to the width thereof.

8. The light beam deflector assembly of claim 7 wherein the width of said light beam deflector equals approximately 1.4 times the height thereof.

9. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and (b) a plurality of reflective light beam deflectors that are fixed to a surface of said substrate (212) which respectively:

i. are:
(1) associated with one of the lenses;
(2) positioned so the quasi-collimated beam of light propagatable from the associated lens impinges upon one of said light beam deflectors to be reflected therefrom; and
(3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
- A. positionable along the optical path between the groups of collimator receptacles;
- B. energizable by drive signals supplied to said fiber optic switching module; and
- C. associated with one of the lenses;

whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;

wherein said light beam deflectors are monolithically fabricated from a single-crystal semiconductor layer of a silicon wafer (162);

wherein the silicon wafer (162) includes a device layer (166) and a handle layer (168), and said light beam deflectors are formed in the device layer (166) of the silicon wafer (162).

10. The light beam deflector assembly of claim 9 wherein said light beam defectors are fixed to the substrate (212) with the device layer (166) of the silicon wafer (162) disposed nearest to the substrate (212), and the handle layer (168) disposed further from the substrate (212).

11. The light beam deflector assembly of claim 10 wherein the handle layer (168) surrounding each of the light beam deflectors is coated with an anti reflection layer to absorb stray light from the quasi-collimated beam of light impinging thereon.

12. The light beam deflector assembly of claim 9 wherein hinges which support said light beam deflector for rotation about an axis, that are also formed in the device layer (166) of the silicon wafer (162), are thinner than the device layer (166) of the silicon wafer (162).

13. The light beam deflector assembly of claim 9 wherein a surface of said light beam deflector upon which the quasi-collimated beam of light does not directly impinge has a cavity formed therein which is surrounded by reinforcing rim.

14. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and
(b) a plurality of reflective light beam deflectors that are fixed to a surface of said substrate (212) which respectively:
  i. are:
    (1) associated with one of the lenses;
    (2) positioned so the quasi-collimated beam of light propagatable from the associated lens impinges upon one of said light beam deflectors to be reflected therefrom; and
    (3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
      A. positionable along the optical path between the groups of collimator receptacles;
      B. energizable by drive signals supplied to said fiber optic switching module; and
      C. associated with one of the lenses;

whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;

the light beam deflector assembly further comprising a plurality of light beam deflector orientation sensors at least one of which is associated respectively with each of said light beam deflectors;

wherein each light beam deflector fixed to said substrate (212) is supported for rotation by hinges, and wherein said light beam deflector orientation sensor includes at least one torsion sensor formed in the hinges.

15. A light beam deflector assembly adapted for use in a fiber optic switching module that includes:

a first and a second group of collimator receptacles which are separated from each other at opposite ends of a free space optical path with each collimator receptacle being respectively adapted for receiving and fixing an end of an optical fiber; and lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;

the light beam deflector assembly being positionable along the optical path between the groups of collimator receptacles so at least one quasi-collimated beam of light propagatable from at least one of the lenses impinges thereon, the light beam deflector assembly comprising:

(a) a substrate (212); and
(b) a plurality of reflective light beam deflectors that are fixed to a surface of said substrate (212) which respectively:

i. are:
(1) associated with one of the lenses;
(2) positioned so the quasi-collimated beam of light propagatable from the associated lens impinges upon one of said light beam deflectors to be reflected therefrom; and
(3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
A. positionable along the optical path between the groups of collimator receptacles;
B. energizable by drive signals supplied to said fiber optic switching module; and
C. associated with one of the lenses;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;
wherein the quasi-collimated beam of light impinges obliquely upon the light beam deflector to reflect obliquely therefrom;
wherein each light beam deflector has a width in a plane established by the impinging and reflected quasi-collimated beam of light which exceeds a height perpendicular to the plane.

16. The light beam deflector assembly of claim 15 wherein the width of said beam deflector equals approximately 1.4 times the height thereof.

17. A light beam deflector assembly adapted for use in a fiber optic switching module that includes:
a first and a second group of collimator receptacles which are separated from each other at opposite ends of a free space optical path with each collimator receptacle being respectively adapted for receiving and fixing an end of an optical fiber; and
lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;
the light beam deflector assembly being positionable along the optical path between the groups of collimator receptacles so at least one quasi-collimated beam of light propagatable from at least one of the lenses impinges thereon, the light beam deflector assembly comprising:
(a) a substrate (212); and
(b) a plurality of reflective light beam deflectors that are fixed to a surface of said substrate (212) which respectively:
i. are:
(1) associated with one of the lenses;
(2) positioned so the quasi-collimated beam of light propagatable from the associated lens impinges upon one of said light beam deflectors to be reflected therefrom; and
(3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
A. positionable along the optical path between the groups of collimator receptacles;
B. energizable by drive signals supplied to said fiber optic switching module; and
C. associated with one of the lenses;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;
wherein a mirror surface is disposed along a surface of said substrate (212) which is distal from the surface thereof to which said light beam deflectors are fixed, the light beam deflector assembly being:
juxtaposable with a second light beam deflector assembly includable in the fiber optic switching module and positionable in the optical path thereof, the second light beam deflector assembly also having a mirror surface disposed along a surface of the substrate (212) of the second light beam deflector assembly; and
configurable with respect to the mirror surface of the second light beam deflector assembly so the quasi-collimated beam of light that impinges upon light beam deflector first impinges on and is reflected from the mirror surface disposed on the adjacent substrate (212) of the second light beam deflector assembly.

18. A light beam deflector assembly adapted for use in a fiber optic switching module that includes:
a first and a second group of collimator receptacles which are separated from each other at opposite ends of a free space optical path with each collimator receptacle being respectively adapted for receiving and fixing an end of an optical fiber; and
lenses that are supported within the fiber optic switching module each juxtaposed with the end of one optical fiber fixable in the collimator receptacles, and disposed with respect to the end of that optical fiber so a beam of light emittable from the end passes through the lens to propagate as a quasi-collimated beam within the optical path from the lens toward the second or toward the first group of collimator receptacles;
the light beam deflector assembly being positionable along the optical path between the groups of collimator receptacles so at least one quasi-collimated beam of light propagatable from at least one of the lenses impinges thereon, the light beam deflector assembly comprising:
(a) a substrate (212); and
(b) a plurality of reflective light beam deflectors that are fixed to a surface of said substrate (212) which respectively:

i. are:
(1) associated with one of the lenses;
(2) positioned so the quasi-collimated beam of light propagatable from the associated lens impinges upon one of said light beam deflectors to be reflected therefrom; and
(3) energizable by drive signals supplied to said substrate (212) for orienting the light beam deflectors fixed thereto so the quasi-collimated beam of light propagatable from the associated lens, that reflects off the one of said light beam deflectors, also reflects off another selected light beam deflector that is also:
   A. positionable along the optical path between the groups of collimator receptacles;
   B. energizable by drive signals supplied to said fiber optic switching module; and
   C. associated with one of the lenses;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles;
wherein light beam deflectors respectively include:
an outer frame;
first torsional hinges that project inwardly from the outer frame;
an inner frame supported by the first torsional hinges for rotation about a first axis;
second torsional hinges that project inwardly from the inner frame; and
a central plate that is supported by the second torsional hinges for rotation about a second axis that is not oriented parallel to the first axis, and that has a reflective mirror surface formed thereon;
wherein said light beam deflectors are organized as a group having an axis to which the second axis of light beam deflectors is oriented substantially parallel;
wherein the central plate of light beam deflectors has a width perpendicular to the axis of the group of said light beam deflectors that exceeds a height of the central plate parallel to the axis of the group of said light beam deflectors.

19. The light beam deflector assembly of claim 18 wherein the width of said light beam deflector equals approximately 1.4 times the height thereof.

20. A flip-chip light beam deflector assembly comprising:
a substrate (212); and
a reflective light beam deflector that is monolithically fabricated from a single-crystal semiconductor layer of a silicon wafer (162) that includes a device layer (166) and a handle layer (168), said light beam deflector being fixed to a surface of said substrate (212) with the device layer (166) of the silicon wafer (162) disposed nearest to the substrate (212), and the handle layer (168) disposed further from the substrate (212), said light beam deflector being energizable by a drive signal supplied to said substrate (212) for orienting said light beam deflector.

21. The flip-chip light beam claim 20 wherein said light beam deflector is layer (166) of the silicon wafer (162).

22. The flip-chip light beam deflector assembly of claim 20 wherein the substrate (212) is fabricated from material selected from a group consisting of silicon, polysilicon, Pyrex glass, aluminum oxide and aluminum nitride.

23. The flip-chip beam deflector assembly of claim 22 wherein the substrate (212) is pierced by insulated, electrically-conductive vias that provide electrical connections to said light beam deflector.

24. The flip-chip light beam deflector assembly of claim 22 wherein the substrate (212) has an integrated circuit therein or thereon.

25. The flip-chip light beam deflector assembly of claim 24 wherein said substrate (212) has an electrically conductive electrode formed on the surface thereof to which said light beam deflector is fixed, and wherein the drive signal supplied to said substrate (212) is received by an amplifier that is included in the integrated circuit for supplying a voltage signal to said electrode to generate an electrostatic force between said electrode and said light beam deflector adjacent thereto.

26. The flip-chip light beam deflector assembly of claim 24 wherein the integrated circuit includes an amplifier that receives an electrical signal which indicates light beam deflector orientation.

27. The flip-chip light beam deflector assembly of claim 26 wherein said light beam deflector fixed to said substrate (212) is supported for rotation by hinges which include at least one torsion sensor for sensing light beam deflector orientation, the torsion sensor of said light beam deflector supplying the electrical signal to at least one amplifier.

28. The flip-chip light beam deflector assembly of claim 20 wherein the handle layer (168) surrounding each of the light beam deflectors is coated with an anti reflection layer to absorb stray light impinging thereon.

29. A light beam deflector assembly adapted for use in a fiber optic switching module that includes:
a first and a second group of collimator receptacles which are separated from each other at opposite ends of a free space optical path with each collimator receptacles being respectively adapted for receiving and fixing an end of an optical fiber; and
lenses that are supported within the fiber optic switching module each juxtaposed with the end of one optical fiber fixable in the collimator receptacles, and disposed with respect to the end of that optical fiber so a beam of light emittable from end passes through the lens to propagate as the a quasi-collimated beam within the optical path from the lens toward the second or toward the first group of collimator receptacles;
the light beam deflector assembly being positionable along the optical path between the groups of collimator receptacles so at least one quasi-collimated beam of light propagatable from at least one of the lenses impinges thereon, the light beam deflector assembly comprising:
(a) a substrate (212); and
(b) a plurality of reflective light beam deflectors that are fixed to a surface of said substrate (212) which respectively:
i. are:
(1) associated with one of the lenses;
(2) positioned so the quasi-collimated beam of light propagatable from the associated lens impinges upon one of said light beam deflectors to be reflected there from; and
(3) energizable by drive signals supplied to said substrate (212) for orienting the light beam deflectors axed thereto so the quasi-collimated beam of light propagatable from the associated lens, that reflects off the one of said light beam deflectors, also reflects off another selected light beam deflector that is also:
  A. positionable along the optical path between the groups of collimator receptacles;
  B. energizable by drive signals supplied to said fiber optic switching module; and
  C. associated with one of the lenses; and
 ii. include an orientation sensor for generating an orientation signal which indicates orientation of said light beam deflector; and
(c) an amplifier which receives the orientation signal from the orientation sensor of said light beam deflector;
whereby a pair of light beam deflectors, one light beam deflector of the pair included in the light beam deflector assembly, when selected and oriented by drive signals supplied respectively thereto, establish an optical coupling by which a beam of light propagating through the optical path from the end of one optical fiber fixable in the collimator receptacle either of the first or of the second group is reflectable sequentially off the pair of energized light beam deflectors into a selected one of the optical fibers fixable at the second or at the first group of collimator receptacles.

30. The light beam deflector assembly of claim 29 wherein each light beam deflector fixed to said substrate (212) is supported for rotation by hinges, and wherein said light beam deflector orientation sensor includes at least one torsion sensor formed in one of the hinges.

31. The light beam deflector assembly of claim 29 wherein said substrate (212) has electrically conductive electrodes formed on the surface to which said light beam deflectors are fixed, and wherein the drive signals supplied to said substrate (212) for each of said light beam deflectors are received by amplifiers that are included in the light beam deflector assembly for supplying voltage signals to said electrodes to generate an electrostatic force between said electrodes and said immediately adjacent light beam deflector.

* * * * *